United States Patent [19]
Ackeret

[11] Patent Number: 4,939,860
[45] Date of Patent: * Jul. 10, 1990

[54] CYCLIC REARRANGEMENT DEVICE FOR STACKED RECTANGULAR SHEETS

[75] Inventor: Peter Ackeret, Kusnacht, Switzerland

[73] Assignee: Licinvest AG, Chur, Switzerland

[*] Notice: The portion of the term of this patent subsequent to Nov. 7, 2006 has been disclaimed.

[21] Appl. No.: 334,237

[22] Filed: Apr. 5, 1989

Related U.S. Application Data

[63] Continuation of Ser. No. 216,153, Jul. 7, 1988, Pat. No. 4,879,825, which is a continuation of Ser. No. 897,763, filed as PCT EP85/00615 on Nov. 11, 1985, Pat. No. 4,759,142.

[30] Foreign Application Priority Data

Nov. 12, 1985 [DE] Fed. Rep. of Germany ....... 3441488

[51] Int. Cl.$^5$ .............................................. G09F 11/30
[52] U.S. Cl. ......................................... 40/513; 40/490; 40/411
[58] Field of Search ................. 40/513, 490, 511, 508, 40/509, 375, 380, 381

[56] References Cited

U.S. PATENT DOCUMENTS

| | | | |
|---|---|---|---|
| 3,377,727 | 4/1968 | Weggeland | 40/79 |
| 3,783,540 | 1/1974 | Barclay | 40/78.07 |
| 3,797,144 | 3/1974 | Weggeland | 40/36 |
| 4,057,920 | 11/1977 | Weggeland | 40/79 |
| 4,238,898 | 12/1980 | Ackeret | 40/513 |
| 4,238,899 | 12/1980 | Ackeret | 40/513 |
| 4,241,528 | 12/1980 | Ackeret | 40/513 |
| 4,241,529 | 12/1980 | Baur | 40/513 |
| 4,245,417 | 1/1981 | Ackeret | 40/513 |
| 4,259,802 | 4/1981 | Ackeret | 40/513 |
| 4,376,348 | 3/1983 | Ackeret | 40/513 |
| 4,546,561 | 10/1985 | Ackeret | 40/513 |
| 4,550,516 | 11/1985 | Ackeret | 40/513 |
| 4,571,865 | 2/1986 | Ackeret | 40/10 R |
| 4,745,697 | 5/1988 | Ackeret | 40/513 |
| 4,754,564 | 7/1988 | Ackeret | 40/513 |
| 4,763,429 | 8/1988 | Ackeret | 40/513 |
| 4,772,168 | 9/1988 | Ackeret | 40/513 |
| 4,776,119 | 10/1988 | Ackeret | 40/513 |

FOREIGN PATENT DOCUMENTS 2912642 3/1980 Fed. Rep. of Germany .
3014394 10/1981 Fed. Rep. of Germany .
2403207 4/1979 France .

Primary Examiner—Cary E. Stone
Attorney, Agent, or Firm—Jeffrey H. Ingerman

[57] ABSTRACT

Apparatus for the cyclic rearrangement of a pile of rectangular or square sheets, especially a pile of photographic prints, is provided. The apparatus has a first and a second frame part which may be moved relative to one another and parallel to the main plane of the pile, and a picture changer which, on movement of the frame parts backwards and forwards, removes an individual sheet at one end of the pile and adds it to the other end of the pile. The picture changer includes a first and a second separating member which, resiliently biased towards each other, define a through-gap which for the entry of the sheet being separated has a spacing greater than the thickness of one sheet and less than the thickness of two sheets, which spacing is, during the outward movement of the frame parts, maintained or reduced to the thickness of the sheet being separated, as appropriate.

88 Claims, 46 Drawing Sheets

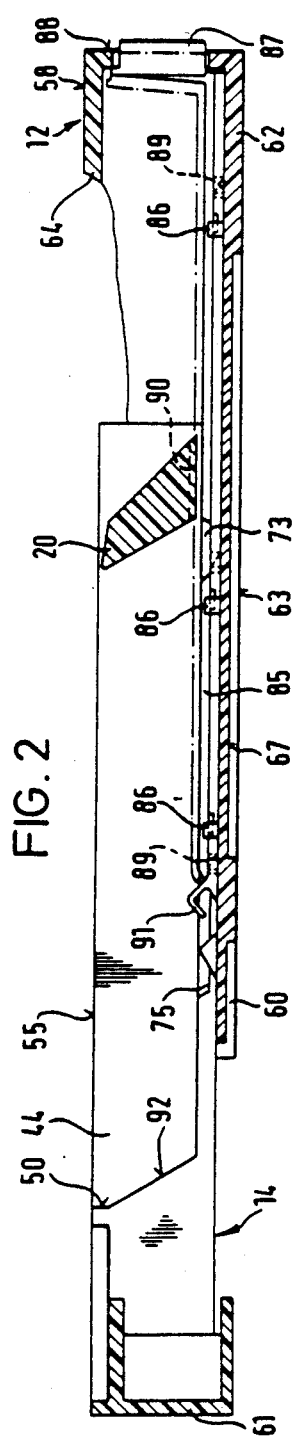
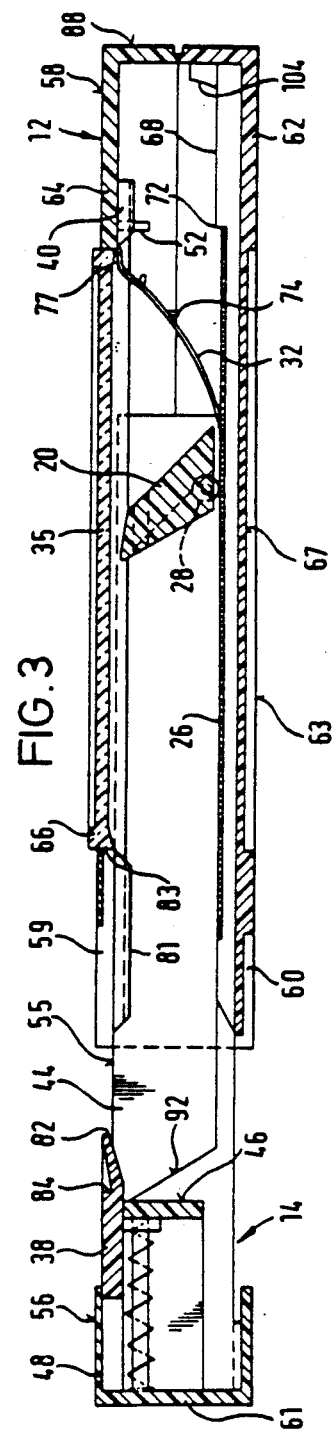
FIG. 2
FIG. 3

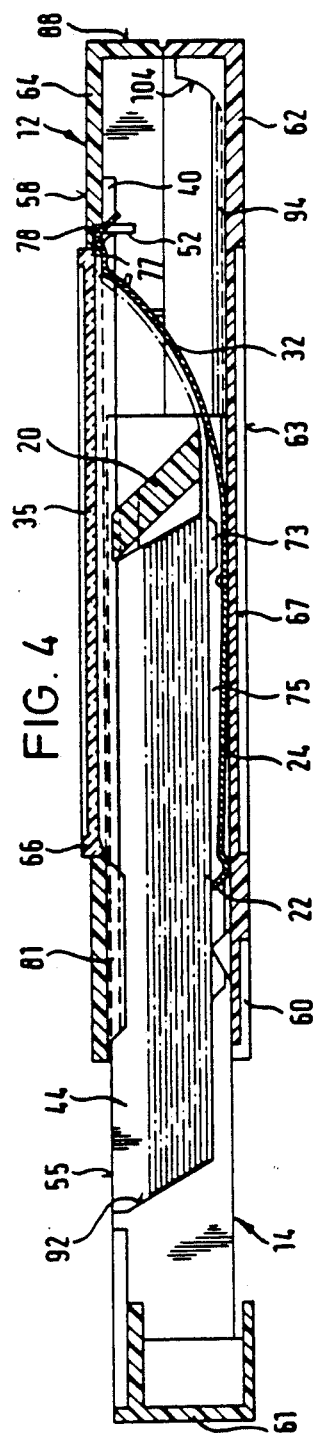
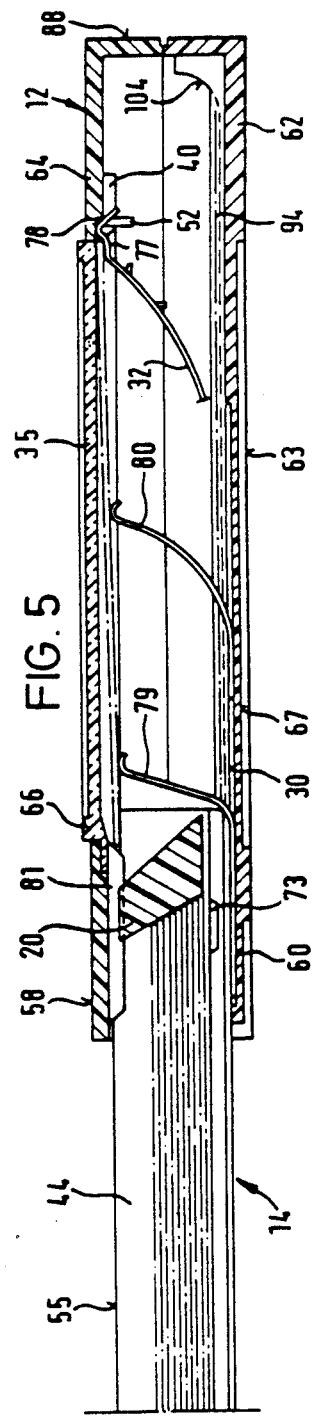

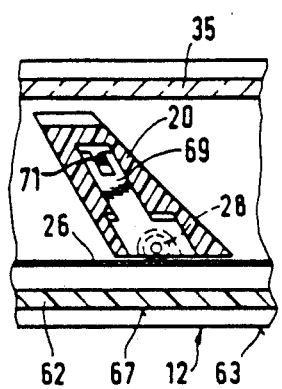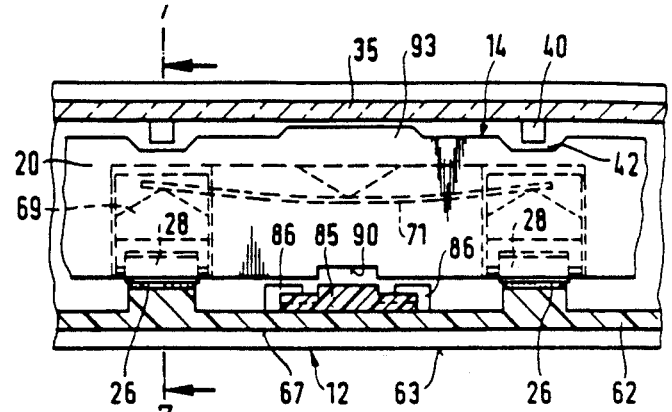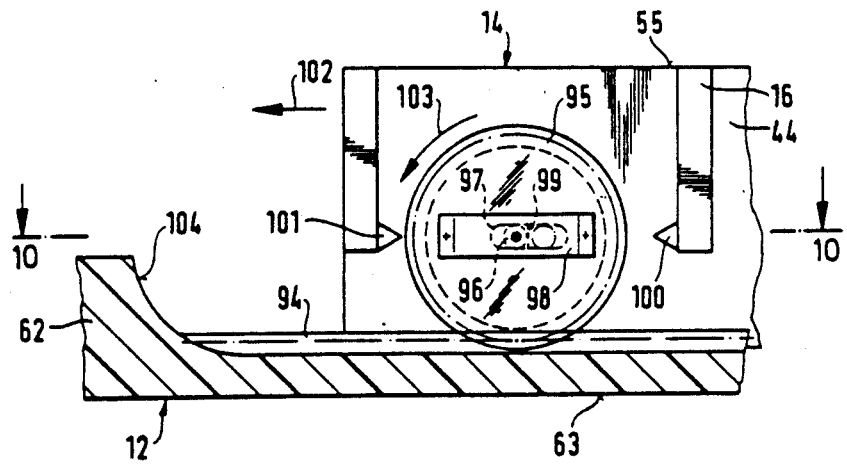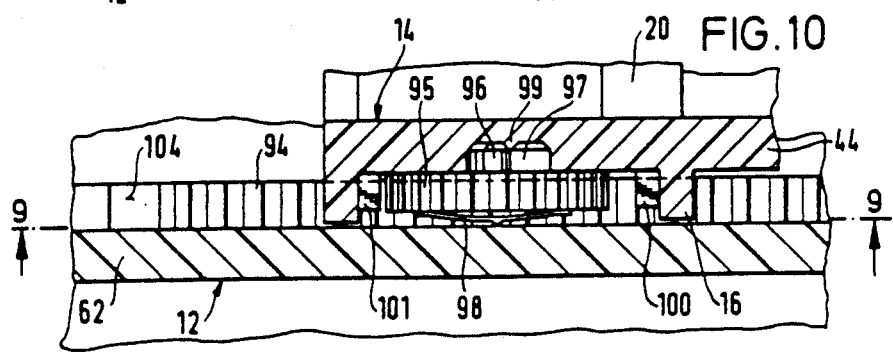

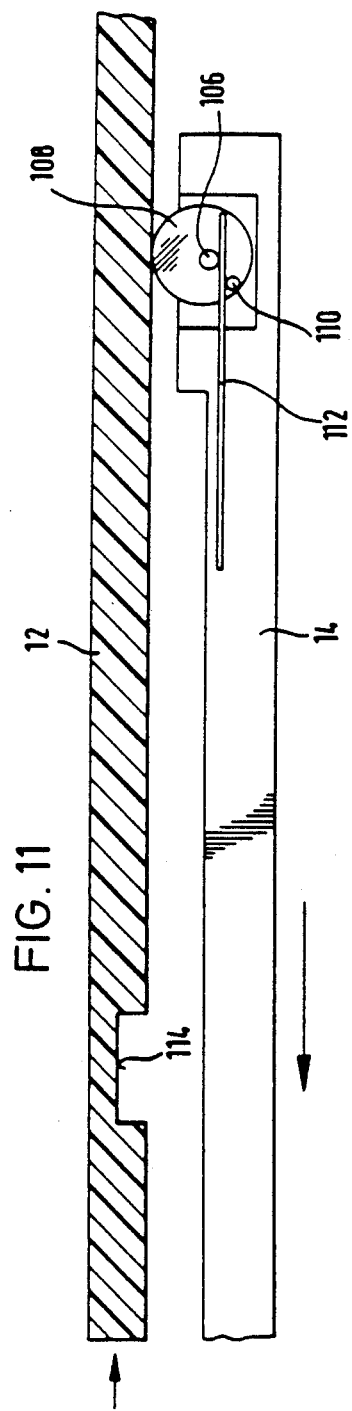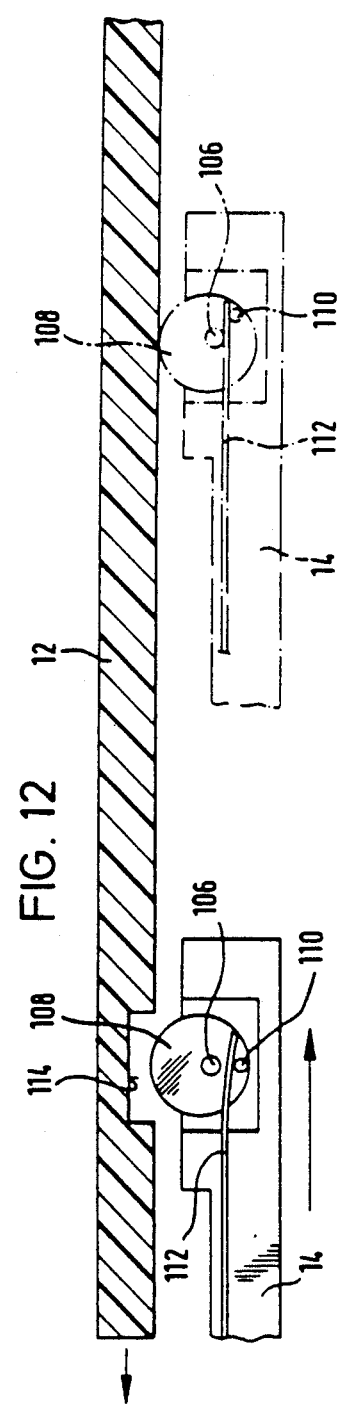

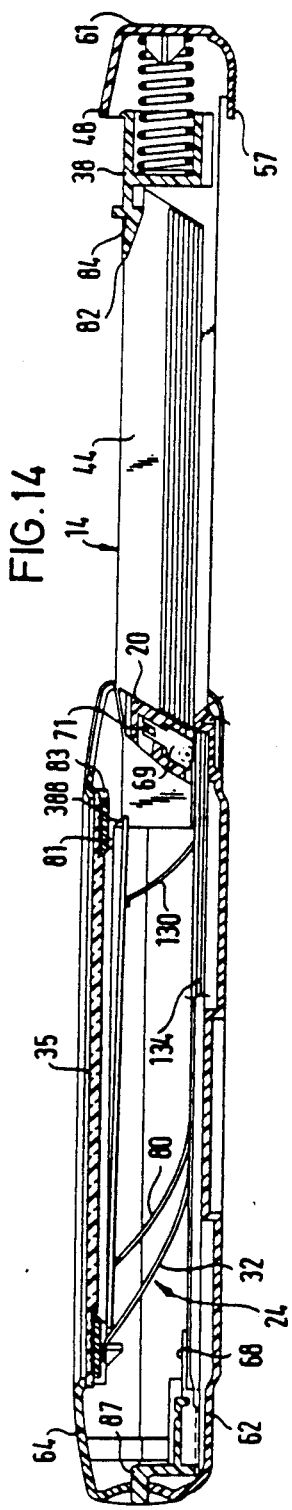
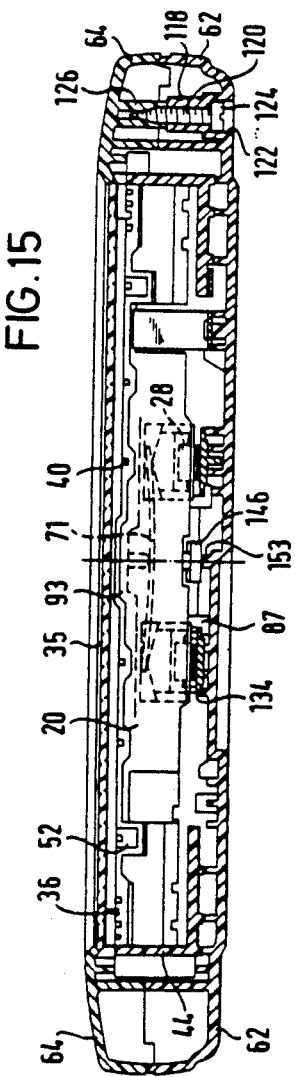
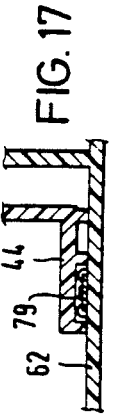
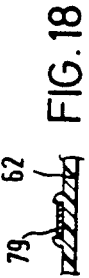
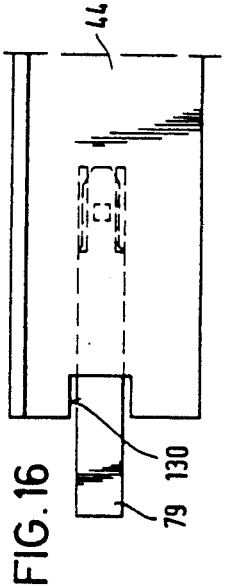

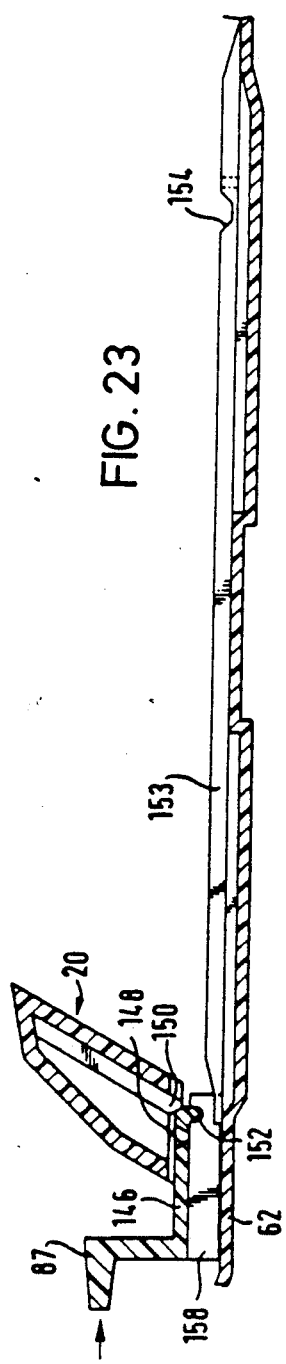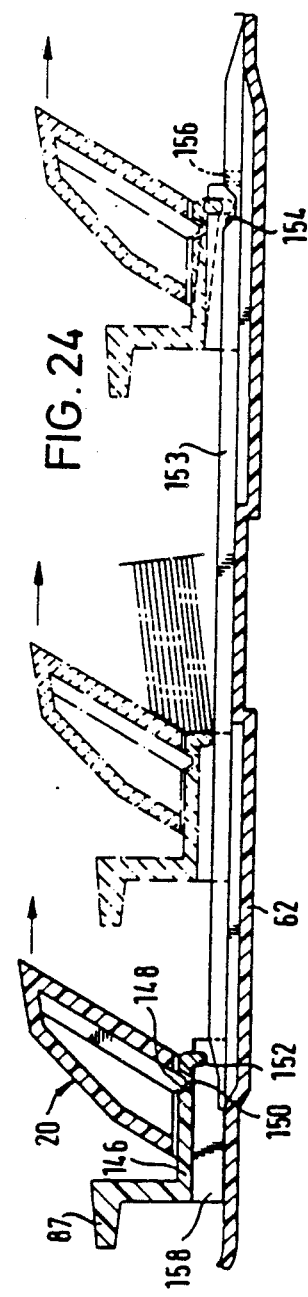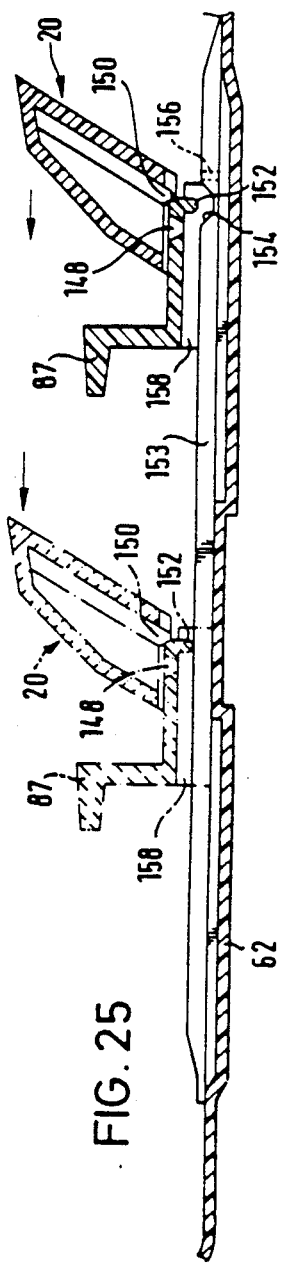

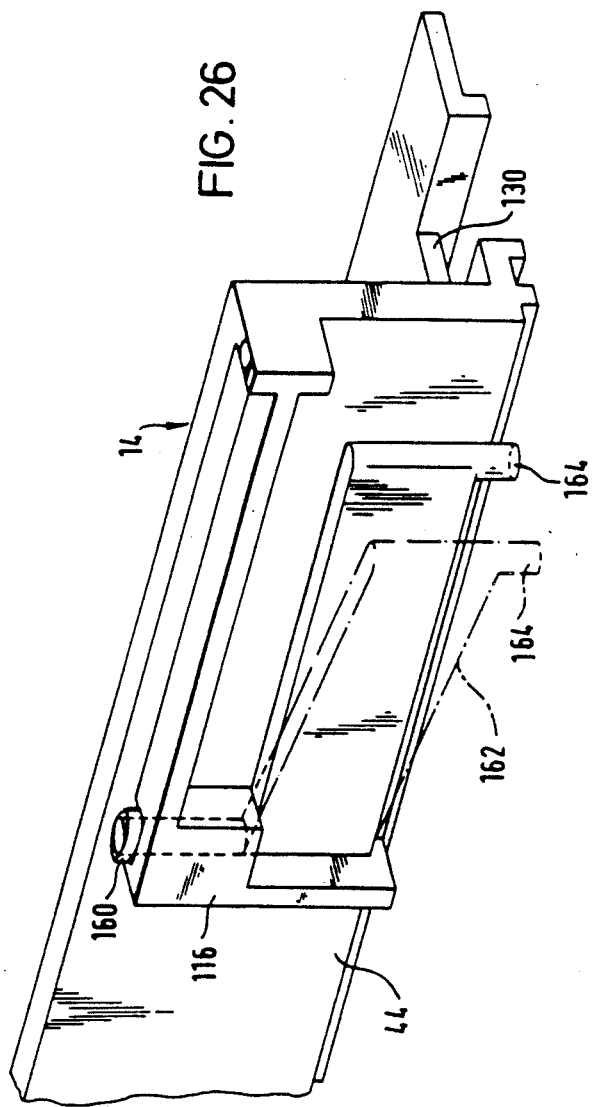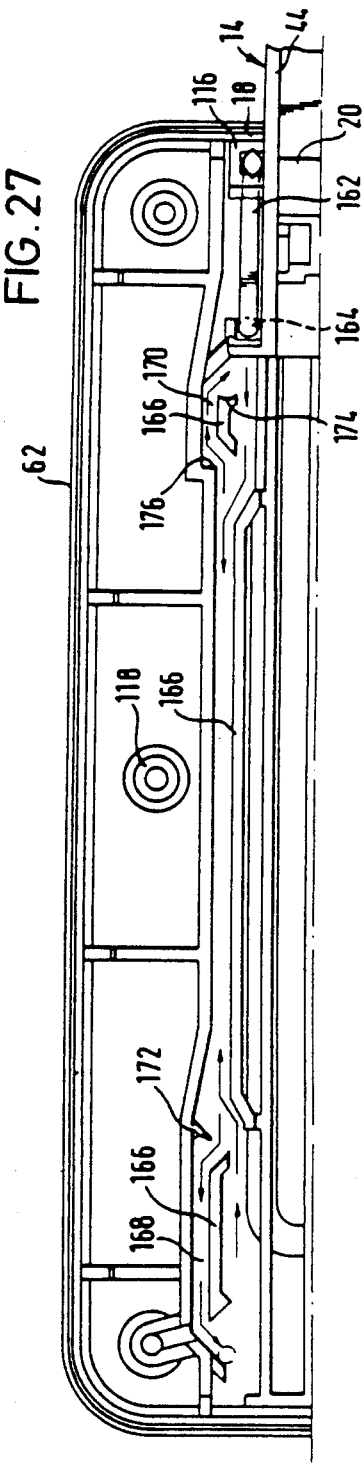

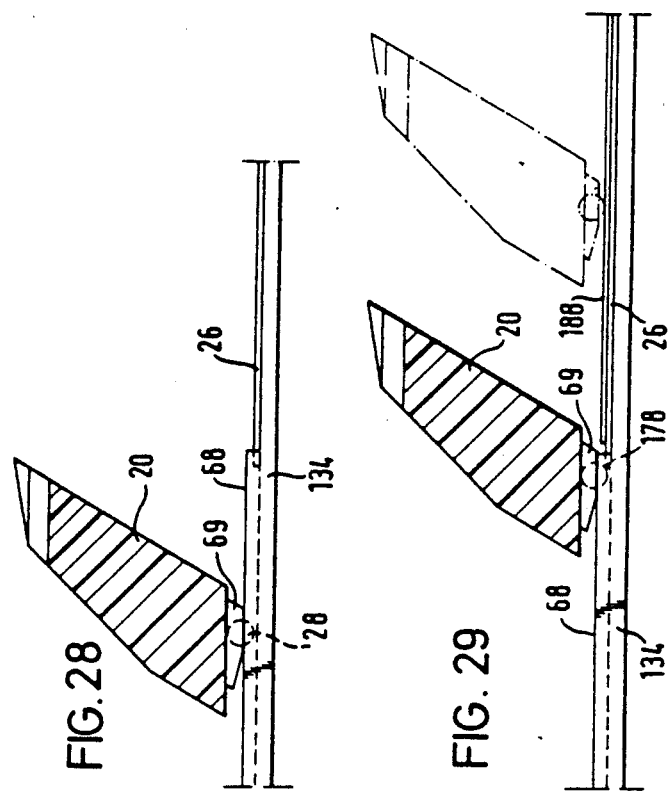
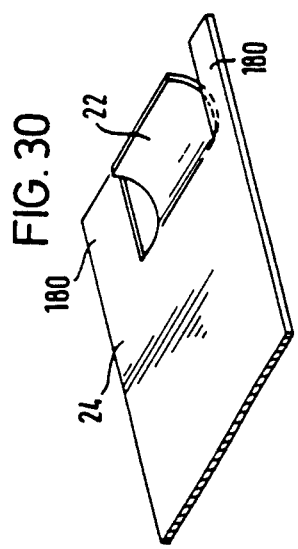
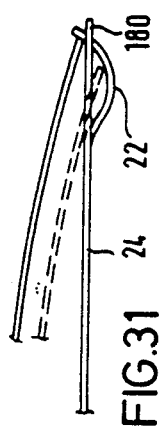

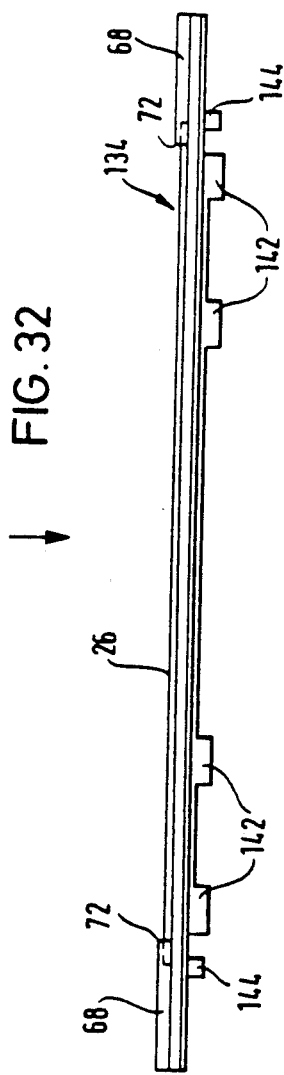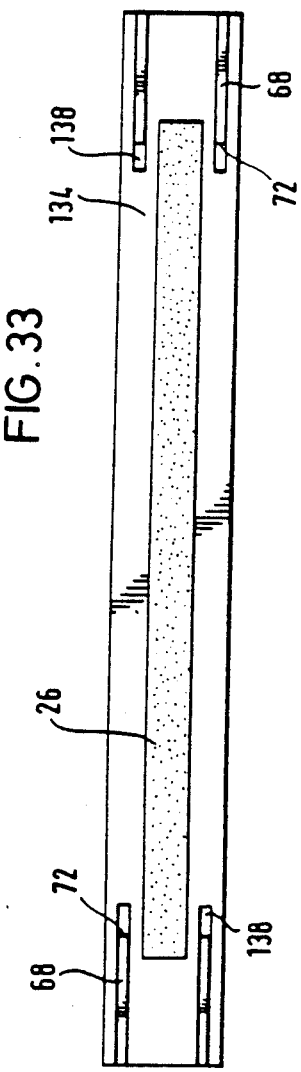

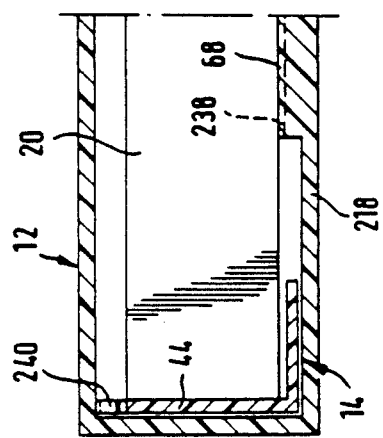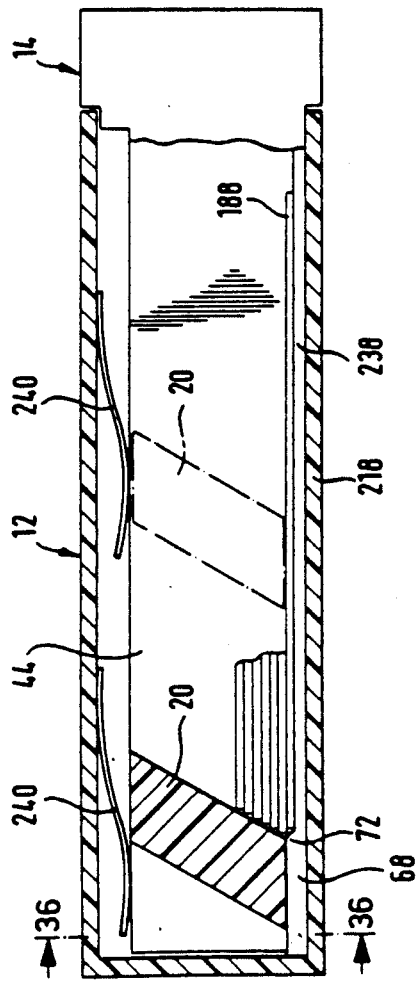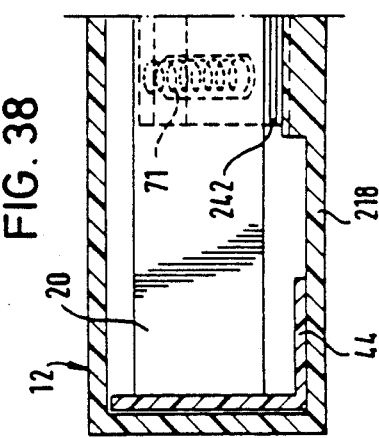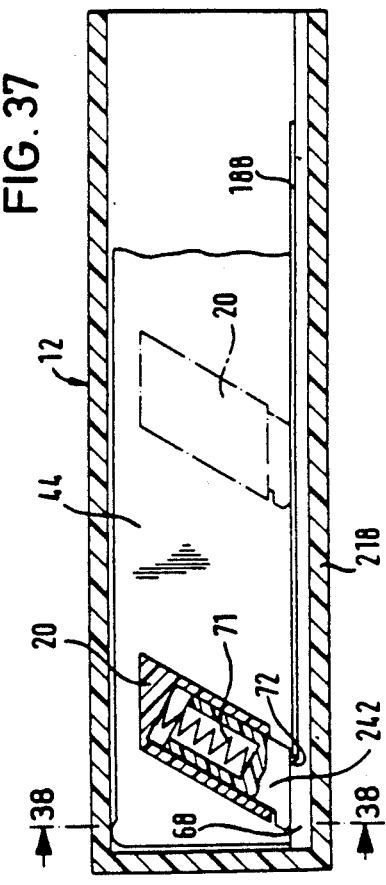

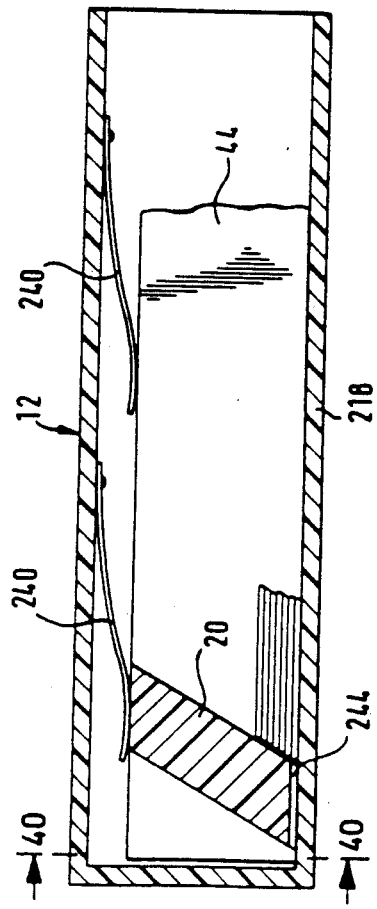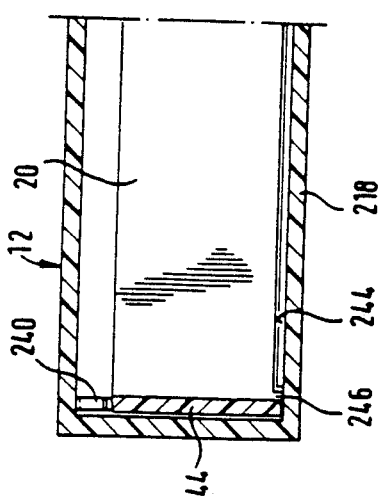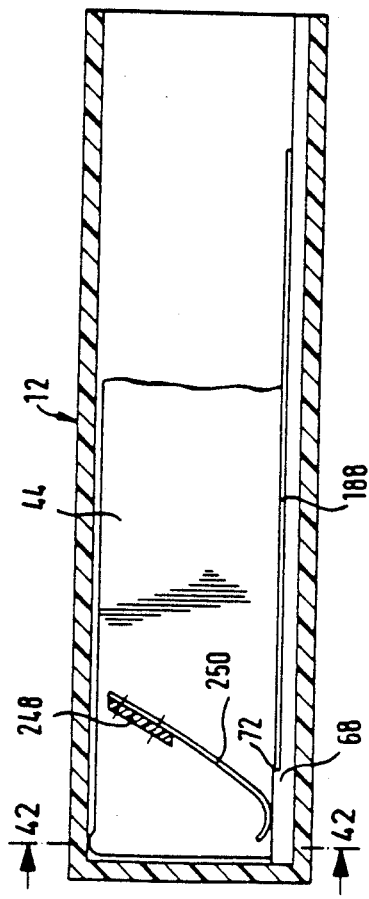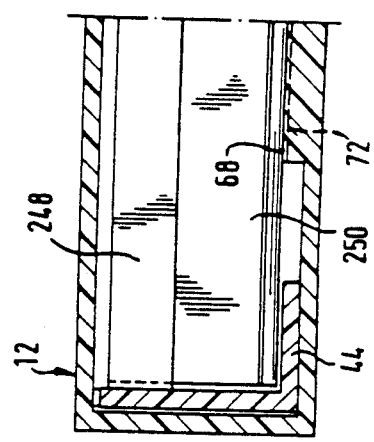

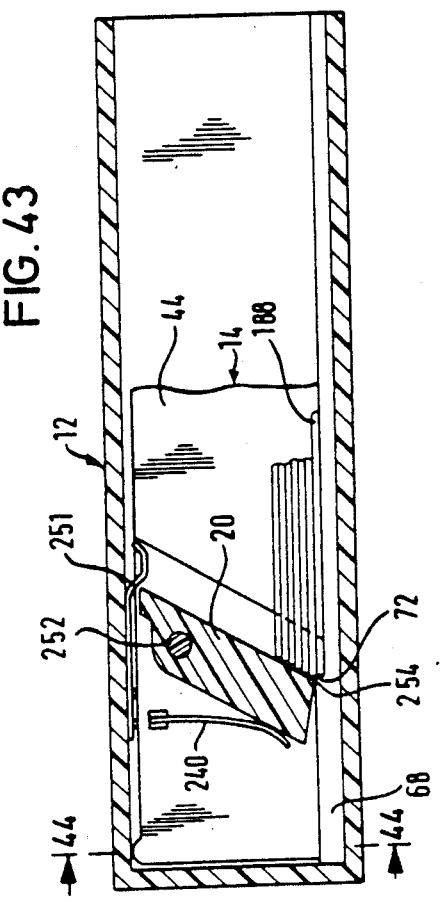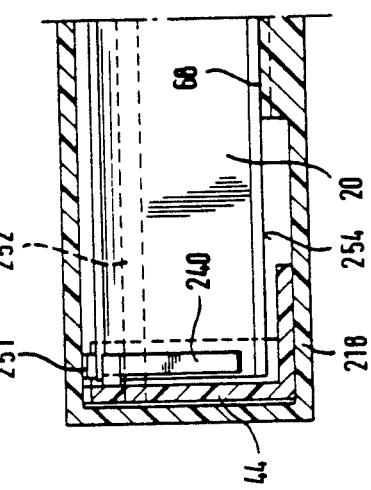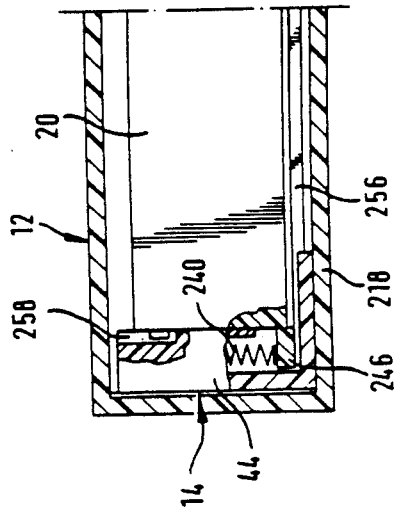

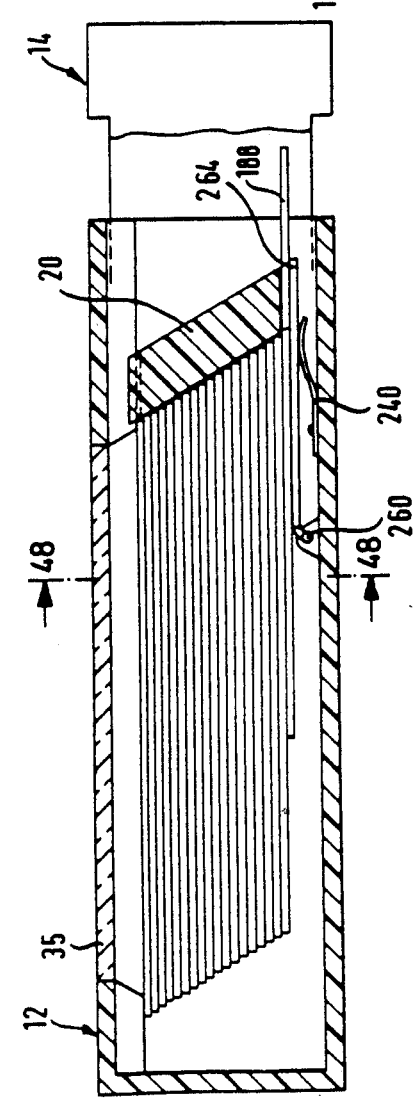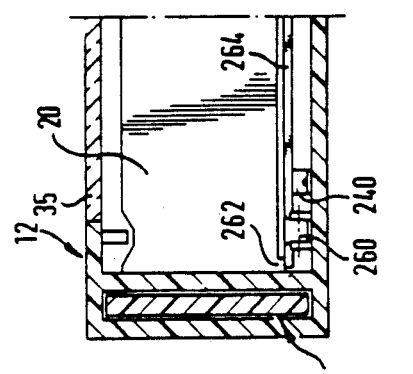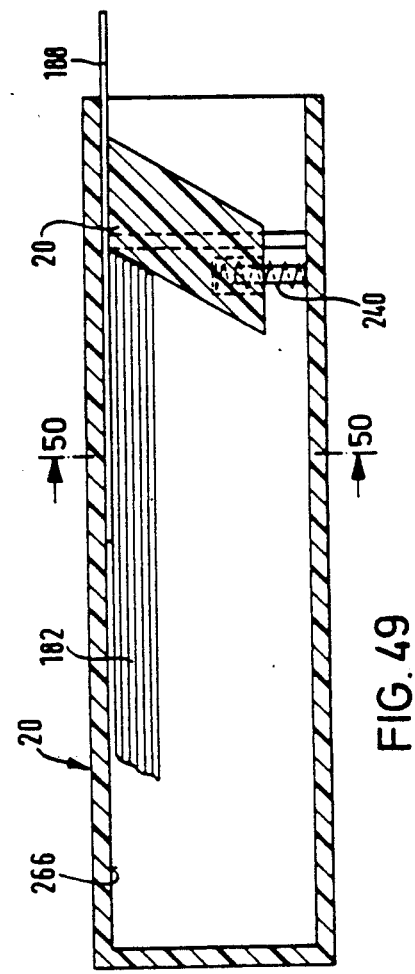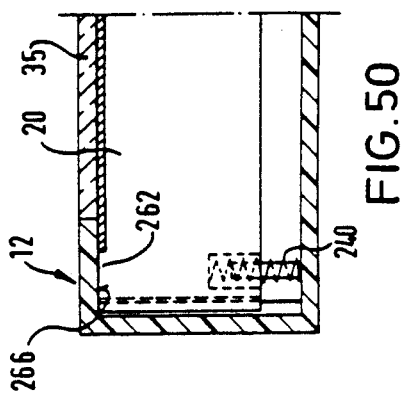

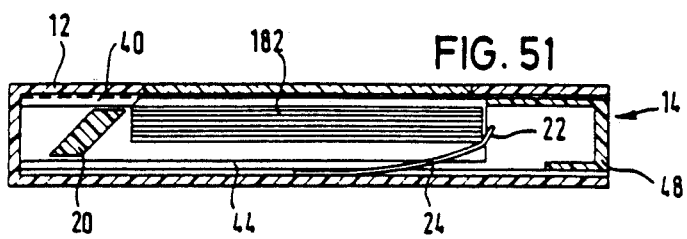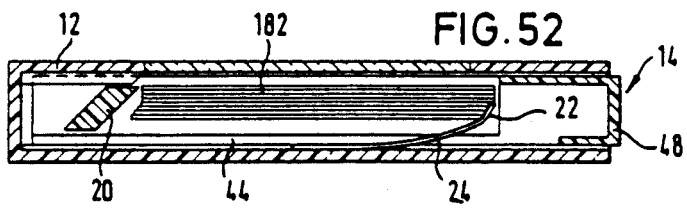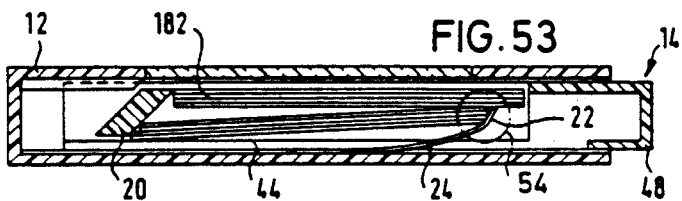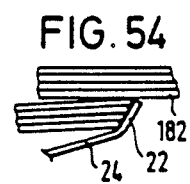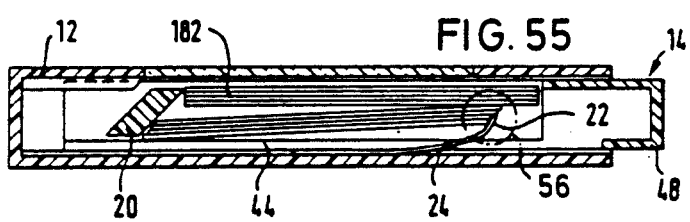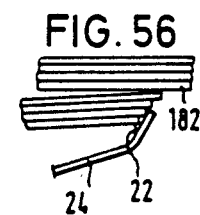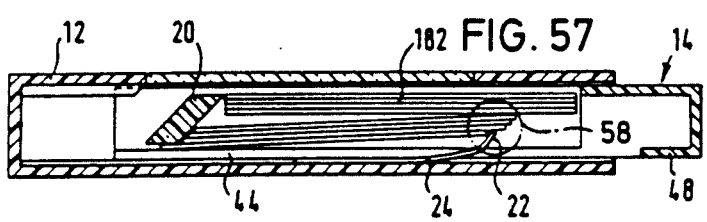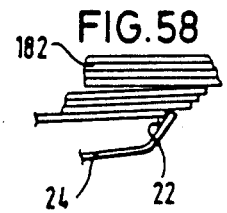

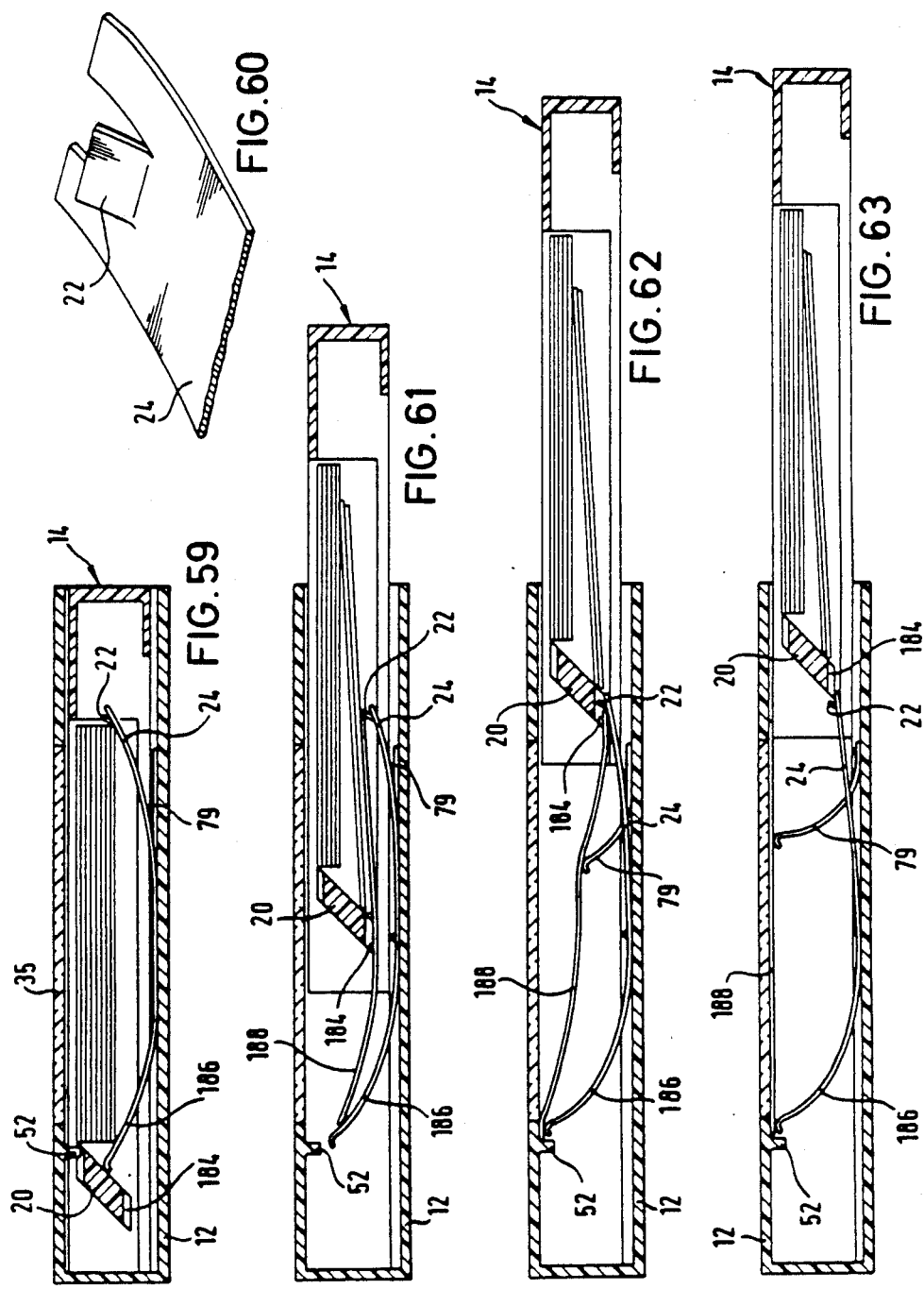

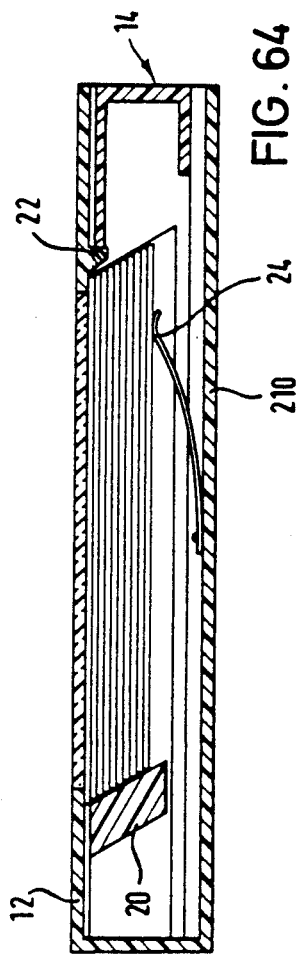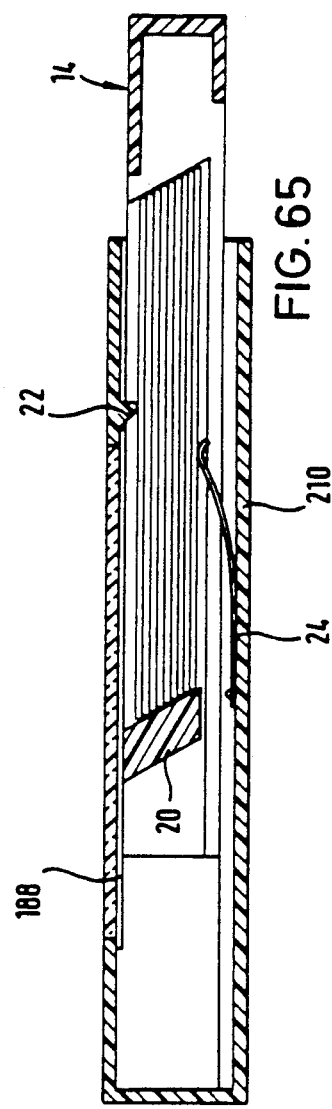

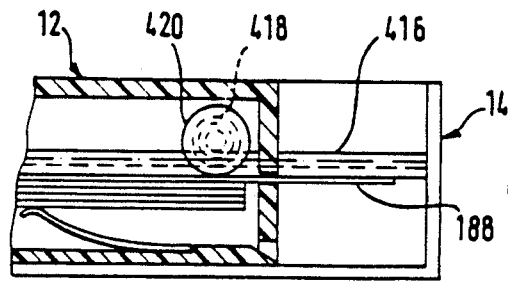
FIG.73
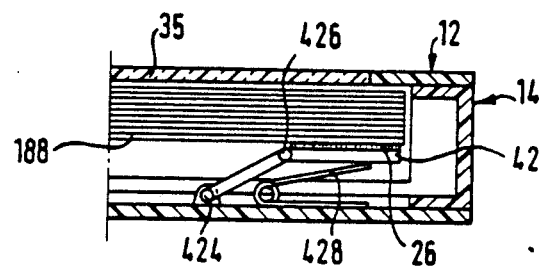
FIG.74
FIG.75
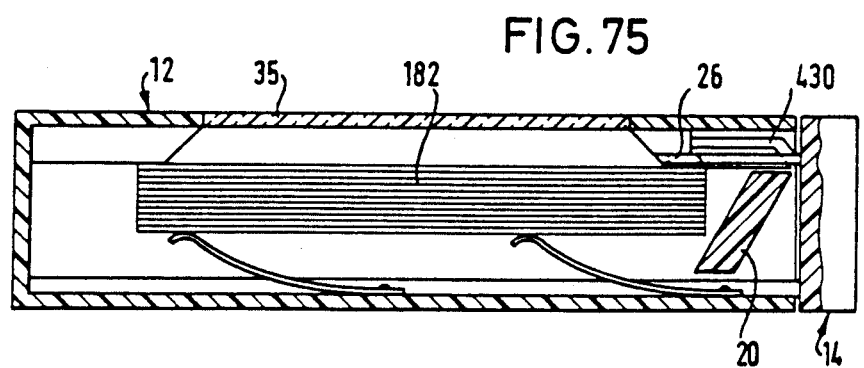

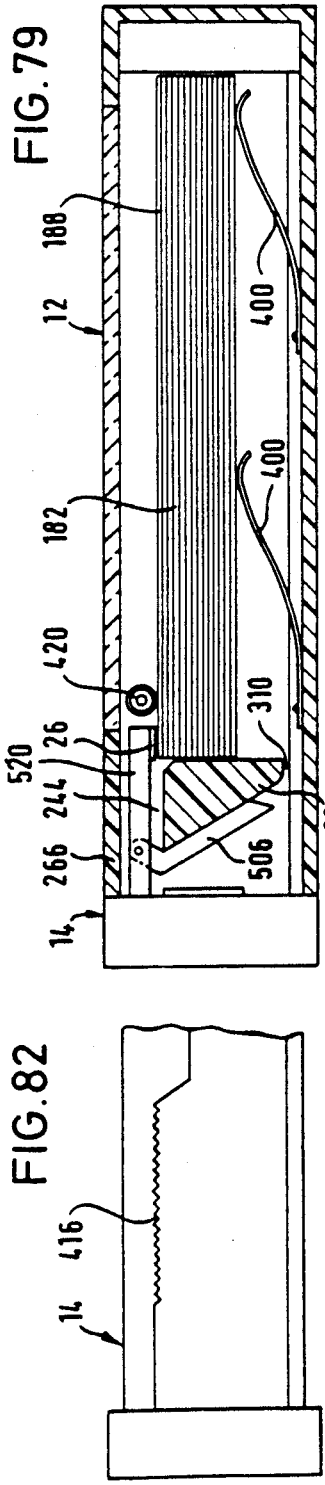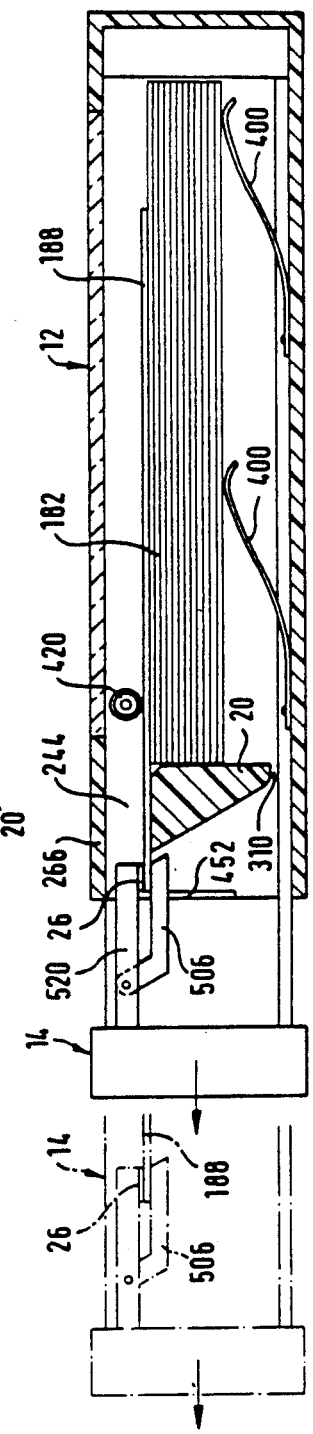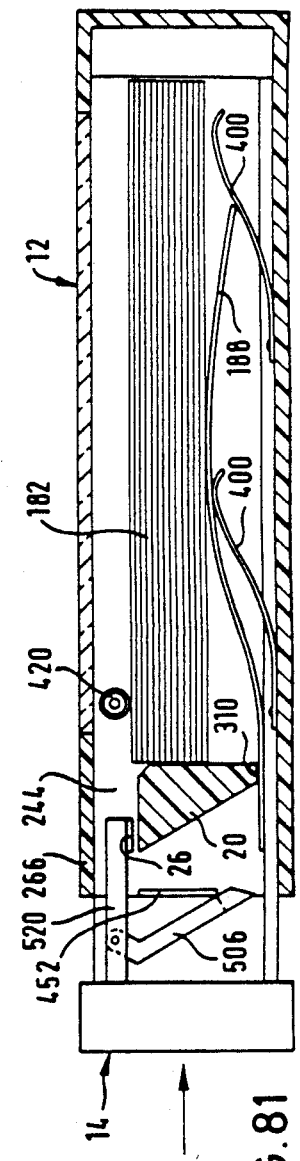

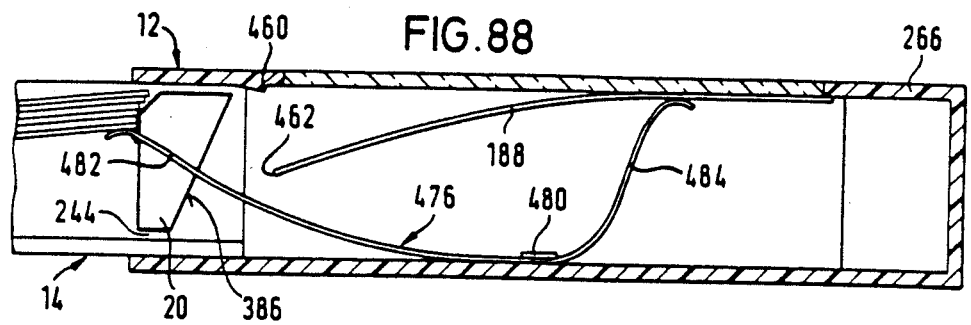
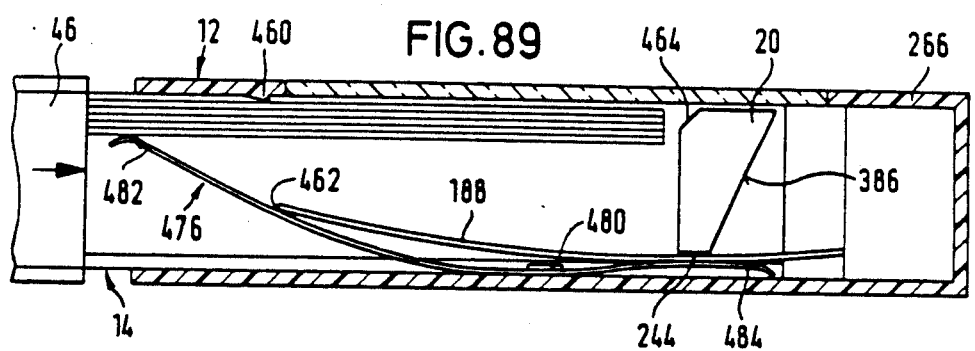
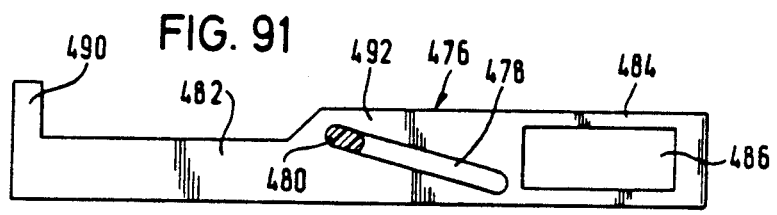
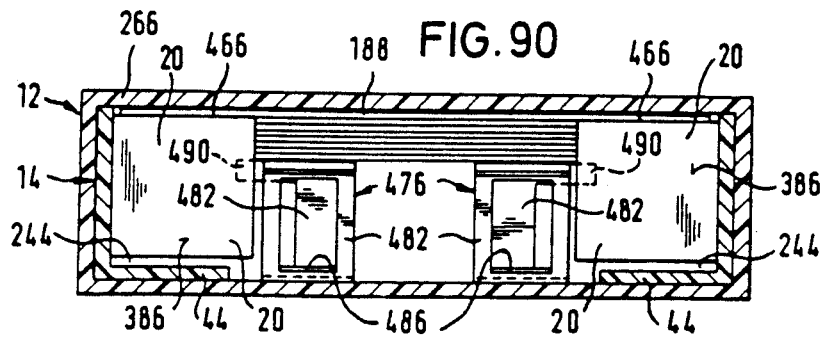

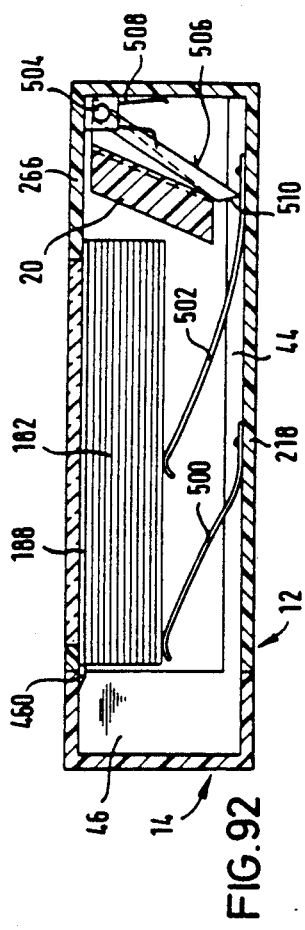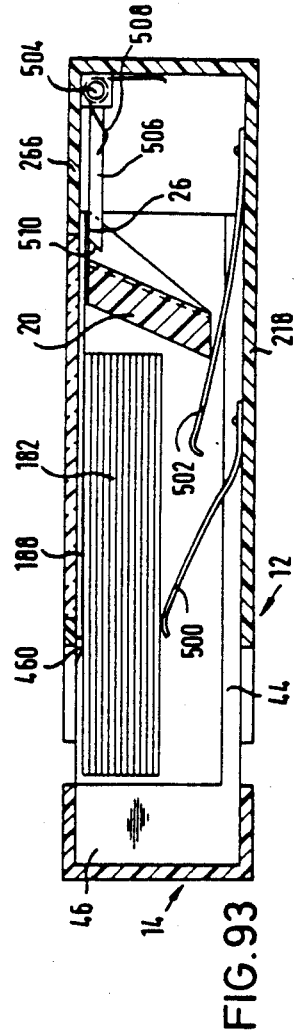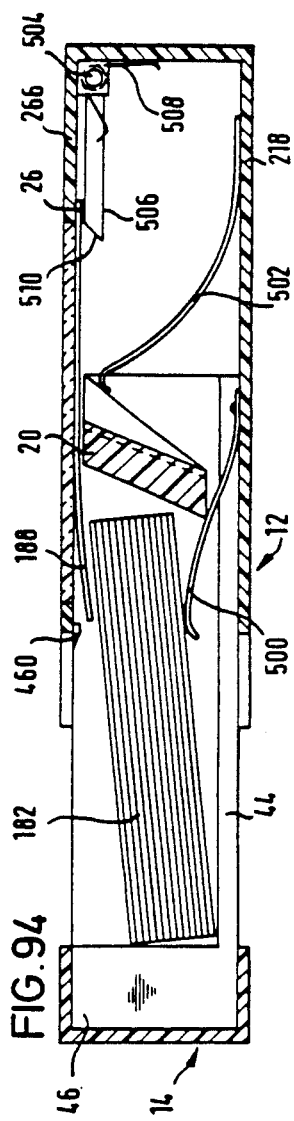

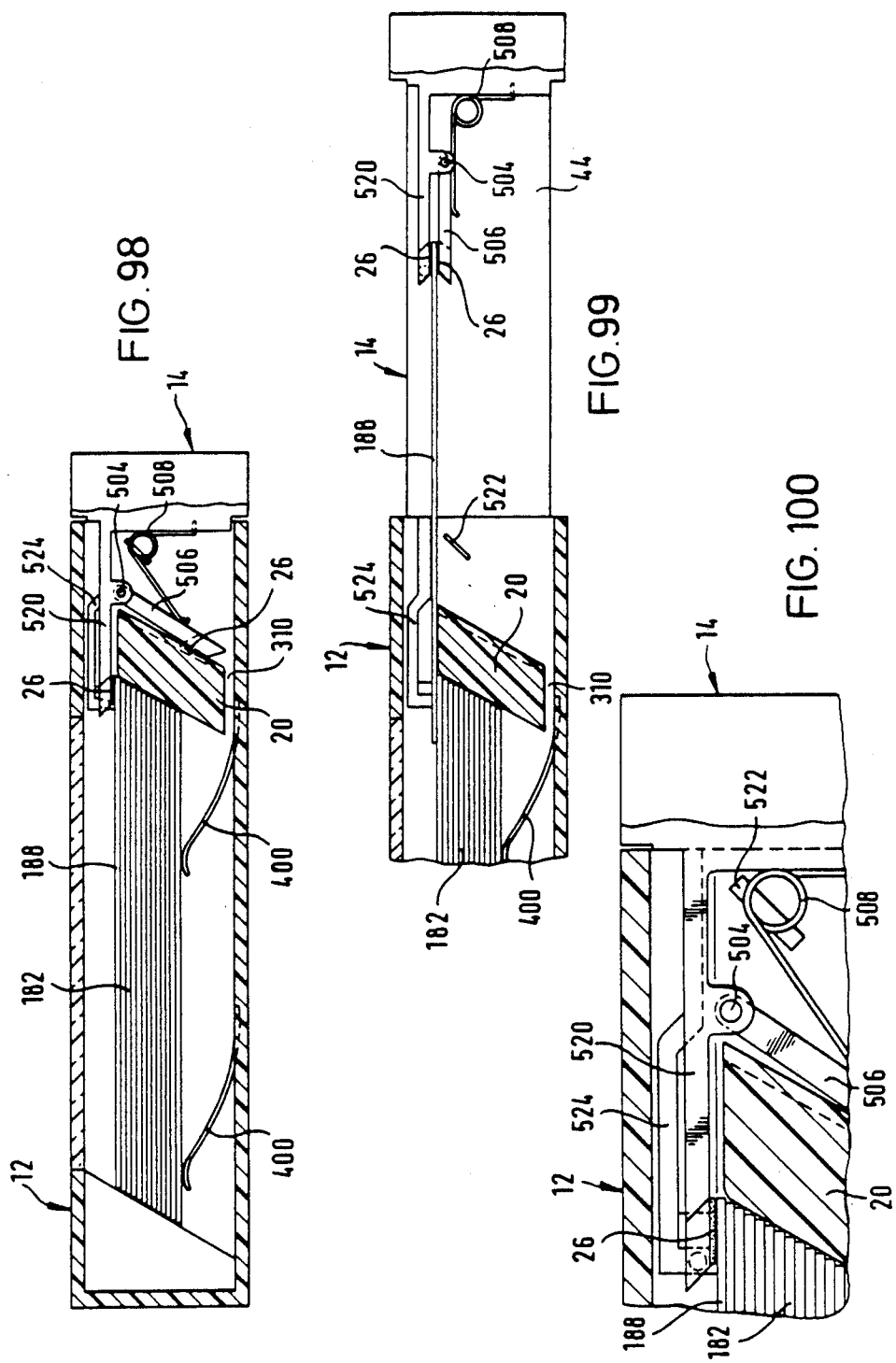

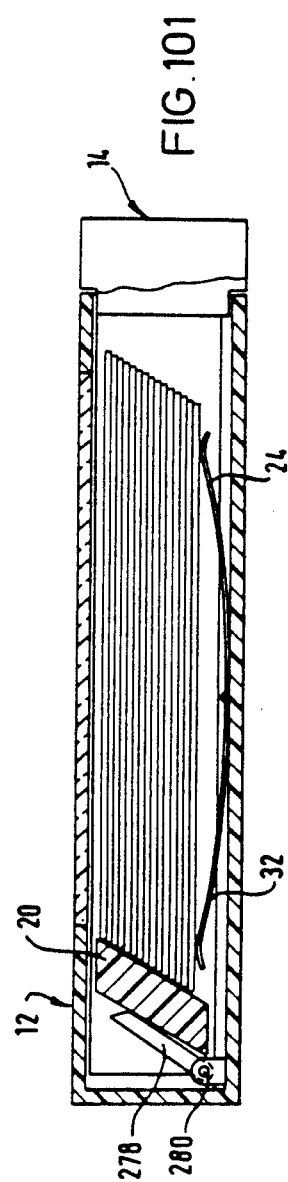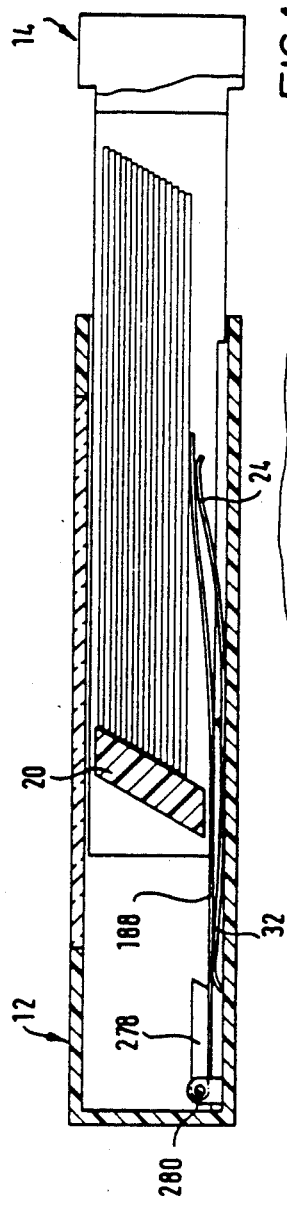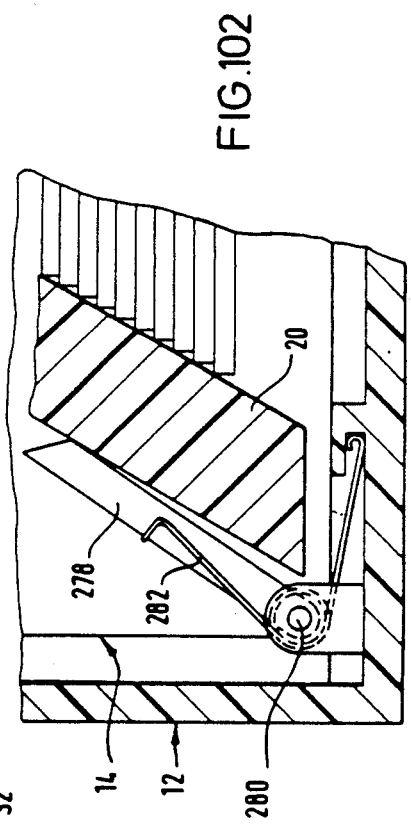

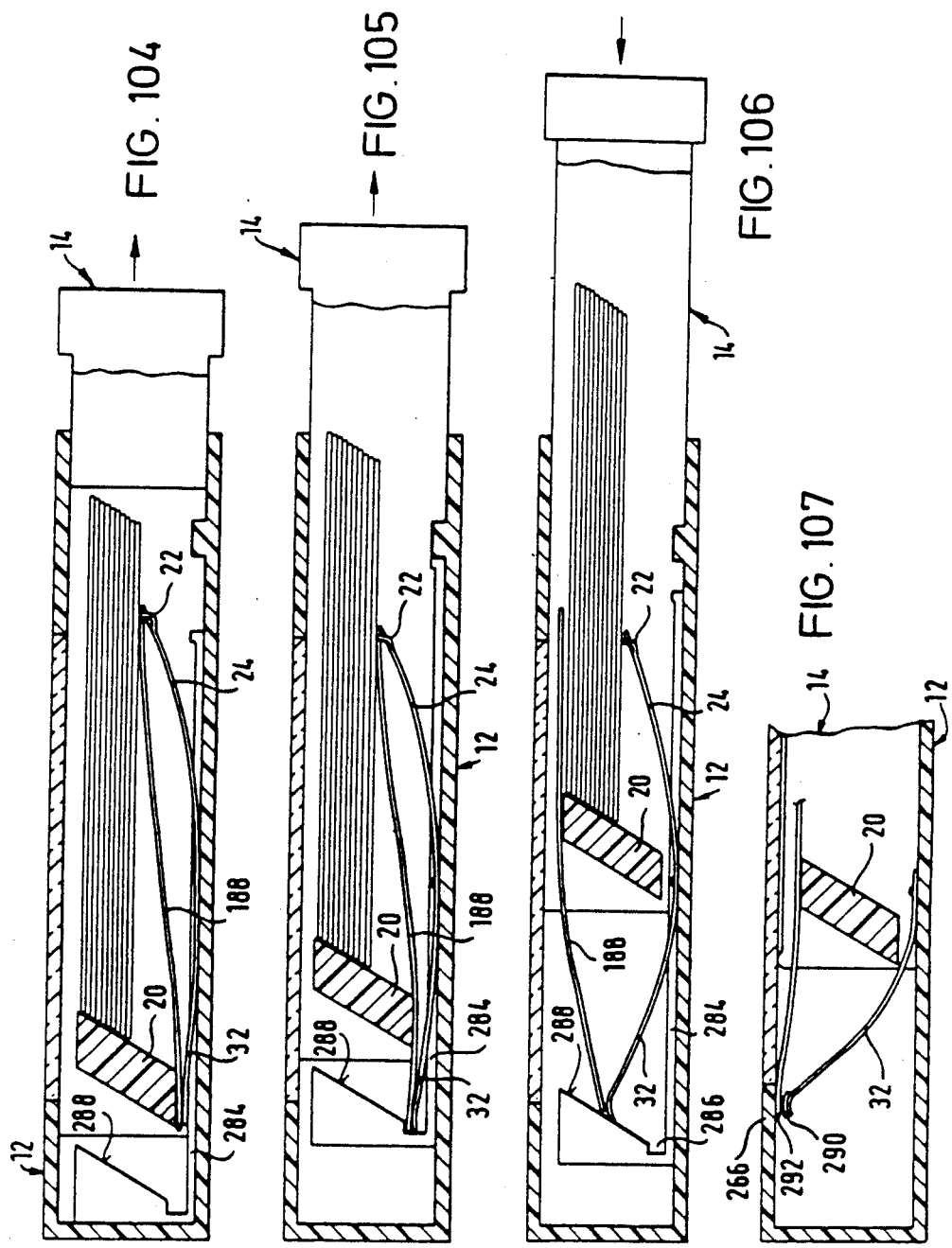

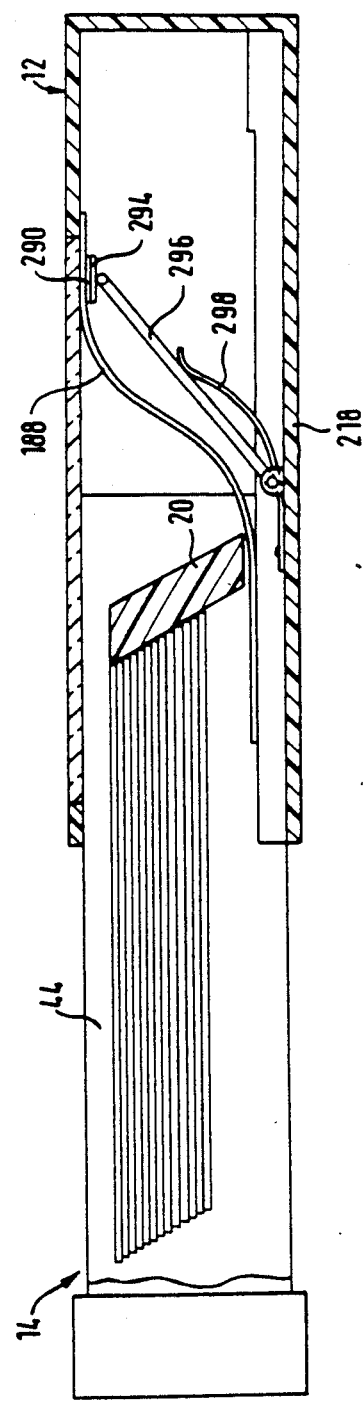

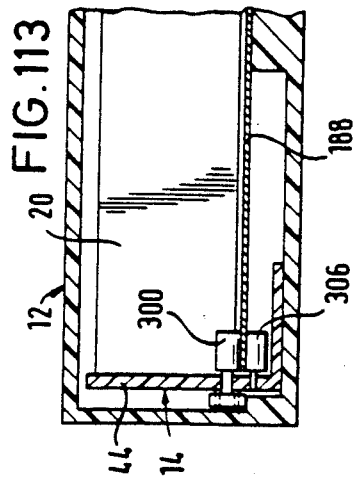
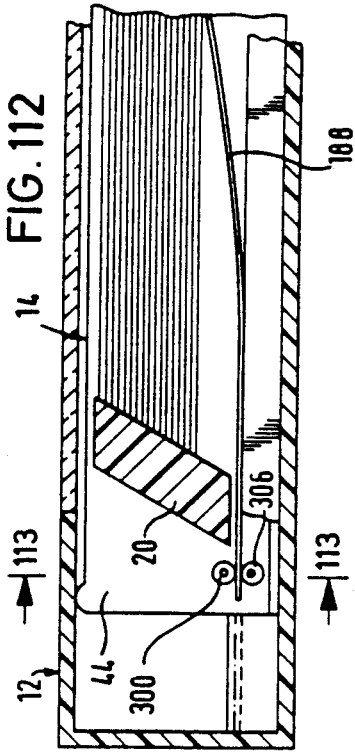
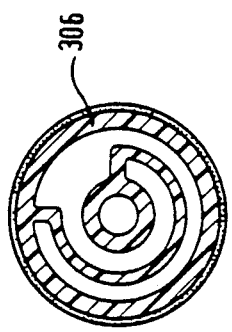

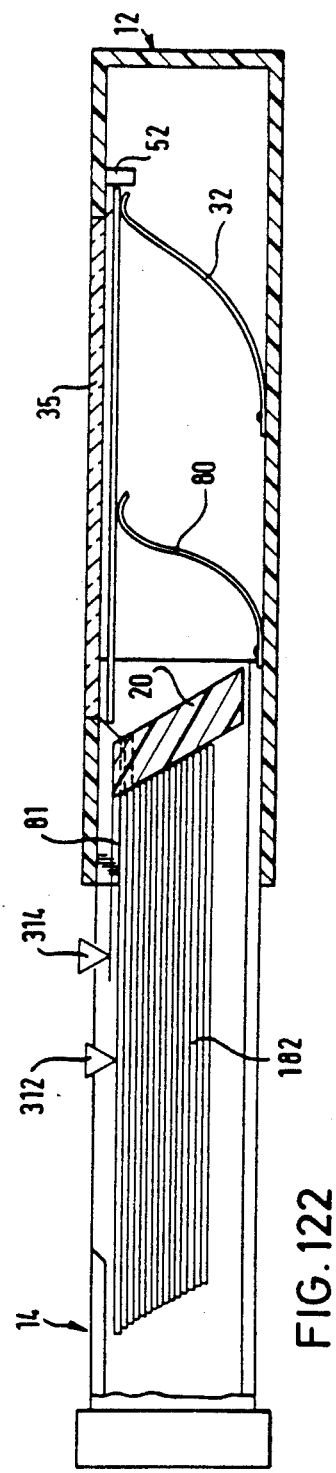
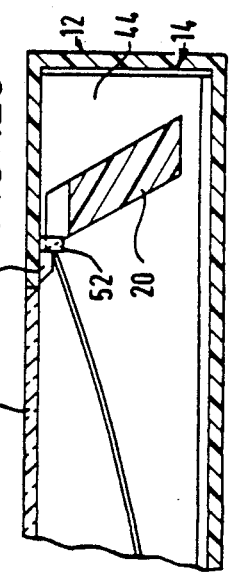
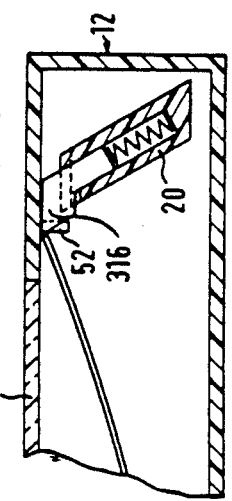
FIG. 122
FIG. 123
FIG. 124

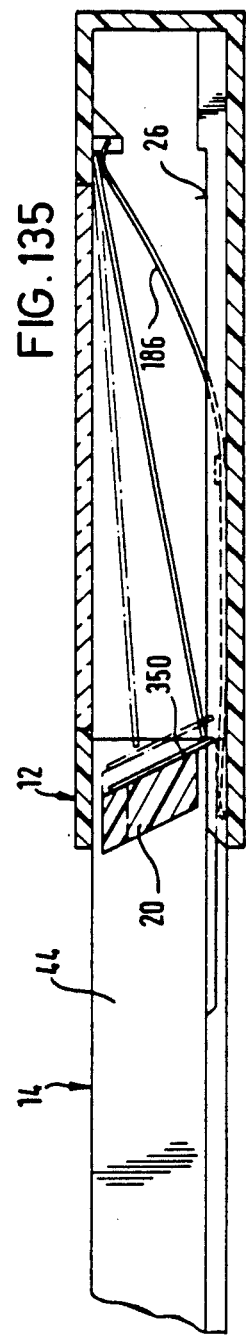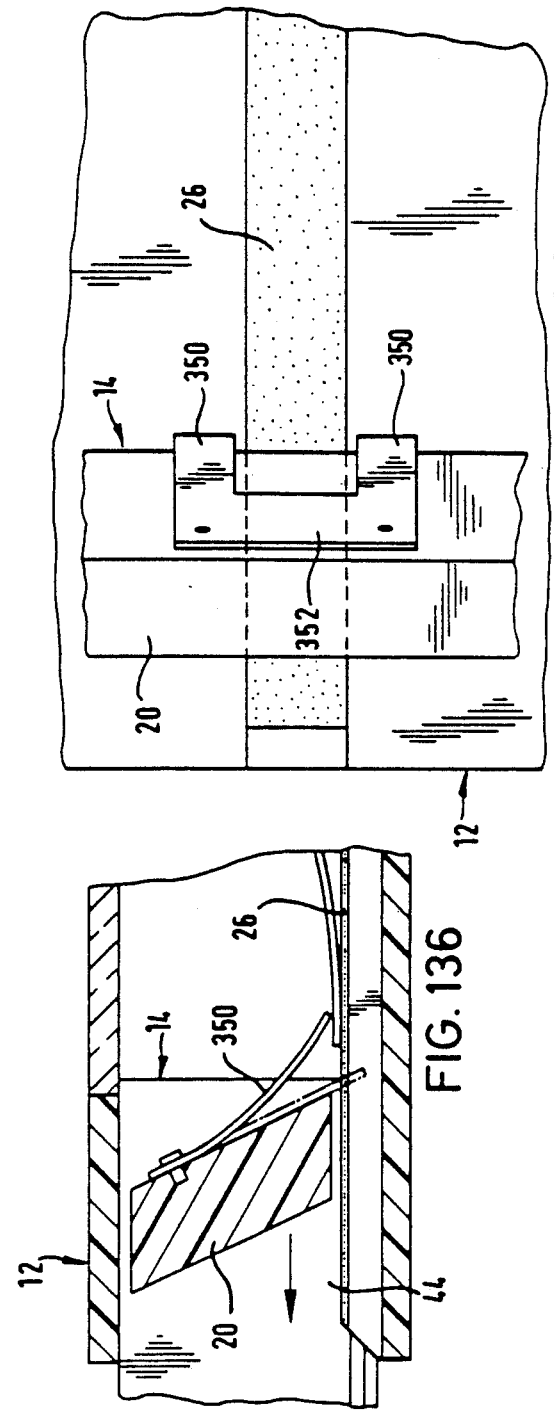

CYCLIC REARRANGEMENT DEVICE FOR STACKED RECTANGULAR SHEETS

CROSS-REFERENCE TO RELATED APPLICATION

This application is a continuation of copending U.S. Patent application Ser. No. 07/216,153, filed July 7, 1988, now U.S. Pat. No. 4,879,825, which is a continuation of U.S. Patent application Ser. No. 06/897,763, filed as PCT EP85/00615 on Nov. 11, 1985, now U.S. Pat. No. 4,759,142.

BACKGROUND OF THE INVENTION

The invention relates to a device for the cyclic rearrangement of a pile of rectangular or square sheets, or a so-called "picture-changer".

Picture changers are known from U.S. Pat. Nos. 4,238,898, 4,238,899, 4,241,588, 4,241,529, 4,245,417, 4,259,802 and 4,376,348. These patents are all based on the principle that a pile of pictures, especially photographic prints, is held by two frame parts that are movable relative to one another, one of which may have a viewing window During each complete cycle of movement of the frame parts, that is, pulling them fully away from each other and sliding them fully back together again, one picture is removed from one end of the pile and returned to the other end of the pile again. The picture changers have the following components for this:

A feeding means feeds pictures to a separating means; the separating means detaches an individual picture from the pile; a retaining means holds the individual picture separated from the pile in one of the frame parts whilst the remainder of the pile is held in the other frame part; a guide means guides the separated individual picture such that it goes onto the other end of the remainder of the pile.

Photographic prints currently have a thickness of approximately 0.25 mm and have a tendency to cling to one another with considerable force as a result of static charging of their plastic coatings or when their surface is still damp following processing; this happens particularly in the picture changers already mentioned, where the pile of prints is pressed against a viewing window and static charges are generated by the change-over operation. Adhesive forces of up to 300 g may occur and these have to be overcome by what amounts to a shearing action when separating the sheets. In order to be able to undertake trouble-free separation of the sheets under these conditions in a picture changer for photographic prints, it is therefore necessary to generate a correspondingly high shearing force between the sheet that is to be separated and the sheet of the remainder of the pile that immediately follows it in the pile.

Photograph changers are mass-produced parts, chiefly assembled from injection-moulded plastic parts, and are subject to relatively large manufacturing tolerances. In addition, they are subjected to considerable mechanical stress through handling and to considerable thermal stress, for instance from exposure to sunlight, which in use may lead to deformation of the components which are usually of thinwalled construction for reasons of cost. Added to this is the fact that photographic prints are not only, as already mentioned, very thin, but also warp and bow on all sides under the influence of humidity and fluctuations in temperature.

SUMMARY OF THE INVENTION

It is the aim of the invention to design the separating means in a picture changer of the type defined in the introduction in such a manner that, even in the case of very thin sheets, such as photographic prints that are liable to undergo deformation, and despite manufacturing and usage tolerances resulting from the use of inexpensively manufactured plastics parts, it guarantees a troublefree functioning in continued operation, that is to say, is able to apply even the high shearing forces.

According to the invention, a device for the cyclic rearrangement of a pile of rectangular or square sheets, especially a pile of photographic prints, is provided with a first and a second frame part which may be moved relative to one another and parallel to the main plane of the pile, and with means that, on movement of the frame parts backwards and forwards, remove an individual sheet from one end of the pile and add it to the other end of the pile again, these means comprising:
(a) a separating means for separating the individual sheet from the pile,
(b) a feeding means for feeding sheets to the separating means,
(c) retaining means for holding the individual sheet in the first frame part and the remainder of the pile in the other frame part, and
(d) a guide means for guiding the separated individual sheet for the purpose of returning it to the other end of the remainder of the pile, wherein the separating means comprises a first separating element and a second separating member which, resiliently biassed towards one another, define a through gap which for the entrY of the sheet being separated has a spacing greater than the thickness of one sheet and less than the thickness of two sheets, and the spacing is, as appropriate, maintained during the outward movement of the frame part or is reduced to the thickness of the sheet which, is separated.

BRIEF DESCRIPTION OF THE DRAWINGS

The invention is explained in detail below with reference to the drawings.

Two complete embodiments will be described first of all. An explanation of alternative designs of the separating means then follows. Finally, designs for the individual functions that differ from the embodiments shown in FIGS. 1 to 34 are described, namely the feeding means, the retaining means, the guide means and the removal of the complete pile from the changer.

FIGS. 1 to 10 illustrate a first complete example of execution, wherein

FIG. 1 is a partially cut-away plan view of the device, pulled partially open,

FIG. 2 is a section along line 2—2 of FIG. 1,

FIG. 3 is a section along line 3—3 of FIG. 1,

FIG. 4 is a section along line 4—4 of FIG. 1,

FIG. 5 is an analogous section through only one frame part,

FIG. 6 is a section along line 6—6 of FIG. 1,

FIG. 7 is a partial section through the separator bar,

FIG. 8 is a partial front view of the separator bar,

FIG. 9 is an enlarged partial view of a subassembly from FIG. 1,

FIG. 10 is a plan view of the subassembly shown in FIG. 9.

Analogously to FIG. 9, but in two operating positions, FIGS. 11 and 12 illustrate a subassembly of alternative design.

FIGS. 13 to 33 relate to a second example of execution, wherein

FIG. 13 is a plan view, similar to FIG. 1, but in the left half of the Figure the frame parts are pushed together and in the right half they have been pulled apart, FIG. 14 is a longitudinal section along line 14—14 of FIG. 13, FIG. 15 is a cross-section along line 15—15 of FIG. 13, FIG. 16 shows in plan view, and FIGS. 17 and 18 show in section, a detail of the frame parts, FIG. 19 is a longitudinal section and FIG. 20 a plan view of a further detail, FIGS. 21 and 22 show, analogously to FIGS. 19 and 20 respectively, an alternative construction of the same functional subassembly, FIGS. 23 to 25 show in simplified longitudinal section the sequence of a separating operation, FIG. 26 shows in perspective and FIG. 27 shows in partial plan view a further detail of the device, FIGS. 28 and 29 show a further detail substantially schematicized, FIG. 30 shows a partial perspective view and FIG. 31 shows in side view a further detail, and FIG. 32 shows in side view and FIG. 33 in plan view a subassembly inserted in the housing frame part.

FIGS. 35 to 50 show separating means of modified design, wherein the type of view (longitudinal section or cross-section, partial view etc.) will either be obvious to the expert, from a consideration of the preceding Figures, or is specified in each Figure.

The same applies to FIGS. 51 to 96, which illustrate alternative feeding means, to FIGS. 97 to 114, which illustrate alternative retaining means, to FIGS. 115 to 119, which illustrate the principle of length compensation, to FIGS. 120 to 136, which show details and alternative solutions for the guide means, and finally to FIGS. 137 to 143, which show possible ways of removing the complete pile from the changer.

DETAILED DESCRIPTION OF THE INVENTION

FIGS. 1 to 10 relate to a first embodiment which is described in detail hereinafter with all components co-operating.

Figure 1:
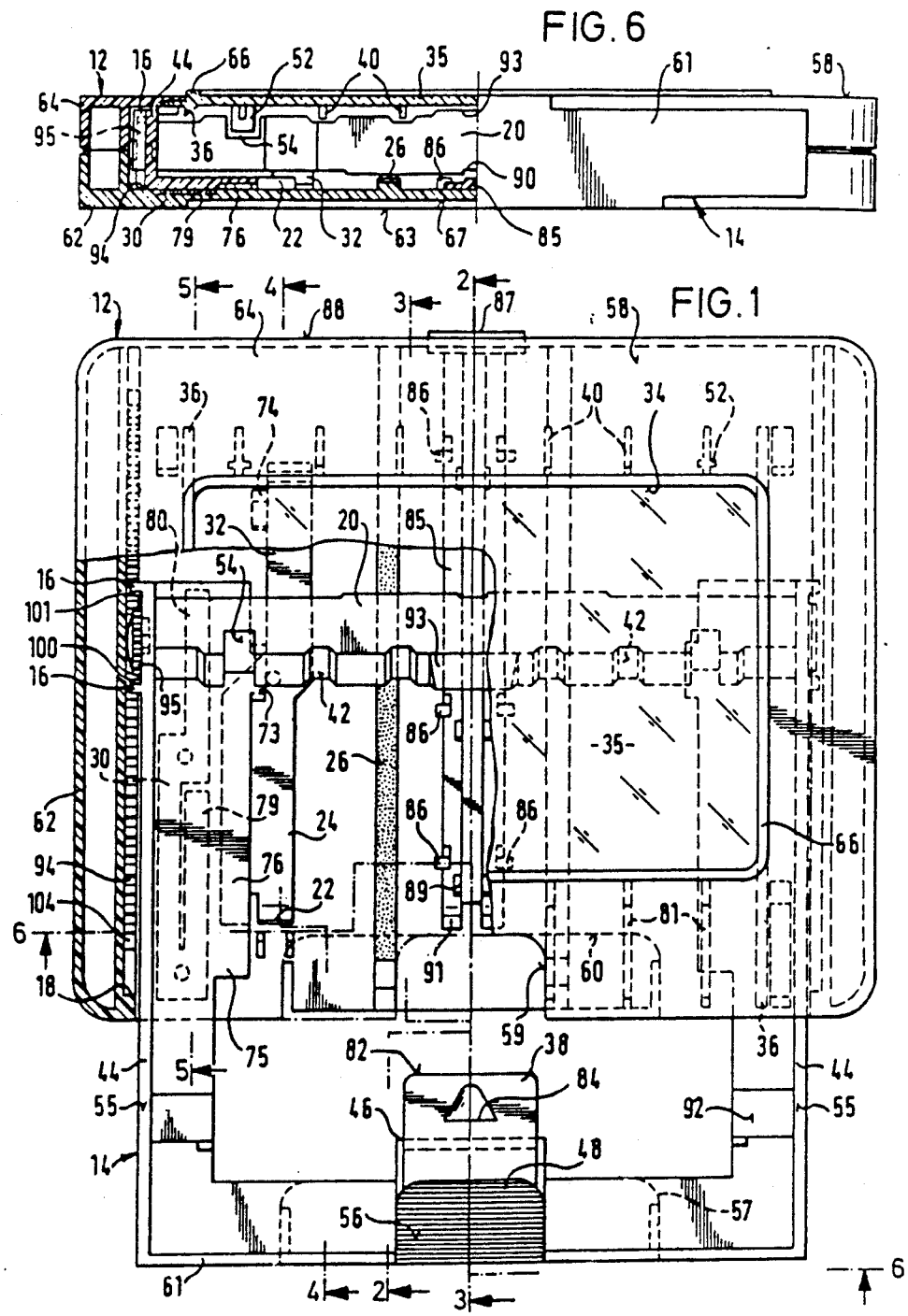

FIG. 1 shows in a plan view, partially cut away, a device according to the invention. The first frame part is designed as a housing 12, the second frame part is a slider member 14 which can be pulled out of the housing for a distance limited by stop members 16 on the slider member and complementary stop members 18 on the housing and pushed back in again. The separating means is formed by a separator bar 20 The feeding means is embodied by hook-like members 22 which are located on leaf-spring type spring arms 24. The retaining means for holding the remainder of the pile in the slider member is likewise formed by the separator bar, whilst the separated individual picture is held in the housing by the co-operation of rails, arranged fixedly in the housing and provided with a retentive coating 26, with rollers 28 that hold the individual picture firmly against the rails and are caused to rotate as a result of contact with the rails. Finally, the guide means is embodied by pairs of leaf springs 30 and spring arms 32, the spring arms 32 being formed integrally with the spring arms 24.

In the inserted state of the slider member 14, the spring arms 24 and 32 press the pile of sheets (not shown in FIG. 1) against a viewing window, the inner border of which is denoted by 34. The sheet which is then uppermost in the pile, in a specific case a photographic print, is intended to lie as flat as possible; to that end, at its periphery it is supported in a plane that is defined by lateral ribs 36, by the underside of a slidable catch 38 and, at the opposite end, by ribs 40 moulded on the housing.

FIG. 1 shows the partially withdrawn position of the slider member 14. In the inserted state, the separator bar lies on the other side of these ribs 40; however, because it projects further towards the window 35 which corresponds to the height of these ribs, it has recesses 42 so that the ribs are able to pass through.

The edges of the pile are supported laterally, (that is, parallel to the withdrawal direction) by side pieces 44 of the slider member. At the front, that is, on the side of the slider member that is furthest away from the housing when the slider member is withdrawn, the edges are supported by the stop face 46 of a centrally arranged grip part 48 that the user may grip and by lateral stop faces 50 on the slider member. At the opposite end, the edges of the photographs are supported against stop members 52 moulded on the housing, for the passage of which the separator bar likewise has recesses 54 that are substantially deeper than those for the ribs 40.

The rib 36 extends further into the interior of the slider member than the height that is defined by the top edge 55 of the side pieces of the slider member so that the photographs are unable to slide out laterally over the side pieces of the slider member. An analogous action occurs between the separator bar on the one hand, the ribs 40 on the other.

The grip part 48 has a top part 56, arranged on the window side of the housing, and a bottom part 57 which is wider than the top part; the top wall 58 of the housing surrounding the window in the manner of a frame has a cut-out 59 in the region of the top part whilst the opposing housing wall is recessed at 60 in a complementary manner for the bottom part 57. Accordingly, in its closed state the device has a closed, substantially rectangular outline without any protruding parts.

The housing and the slider member are injection-moulded plastic parts. The slider member is a one-piece element, comprising side-pieces, separator bar, grip part and a front wall 61 joining the grip part to the side pieces, which are of L-shaped cross-section.

The housing is composed of three parts: the bottom shell 62 providing the floor 63, the frame-like upper shell 64 with the window aperture, and the window 35 set into this. The housing is reinforced in the direction of the slider member movement in that the struts between the top and bottom wall are constructed as double supports, as shown in FIG. 6. The housing parts can be welded together, or a snap-fit connection may be provided.

Around its main surface the window has a narrow border 66 that protrudes slightly outwards, so that it is somewhat proud in respect of the frame surrounding it. A recess that is complementary with the outline of this border on the outside of the opposite bottom wall is denoted by the numeral 67 and permits several housings to be stacked one on top of the other.

When the slider member is withdrawn from the housing, it is gripped using one hand at the top and bottom parts of the grip part, whilst the other hand holds the housing The hook-like members 22 engage the front edges of the photographs lying on the spring arm ends, that is the edges furthest away from the separator bar, as a result of which a certain number of photographs, depending on the height of the hook-like members, is fed to the separating means. This is basically formed as a through-gap which is defined, firstly by (in this embodiment) two lands 68 moulded on the base of the housing on the inside and, secondly, by the underside of shoes 69 that oppose the lands, the shoes being inserted into the separator bar and shown in FIG. 7 in section and in FIG. 8 in front view.

Each land 68 is associated with a respective shoe 69 and the land/shoe arrangements are located on both sides of the plane of symmetry 70 of the device. The shoes are guided longitudinally in the separator bar, are supported on a knife-edge-like bearing and biased by an inserted wire spring 71. Each shoe additionally accommodates a small roller that is rotatable about an axis at right angles to the withdrawal direction and the small roller 28 projects slightly from the shoe.

FIG. 3 shows the position of the lands 68 which protrude by fully the thickness of a photographic print further above the level of the base of the housing than the surface of the retentive coating 26. In the rest or closed position of the slider member, the lowermost portion of the shoes is spaced somewhat from the edge 72 of the land, and the surface of the separator bar facing towards the pile is sloped, somewhat like a wedge, such that, as the separator runs onto the edge of the pile, the photographs, on the opposite edge of which the hook-like members 22 are acting, "migrate" downwards along the oblique face towards the edge 72 of the lands facing them. There is sufficient room between the shoes 69 and the retentive coating 26 for the leading edge of a single photograph alone (the lower-most in the pile) to be able to enter the gap forming between the shoes 69 and the retentive coatings 26, for as long as this gap is held open by the land 68 as will be explained. All the other photographs transported with the hook-like member 22 come up against the separator itself or against the shoes thereof with the result that the hook-like members slip off the end edge of the photographs.

When the rear edges (in the withdrawal direction) of the shoes 69 have passed the edge 72 of the lands 68, the shoes drop under the action of the wire spring 71, the rollers 28 positioning themselves on the individual photograph that has been separated in this manner and pressing it onto the associated retentive coatings so that it is firmly held in the housing, that is, the first frame part. The remainder of the pile is transported by the separator together with the slider member to the outside until the slider member has been fully withdrawn.

Care should be taken therein that the separator bar also runs over the spring arms 32. So that they do not stress the separated picture from below during the passage of their ends acting on the pile, during a certain phase of the withdrawal movement they are pressed mechanically towards the housing floor. Spring-depressor members 73 moulded on the slider member side pieces 44 are used for this purpose; these spring-depressor members pass over projections 74 extending laterally from the spring arms and hold the arms corresponding to their length for a part of the withdrawal movement. Further spring-depressor members 75 on the slider member side pieces run onto the spring arms 24 at the enlarged portion 76 as soon as the individual photograph has been safely held between the retentive coating and the rollers, and press these arms likewise away from the viewing window so that further photographs can be introduced and others removed without hindrance.

On the side of the separator furthest from the pile the spring arms 32 are released again after travelling a short distance so that they again act from beneath the separated photograph and guide its trailing edge gradually towards the window. Finally, this edge positions itself under the influence of the springs against the upper side of the housing. Because the free ends of the spring arms are rounded, but this edge shall on the other hand be firmly held at the position it has reached, a short portion of the spring arms is additionally of linear formation, denoted by 77 in FIG. 4. The rounded spring arm end finds space in a recess on the inside of the top wall of the housing, denoted by 78 in FIG. 5

The two hook-like members 22, the two shoes 69, the retentive coatings 26 and the spring arms 32 are all in each case arranged symmetrically with respect to the central plane of the device as a whole, and the two hook-like members 22 lie as exactly as possible on a line that is at right angles to this plane of symmetry. This means that the photograph to be changed then goes through the change-over operation without becoming twisted even when it is not guided by the slider member side pieces because it has dimensions smaller than its nominal ones. The dimensional tolerances of photographs are in fact, with the same nominal size, different in the transverse and longitudinal direction: since the processing firms work with photographic paper from rolls of very accurately defined width and then cut the photographic paper up into different lengths, it is preferable to have the closer toleranced dimension of the photograph in a direction appropriate to that in which the slider member moves.

The complete separated individual picture, which until now has been described as being held only at its one edge, is lifted towards the window. For this, the leaf springs 30 already mentioned having forwardly-positioned arms 79 and rearwardly-positioned arms 80 are used, these arms holding and supporting the individual photograph, as seen clearly from FIG. 5, in such a manner that it is able to return to the pile again as the slider member is pushed back in. In the closed state of the device and during the withdrawal movement of the slider member, at least during the initial part thereof, the spring arms 79, 80 are pressed by the side pieces of the slider member into complementary grooves in the housing floor, which may be seen in FIG. 6.

At the start of the return movement of the slider member, the individual photograph is held by the spring arms 32 in front of the stop members 52 moulded on the housing and is supported in the direction of the separator bar at four points by the spring arms 79, 80. The other transverse edge of the photograph facing towards the separator bar may hang down; the side of the separator facing it is, however, sloped, somewhat like a wedge, so that the edge is raised gradually as the separator bar runs onto it. Between the top edge of the separator bar and the top wall of the housing there is a gap which is generously dimensioned for the passage of the photograph. The risk of the photograph striking against the edges facing it of the remainder of the pile transported by the slider member is countered by the top wall of the housing having holding-down lugs 81 on its inside which hold the pile below the level of the top side of the separator. These holding-down lugs are aligned with the ribs 40 so that they pass through the complementary recesses 42, 54 of the separator bar.

The slidable catch 38 is mounted so as to slide in the grip part and is biased by a spring towards the housing, as readily recognisable from FIG. 3. As the slider member is inserted, the free edge 82 of the slidable catch strikes against a stop member 83 provided in the housing, as a result of which the slidable catch is pushed back into the grip part and does not project into the space visible through the housing window. Once the slider member has been pulled out, however, the slidable catch prevents the photographs lying in the slider member from falling out. To change the photographs, the slidable catch can be pushed back manually, which is facilitated by the finger-engageable edge 84. The photographs may be pushed out from the underside of the slider member by getting hold of them between the side pieces, or they may be grasped from above next to the grip part.

In the case of the procedure described so far, the separated photograph always remains behind in the housing. It is not possible, or only possible with difficulty, to remove this from the device. In order to be able to remove the pile even when this consists of one picture only, a special arrangement is therefore provided.

A control bar 85 is slideably mounted in the housing, held by retainers 86 moulded on the housing. The bar carries an actuating or control key 87 which passes through the rear wall 88 of the housing and projects slightly beyond the outline of the change-over device. By applying pressure with the finger to the key, the bar runs on wedge-like guide members 89 on the housing floor and is thereby lifted towards the window. The width of the bar fits exactly into a complementary recess 90 in the separator and blocks, for the entire withdrawal movement of the slider member, the through-slot of the separating means, so that every picture located in the device has to be transported out with the slider member. Close to the outer end position of the slider member, its separator bar runs over an upwardly-projecting part 91 of the bar which yields resiliently downwards; if the slider member is now pushed back in, the separator bar first pushes the bar back into its initial position, before it can be freely guided back with the upwardly-projecting part 91 being deflected again.

As mentioned above, the photographs are intended to be held by the means described at a distance from the window pane so that during the change-over operations it does not come into contact with the surface of the picture, causing scratch damage to occur. There is still this danger, however, because the photographs are not always flat, but generally speaking are bowed either in the longitudinal or in the transverse direction. In the case of bowing in the longitudinal direction, the ribs 36 effective for the entire withdrawal movement are sufficient. In the other case, however, the slideable catch is effective but the opposite portion of the separator bar would hardly be able to absorb the considerable stresses which occur in a relatively thick pile of similarly bowed photographs.

For this reason the following measures are taken in addition:

Beneath the stop faces 50 the front wall of the slider member therefore has, near the side pieces 44, inclined faces 92 which are substantially parallel to the separator slope lying opposite. The photographs thus lie so that they are staggered obliquely between separator and inclined faces, so that most of the stresses in the pile are distributed over the entire surface of the separator. In addition, in the centre of the separator bar a projection 93 is provided which takes up the residual stress of those photographs which are supported against the stop faces 50 perpendicular to its edge.

Once the user has begun to carry out the changeover movement, this must be completed in order to bring the device back into the initial position. The slider member cannot therefore be pulled out halfway and then pushed in again.

This is effected by means of a mechanism which is shown in detail in FIGS. 9 and 10. Moulded onto the housing there is a toothed rack 94 with which a pinion 95 meshes, the pinion being integrally-formed with its shaft 96. The shaft fits in a slot 97 running parallel to the rack in the side piece 44 of the slider member, in which slot it is pressed and held by means of a small leaf spring 98, moulded onto the pinion, and resting against the housing.

The slot 97 is divided by means of a rib 99 into two parts, in which the shaft 96 has only a little lateral play. Finally, moulded onto the slider member on both sides of the slot there are locking lugs 100, 101 which lie in the plane of the toothed circumference of the pinion and the points of the lugs are engageable with the latter.

This mechanism operates in the following manner:

Let it be assumed that the pinion is in the position shown in FIG. 9 and that when the slider member moves in the direction of the arrow 102 the pinion rotates in the direction of the arrow 103. Owing to the friction of the small spring 98 on the housing wall the pinion is thereby held near the centre of the slot with its shaft resting against the rib 99. The result is a spacing, although this is small, between the circle defined by the tips of the teeth of the pinion and the point of the lug 101. If an attempt is now made to move the slider member in the opposite direction, the pinion is displaced to the outer end of the slot and its further movement immediately blocked by the point of the lug 101. At the end of the travel of the slider member, however, the toothed circumference of the pinion meets a stop sector 104 and, with the small spring 98 being deformed, is lifted over the rib 99, so that now rotation only in the opposite direction is enabled.

It is important to note that over the greater part of the withdrawal travel of the slider member the retaining means is indeed embodied by the rollers 28 in conjunction with the retentive coatings 26, but over the last part of the travel, shortly before the end position is reached, the spring arms 32, by firmly holding the individual photograph, also act as an "extension" of the retaining means.

As is apparent from the preceding explanation, each rearranged sheet is never released during the whole changeover cycle, but is held at at least two points and thus secured against rotation. It is thus constantly under control, in this case with means symmetrical to the axis.

The limbs of the slider member side pieces which are parallel to the pile and on which the separated sheet supports itself during rearrangement, should be at the most at such a distance from each other that a short photograph, which rests with one edge just against a limb of a side piece perpendicular thereto, is still held by the opposite side piece on the other edge.

As mentioned above, the device has the viewing window in the upper shell of the housing. The dimension of the window is then at the most so great in the direction transverse to the direction of movement that the shortest possible photograph, even if it is lying off-centre, does not present itself with its edge in the field of view. The same applies to the ribs 36, and just the same considerations apply to the spring arms 79 and 80 and especially to all components engaging with the sheet surfaces.

The construction of the spring system which is described above and illustrated, formed by the springs, cut in one piece and arranged symmetrically in pairs, with the spring arms 24 and 32, fulfils a total of five functions. Firstly, the hook-like members 22 moulded on them form the feeding means, the hook-like members finally taking along only one sheet into the separating means. Secondly, both arms together - or more accurately, the four arms of the two springs - form a bias system with which the pile is neatly pressed against the window when the device is at rest. Thirdly, the arm 32, after it has been passed over by the separator, serves to convey the individual sheet to the housing top wall and there, fourthly, hold it firmly. Fifthly, and finally, the arms 32 are arranged close enough to the retentive coatings 26 to be able, as a result of their bias force, to displace or peel off from the retentive coating any individual sheet which might adhere to the latter owing to a static charge. It is to be noted that the arm 32 is so shaped and arranged that it can be passed over by the separator bar without any disturbance to smooth operation.

FIGS. 11 and 12 show an alternative form of the blocking means according to FIGS. 9 and 10. Of the frame parts, in each case only sections 12 and 14 lying opposite each other are indicated In one of the frame parts, in this case the frame part 14, a jamming-action roller 108 is rotatable about a journal 106, which is, however, fitted eccentrically The roller carries opposite its greatest radius a pin 110 over which there is engaged a leaf spring 112 attached to the frame part 14. During movement in the direction of the arrow in FIG. 11 the jamming-action roller can yield, but in the opposite direction it jams the two frame parts. When the frame parts are in the end positions the jamming-action roller meets in each case a recess 114 in the other frame part and can therefore, when the push/pull direction is reversed, pivot freely through approximately 90°, until the pin 110 rests against the spring 112 again.

The two blocking devices described above act in the manner of a free-wheel and they only switch over the direction of free-wheeling when the two frame parts are in the end positions relative to each other. It may happen, however, that a user would like to rectify a faulty operation, perhaps because a pile of photographic prints has shifted during insertion. It is then desirable to be able to displace the frame parts relative to each other in both directions without blocking, at least from certain positions. For this reason a different type of construction of the blocking device is provided in the preferred example of execution described below.

Figure 13:
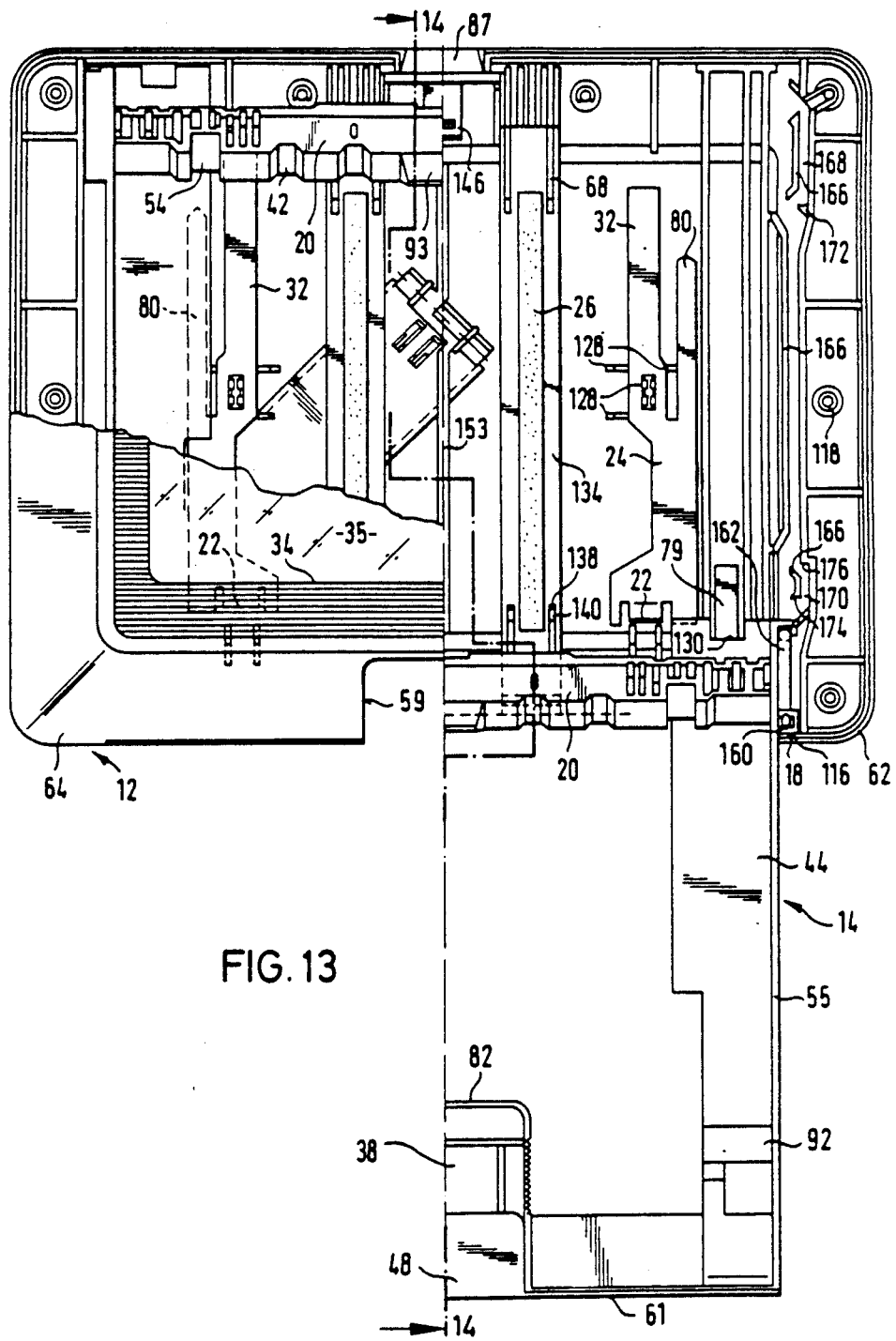

In FIGS. 13 to 15, the embodiment is illustrated in its totality. The slider member 14 is housed in the housing 12 so that it can slide; the housing 12 forms the first frame part, and the slider member 14 the second. The withdrawal travel is limited by means of a bearing eye 116 which is moulded onto one of the side pieces 44 of the slider member and runs onto a stop member 18 in the housing The housing is screwed together from an upper shell 64 and a bottom shell 62, the outer rims of which engage in an interlocking manner with each other, in the region between the side pieces 44 of the slider member and the outer edges of the housing which are parallel thereto. For this purpose, the bottom shell has in each case moulded-on guide sleeves 118 for screw shanks 120 and also recesses 122 on the outside for screw heads 124, while the upper shell carries for this purpose coaxially moulded-on bushings 126 in which the screws cut their own thread The window 35 is clipped into the upper shell 64 and the parts of the upper shell lying beneath its outer border areas are not visible, owing to the fact that these areas of the window are frosted. In FIG. 13 the outline of the central transparent portion of the window is marked by 34.

With regard to operation, there are few differences compared with the example of execution according to FIGS. 1 to 10, so that it is sufficient to explain only the significant deviations.

In this case the spring arms 24, 32 and 80 are combined into a stamped and bent part, positioned by means of projections 128 and fixed by crimping without the application of heat The spring arms 79, however, are separate components which as shown in FIGS. 16 to 18 are positioned on the bottom shell by means of moulded-on projections and fixed by crimping without the application of heat. In order that this spring arm arrangement can raise up the separated picture as early as possible, the corresponding side piece 44 of the slider member has recesses 130. Secure holding of the separated picture is ensured during this phase of the changeover cycle by means of the spring arms 80, which bear the extreme edge of the picture remote from the slider member upwards like a bracket.

Figure 19:
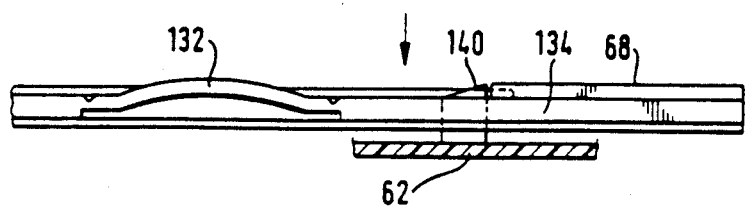
Figure 20:
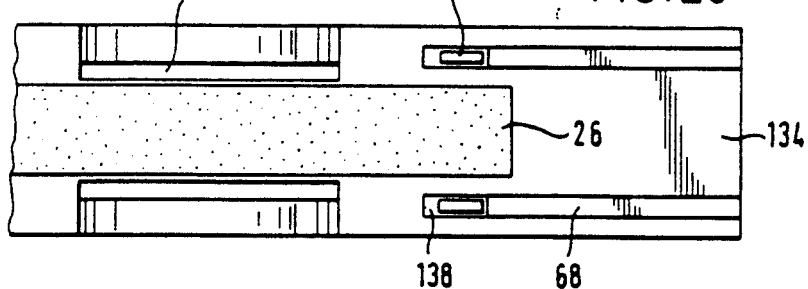
Figure 21:
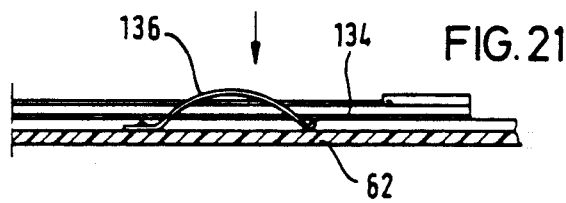
Figure 22:
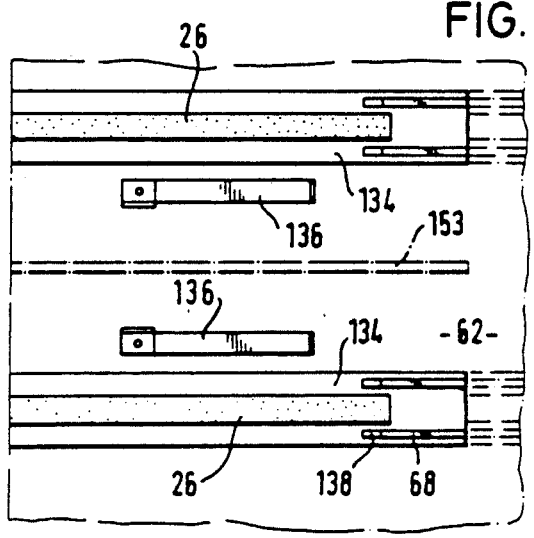

In certain circumstances, the retentive coating 26 may hold the separated picture so firmly that the force of the spring arms 79 is not sufficient to lift up the edge of the picture facing towards the slider member. FIGS. 19 and 20 show a first possibility for additionally pushing this edge away from the retentive coating: the two strips of retentive coating are each arranged on a separately produced bar 134. On each side of the strip 26, the bar has moulded-on resilient bridge portions 132 which after the separator bar 20 has passed over them spring out upwards and lift the edge of the picture. Alternatively, as shown in FIGS. 21 and 22, separate metal leaf springs 136 may be provided.

The shape of the bars 134 can be seen from FIGS. 32 and 33. It is to be appreciated that they are mirror-symmetrical in shape and therefore have lands 68 at both ends with edges 72. The reason for this is that when the bars are to be coated automatically with the retentive coating no sorting is necessary. In addition, apertures 138 must of course be provided, through which project guide or wedge-like projections 140 for the separator bar which are moulded onto the bottom shell of the housing on the end at which it is gripped by the user. The bars are fixed in the bottom shell by pressing the lugs 142 into corresponding channels in the bottom shell of the housing, and they are accurately positioned by means of one of the two pins 144, namely by means of the pin remote from the grip part of the slider member, while the other pin has associated with it a slot in the housing.

The bars 134 at the same time form the guide for the control key 87 arranged in the plane of symmetry, the shape, arrangement and operation of which is illustrated schematically in FIGS. 23 to 25. FIG. 23 shows the operating position, that is to say, in this position of the control key 87 the normal changeover operation occurs. The control key 87 carries a projection 146 which points towards the separator bar 20 and has an incision 148, to complement which there is a double-faced projection 150 on the underside of the separator bar 20. If the control key 87 is now pressed while the slider member is held firmly, its projection 146 springs out in a downward direction until the double-faced projection 150 locks into the incision 148 (FIG. 24, left). The locking lug 152 projecting downwards from the projection 146 now blocks the separating means for the edge of the bottom picture in the pile, so that when the slider member is pulled the hook-like members 22 slide away from the edge of this picture also when the separator bar together with the control key 87 acts on the edge of the pile nearest to it and takes the pile along with it (FIG. 24, centre). Near the outer end position of the slider member 14, the locking lug 152 meets a recess 154, while the control key guide lugs 158 run onto a stop member 156. The projection can accordingly spring out downwards when the slider member is pulled further, and thus release itself from the separator (FIG. 24, right) When the slider member 14 is pushed in again, the control key is freely movable, so that the double-faced projection easily pushes the key in front of itself, until the key has reached its end position again (FIG. 25).

With reference to FIGS. 9 to 12, two types of construction of blocking means for the change of direction were described. In the present example of execution, blocking means are also provided, but they act only in the "critical" phases of the changeover cycle.

In the bearing eye 116 of the slider member 14 there is pivotably arranged about a journal 160 a control pawl 162 which is guided by a control projection 164 along channels which are defined by guide rails 166 formed on the bottom shell 62, so that the control projection 164 has to follow the path marked by arrows in FIG. 27 during insertion and withdrawal. During the greater part of the changeover cycle the direction of movement may be reversed without hindrance, but not when the control projection 164 is in the channel section 168 during insertion, or in the channel section 170 during the withdrawal. In the first case, if it should be desired to pull the slider member out again shortly before its inner end position, the control projection would run onto the stop member 172; in the latter case if, therefore, the slider member is pushed in again shortly before reaching the outer end position the control projection hits either the stop member 174 or the stop edge 176. It should be noted that the journal 160 is seated in the bearing eye with a degree of friction such as to allow the control pawl to follow the guide bars without any noticeable hindrance, but not to be able to swing freely.

FIGS. 28 and 29 show the shape of the co-operating parts of the separator bar and of the bars 134 with a retentive coating. In the rest position (FIG. 28), thus with the slider member 14 completely pushed in, the shoes 69 sit laterally on the bars, while the pressing rollers 28 project into a recess behind the retentive coating so that their bearings are relieved of their loading and no deformation can occur because of cold flow. At the beginning of the changeover cycle (FIG. 29), the rollers then run first onto a land 178 and are thus lifted up to the level of the surfaces lying in front of the retentive coating 26, while the shoes are on the level of the land 68. The difference in level between 68 and 178 is of operational significance, since it is matched to the thickness of the pictures; both levels are on the same injection-moulded part, so that the tolerancing is extremely good, and there is no problem regarding the running of the rollers 28 onto the edge of the picture.

FIG. 30 shows the end of the spring arm 24 with the transporter in the form of hook-like member 22. Extending on both sides of the transporter there are also projections 180 which are intended to rest against the picture from below and thus prevent the occurrence of the situation indicated by broken lines in FIG. 31, namely when a severely bowed picture fits so deeply into the hook-like member 22 that the latter can no longer slide away from the edge. This possibility must however be offered, so that the whole pile may be removed by means of the control key 87.

Figure 34:
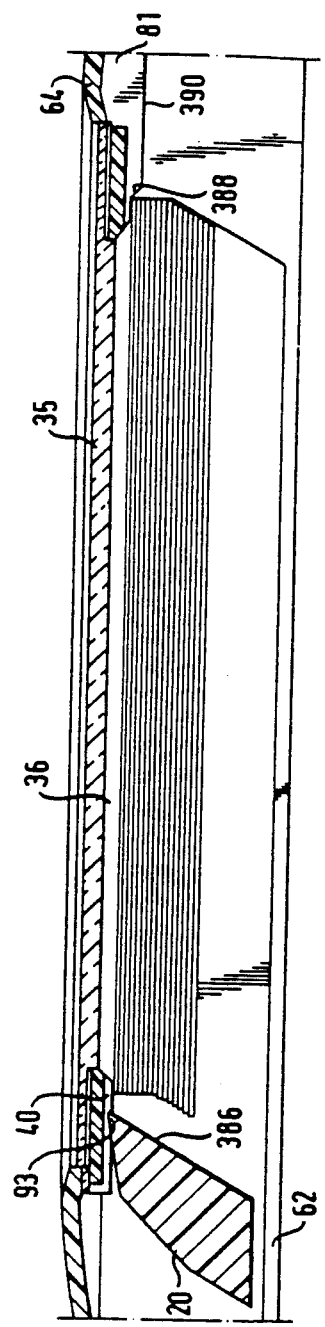
FIG. 34 shows in simplified longitudinal section the position when the changer is pushed together.

FIG. 34 shows in a simplified and enlarged view a longitudinal section through the pushed-together device. As in FIGS. 1 to 10, here too the separator bar has centrally a projection 93 which engages between holding-down means 40. When, as the slider member is pulled out, however, the topmost picture is still supported only laterally by the ribs 36, there is a risk that the topmost picture, or even several pictures, will slip off the separator. This is prevented by the holding-down 81 means on the housing having additionally an inclined step member 338 which checks at least the topmost picture for sufficiently long for its opposite edge to come to rest against the bottom side 386 of the separator and be gripped by the projection 93 thereof Because of the friction of the picture on the bottom surface 390 of the holding-down means 81, this state is maintained even when the pictures (photographic prints) are greatly bowed.

In the remainder of the drawings the view is very schematic and is restricted in each case to what has been modified; the reader will be able to supplement the remaining components from FIGS. 1 to 34 accordingly.

FIGS. 35 to 50 show alternative separating means.

It is common to all the embodiments shown here that the through gap for the entry of the sheet being separated is fixed by means of a mechanical stop member to the defined value of the passage spacing. During the further course of the changeover cycle, the passage spacing may either be also maintained by means of a system of stop members, or the gap may close resiliently over the separated sheet, so that the latter itself defines the passage spacing.

FIG. 35 shows a photograph changer in a schematic longitudinal sectional view, and FIG. 36 is a corresponding partial transverse section. The first frame part is in the form of a housing 12 on which a first, stationary separating member is moulded in the form of a rib 238 which is located on the floor 218 of the housing. The second separating member is formed by a separator bar 20 which is moulded on a slider member 14 displaceable relative to the housing and forming the second frame part. The slider member 14 is pressed in the direction of the floor of the housing, and thus in the direction of the ribs 238, over its entire withdrawal travel distance by a system of leaf springs 240 which is mounted in the housing.

When the slider member is completely pushed in, however, the separator bar meets a land 68 which is higher by a good photograph-thickness than the rib 238 with which the spacing of the gap is defined. After the edge 72 of the land 68 has been passed, the springs 240 press the separator bar 20 as far as the surface of the separated sheet 188 which faces towards it. In FIG. 36 can also be seen the side pieces 44 of the slider member, between which the separator bar extends and on which it is integrally formed.

The embodiment according to FIG. 37 (longitudinal section) and FIG. 38 (partial transverse section) differs from that described previously in that not the whole slider member 14 but only a part 242 of the separator bar 20 is pressed in the direction of the floor of the housing 218 by a spring arrangement 71 housed in the separator bar itself, while the slider member is supported in this direction. The operation is otherwise the same.

The embodiment according to FIG. 39 (longitudinal section) and FIG. 40 (transverse section) differs from that according to FIGS. 35 and 36 in that although in this case the slider member is in fact pressed by the system of leaf springs 240 in the direction of the floor of the housing 218, no land is provided on the housing; instead there are moulded onto the separator bar 20, on both sides of the gap 244 for the passage of the sheets, shoes 246 which are supported on the floor 218 of the housing and thus constantly keep the spacing of the gap at the desired value.

The embodiment according to FIGS. 41 (longitudinal section) and 42 (partial transverse section) is a modification of the embodiment in FIGS. 37 and 38. Between the side pieces 44 of the slider member a fixing device 248 is provided which holds a stationary end of a resilient leaf spring 250 clamped in by its wide side. The rounded end of the leaf spring touches the land 68 and after the edge 72 of the latter has been passed moves onto the separated sheet 188.

The embodiment according to FIG. 43 (longitudinal section) and FIG. 44 (partial transverse section) also has a separating member which can be resiliently deflected relative to the slider member 14 and is in the form of a separator bar 20 which is pivotable about a shaft 252 in the side pieces 44 of the slider member, but is held by means of a spring arrangement 240 with its edge 254 resting against the part situated opposite, that is to say, firstly on the land 68 and then, after its edge 72 has been passed, on the separated sheet 188.

The embodiment according to FIG. 45 (longitudinal section) and FIG. 46 (partial transverse section) comprises as the first frame part a housing 12, and as the second frame part a slider member 14. Between the side pieces 44 of the slider member a foot plate 256 is inserted which forms a first separating member. The second separating member is a separator bar 20 which is biased relative to the slider member in the direction of the floor 218 of the housing by a spring arrangement 240, is guided on rails 258, and has stop shoes 246 on its lower end on both sides of the sheet which is to be separated.

FIGS. 47 (longitudinal section) and 48 (partial transverse section) show an embodiment in which the first frame part is formed by a slider member 14 which can slide backwards and forwards relative to a housing 12 as the second frame part. It is to be understood that here again, as with all other embodiments, the maximum travel of the slider member is limited by means of stop members, which are not however shown, for the sake of clarity. Formed in one piece with the housing 12 as the first separating member there is a separator bar 20 opposite which a second separating member is provided in the form of a plate 264 with an articulated mounting (link 260) which plate is pressed by a spring 240 against lateral support projections 262 of the separator bar. The plate 264 can therefore absorb manufacturing tolerances, while the gap height is fixed by means of the height of the projections 262, which is practically invariable.

FIGS. 49 (longitudinal section) and 50 (partial transverse section) show an embodiment in which the housing 12 forms the second frame part and a slider member (not shown) the first frame part. A separator bar 20 is guided on the housing so that it can slide transversely with respect to the principal plane of the pile and is biased by means of a spring arrangement 240. With its support projections 262 it defines the gap height, which is defined on the other side by means of the top wall 266 of the housing.

The separating means described may be fed by means of the feeding means illustrated in FIGS. 1 to 10 and 13 to 34. Their mode of operation, details and alternative designs are explained in detail below with reference to FIGS. 51 to 97.

FIGS. 51 to 63 show the method of operation of the feeding means, and alternative forms and details thereof.

FIGS. 51 and 58 firstly illustrate the principle. In FIG. 51 the first frame part can be seen in the form of the substantially rectangular housing 12 in which the slider member 14 is arranged to slide as the second frame part. The separating means is indicated only symbolically as a separator bar 20. The pile of sheets of like format is indicated by 182.

The slider member 14 comprises a grip part 48, against which rests the front edge of the pile, seen in the direction of movement, and also the two longitudinal side pieces 44 near the separator bar. Between the longitudinal side pieces the members of the feeding means project upwards from the base of the housing 12. The two leaf springs 24 are fixed by one end to the housing; the other end has the inclined face 22 resting against the edge of the pile (see also FIGS. 54, 58). The inclined face is accordingly structurally combined with the bias spring in the springs 24.

If the slider member is now pulled out of the housing, as shown in FIGS. 51 to 58 for the start of the changeover cycle, the inclined face 22, which in the rest state according to FIG. 51 still projects in the region of the grip part 48, then comes to rest against the edge of the pile (FIG. 52). When the slider member is pulled further out of the housing, the topmost sheets in the pile, which are therefore shown as a block, go along with the slider member, while the sheets lying within the field of action of the inclined face are held back until the separator bar 20 meets their opposite edge (FIG. 53).

Pressure is now exerted on the sheets from both edges inwards, on the one hand from the separator bar, and on the other hand from the inclined face of the feeding means. The inclined face can however yield downwards as a result of the resiliency of the springs 24, so that the inclined face slides away on the edges of the sheets lying above the lowest sheet, one edge after the other. On the other hand, only a substantially lower retaining force, or none at all, acts on the lowest sheet from the separator bar, so that with the inclined position of the inclined face 22 and the bias of the springs 24 correctly matched, the force applied by the component of the spring bias which acts in the longitudinal direction of the sheets is sufficient to push the lowest sheet through beneath the separator bar. The adhesive force acting between adjacent sheets, which is an important consideration in the design of the system, is also overcome here.

FIGS. 59 to 63 show in an extensively schematicised view a form of execution in which the feeding means not only assumes that function but in addition also brings the sheet separated from the remainder of the pile into contact with the first frame part, and therefore represents a component of the retaining means.

The frame parts 12 and 14 correspond to a great extent to the construction according to FIGS. 51 to 58. The difference is that on the side of the separator bar 20 facing towards the floor of the housing apertures 184 are provided which allow the passage of a tab 22 moulded on the free end of the leaf springs 24. The tab has the inclined face on the side facing towards the pile, while the spring sections on both sides of it provide for symmetrical supporting. The springs 24 have a backward-facing second free end 186 with a rounded end, and the two lateral auxiliary springs 79 are provided on the floor of the slider member, but beneath the side pieces of the slider member.

This form of execution operates in the following manner:

When the slider member is pulled out, the lowest sheet is presented to the separator bar 20 in just the same way as in the case of the form of execution according to FIGS. 51 to 58. At the same time the spring ends 186 are pressed downwards by the separator bar. After the separator bar has passed over them, they can release themselves from tension and thereby lift up by its rear edge the sheet pushed through under the separator bar. This sheet is indicated by 188. The withdrawal travel of the slider member is so calculated that the spring ends near the tab 22 are still held pressed down by the separator bar while the side pieces release the auxiliary springs 79, so that the latter can also lift up the front edge of the sheet, since this has been carried along by the tab 22 to a position in front of the separator bar (cf. FIG. 63); this edge can therein be lifted up between the side pieces of the slider member and when the slider member is pushed back can slide away over the separator bar, with the other edge of the sheet supporting itself against the stop bar 52.

FIGS. 64 and 65 show diagrammatically that the arrangement according to the invention can also work according to the principle of operational reversal in such a way that the inclined face 22 is for example integrally-moulded rigidly onto the first frame part—which in this case is in the form of a housing—while the spring bias is produced by means of a leaf spring 24 fastened to the opposite wall 210. FIG. 64 shows the rest state and FIG. 65 the start of the withdrawal travel of the other frame part in the form of a slider member, the individual sheet 188 being already separated.

Finally, it should be noted that in the forms of execution described there is an interaction between the bias of the leaf springs which increases with the thickness of the pile and the angle of inclination of the inclined face which alters as well, in such a way that, seen from the separating means, substantially the same conditions obtain independently of the thickness of the pile, that is to say, the retaining force acting on the lowest sheet is substantially independent of the number of sheets in the pile.

The possibility also exists of already preparing the next change while the two frame parts are being pushed together in that the transporter, moved by way of a mechanism, executes an advance movement and thereby already conveys the next sheet to be separated to the separating means, while the preceding one is still returning to the other end of the pile.

Figure 66:
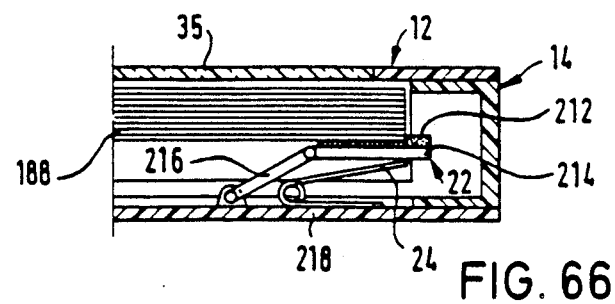
Figure 67:
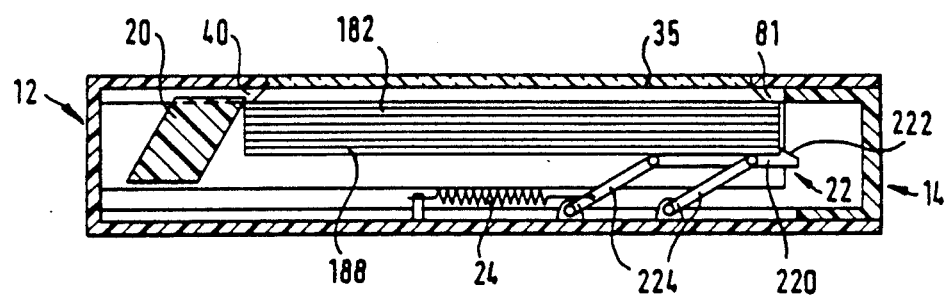
Figure 68:
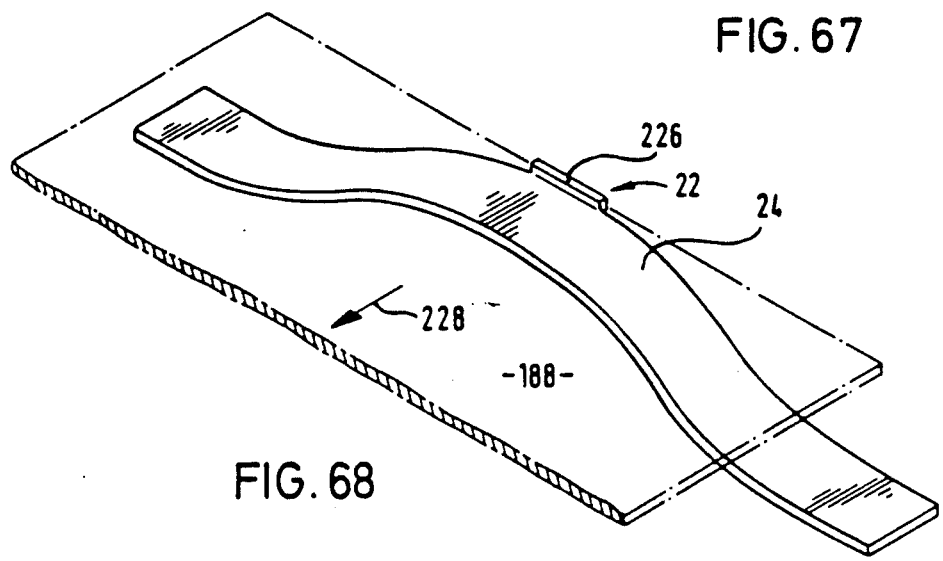

FIGS. 66, 67 and 68 finally show further arrangements of the apparatus according to the invention.

In FIG. 66 the transporter 22 comprises a compressible layer 212 on a carrier plate 214 which is connected by means of links 216 to the floor 218 of one of the frame parts. A coiled torsion spring 24 with projecting ends presses the transporter against the rear edge of the sheet 188 which is to be separated.

According to FIG. 67, the transporter 22 is in the form of a plate 220 which engages with an upwardly projecting edge 222 behind the rear edge of the sheet 188 which is to be separated. The bias arrangement comprises a helical tension spring 24 which is anchored to a fixed point and engages with a parallelogram linkage mechanism 224 to which the transporter plate is linked. In this way the transporter is held independently of the thickness of the pile parallel to its principal plane.

According to FIG. 68, the transporter 22 is a projection 226, protruding from a leaf spring 24 which extends transversely to the direction of movement of the sheet being separated 188 symbolised by means of the arrow 228; here again, the transporter is substantially always in the same working position with respect to the edge of the sheet, independently of the number of sheets in the pile.

Figure 69:
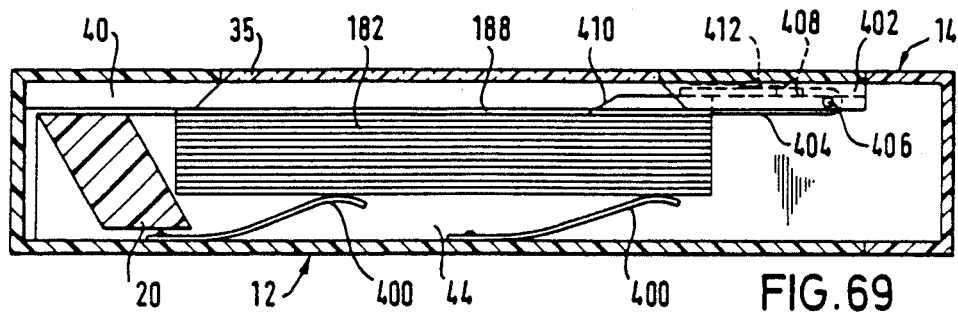
Figure 70:
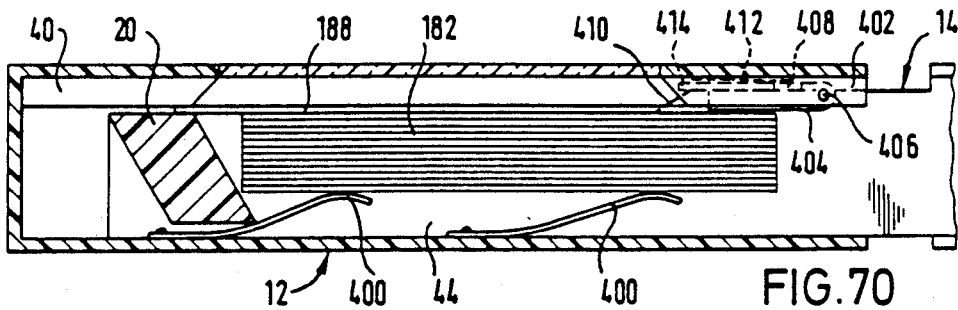
Figure 71:
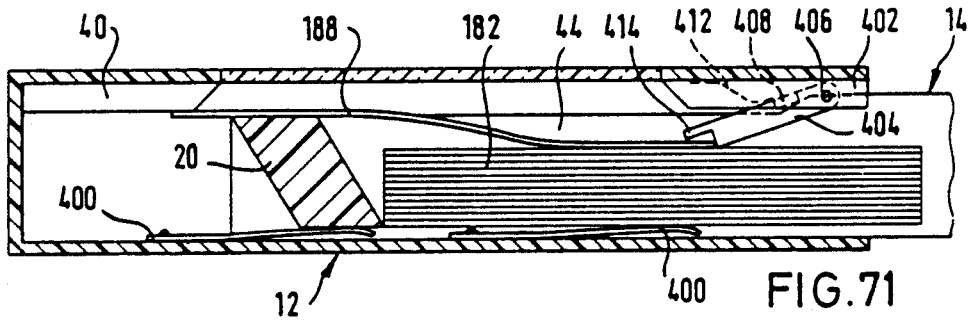
Figure 72:
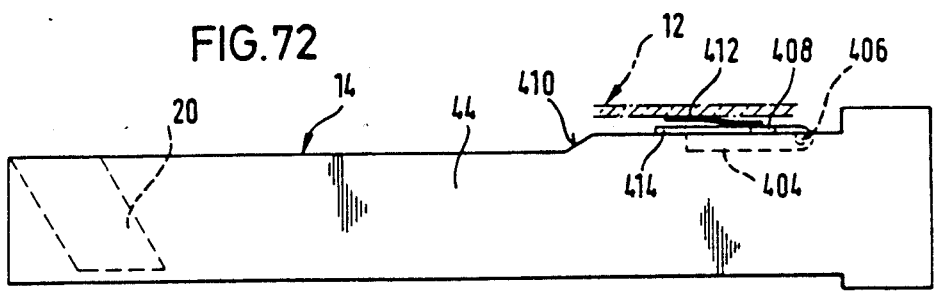

FIGS. 69 to 72 show a further embodiment. FIGS. 69 to 71 show the first phases of the changeover operation in diagrammatic longitudinal section, while FIG. 72 is a side view of the second frame part with the transporter provided on the first frame part.

The first frame part is designed as a housing 12 and the second as a slider member 14. The pile 182 is pressed upwards by a spring assembly 400 so that the rear edge of the topmost sheet is supported on a rib 402, while its end edge comes to lie in front of the transporter 404. The actual transporter is the edge, facing the sheet, of the transporter unit, which edge projects by just a sheet thickness with respect to the rib. If the slider member is pulled, the separator 20 conveys the rest of the pile with it, while the individual sheet remains in the housing. The transporter unit 404 is hinged, so that it can pivot about an axis 406, to the housing where the latter has the rib 402 and glides with a projection 408 on the upper edge of the side piece 44 of the slider member (FIG. 72). This is designed as an actuator curve, as a result of which, after partial travel of the slider member which is adequate to push the leading edge of the individual sheet 188 through the separating means, the slope 410 allows the unit 404 to move downwardly and thus to present a considerably deeper working face to the individual sheet than was possible hitherto. The unit is biassed by a leaf spring 412 and is provided with a catch projection 414 which prevents the edge of the individual sheet from sliding off in the direction of the rib 402.

FIGS. 73 to 78 relate to feeding means by means of which the pile of sheets, or at least a portion thereof, is so conveyed to the separating means that the latter can separate one sheet.

Some points which are to be mentioned in connection with the entire operation of the device are, however, common to all embodiments.

There is therefore, in principle, the possibility that the feeding means can also assume the function of retaining the separated sheet in the first frame part, in fact during the entire outward travel of the frame parts.

Futhermore, it is thoroughly to be recommended that the feeding means, after it has fulfilled its feed function in contact with the pile and/or the sheet to be separated, be detached from the pile for the remainder of the relative travel of the frame parts in order to protect the component parts and the sheets to a considerable extent. This can be provided in the manner of a free wheel, where the change-over "engaged/disengaged" is to be dependent on the direction of movement or can be provided by travel-dependent control components which move in and out of active connection with the feeding means or parts thereof.

If the frame parts are designed in the manner of a housing as the first frame part and in the manner of a slider member that can move in and out of the housing and, as second frame part, releases the rest of the pile for access during the outward travel, then it is preferable to make the feeding means so that it can be rendered completely inactive in order to be able to remove the entire pile at once with the slider member.

FIGS. 73 to 78 show, to a large extent diagrammatically, further different feed systems based on different principles.

According to FIG. 73, the first frame part has a moulded toothed rack 416 with which a pinion 418 rotatably mounted in the second frame part engages and, during the relative movement, drives a transporter roller 420 which frictionally engages the sheet 188 to be separated and transports it.

FIG. 74 shows an embodiment having a plate 422 which has a retentive layer 26 which is able to engage frictionally and transport the sheet lying against it. The level arrangement is ensured by the mounting of the plate by means of a first pivot 424 and a second pivot 426 and a biassing spring, in this case a coiled torsion spring 428 with projecting ends.

FIG. 75 shows an embodiment in which the feeding means also functions by means of a transporter with retentive means. In this case the first frame part is designed as a slider member and the second frame part as a housing. There is arranged on the slider member 14 a transporter with retentive means 26 which draws off the sheet to be separated from the pile 182 and conveys it to the separating means which is indicated here simply as a separator bar 20. In the second frame part (that is the housing 12) there is formed a control channel 430 along which the transporter with retentive means is guided away over the separator bar without coming into contact with the latter.

Figure 76:
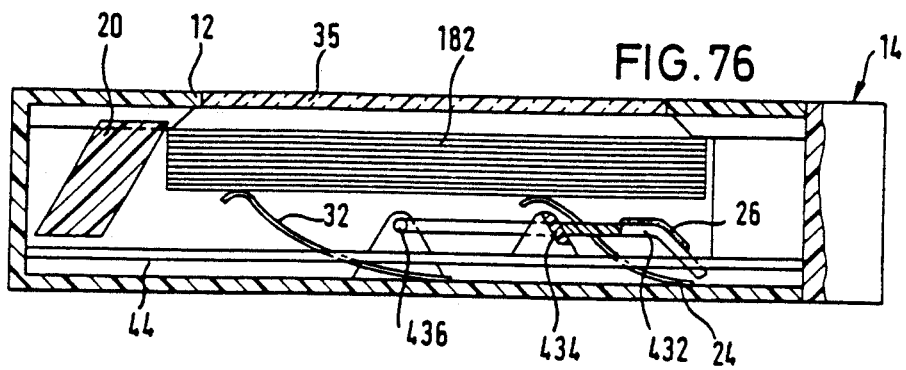

FIG. 76 shows how a transporter with retentive means 26, arranged near the distal end of a lever 432, by running up an actuator slope 434 on the second frame part (slider member 14), is pivoted about its pivot 436 on the first frame part (housing 12) to lie against the sheet of the pile facing it and in this manner, during a part of the travel of the relative movement of the parts, conveys this sheet to the separating means, symbolised by the separator bar 20.

Figure 77:
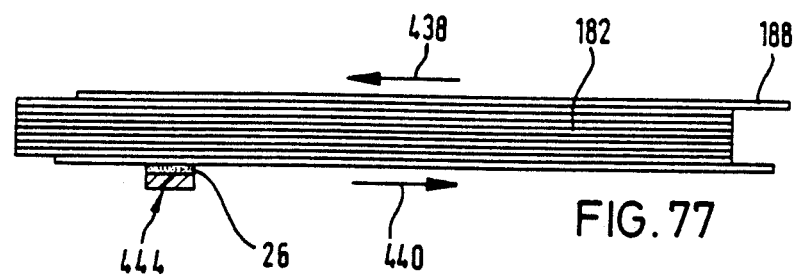
Figure 78:
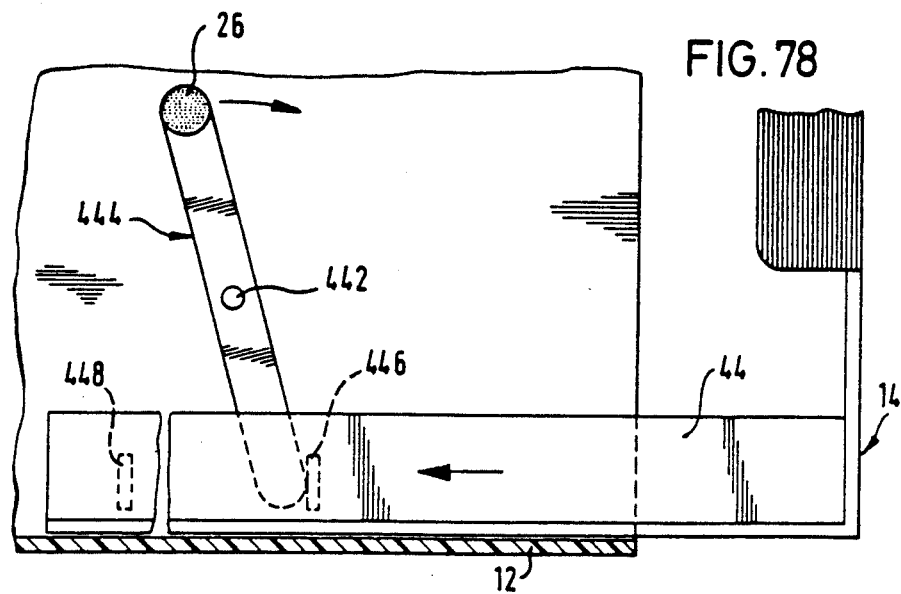

FIG. 77 shows in a diagrammatic side view, and FIG. 78 in a plan view of a partial section, a feeding means which is effective not just at the beginning of outward travel of the frame parts, but is effective already during the last part of the inward travel of the previous change operation.

While the individual sheet 188 is being conveyed back to one end of the pile 182 (arrow 438), on the other end of the pile (arrow 440) the next sheet is already in motion. For this purpose, the first frame part has a lever 444 which is hinged at 442 and has a transporter with retentive means 26, which lever, by running against stops 446 and 448, is reset near each relative end position of the second frame part and transports the sheet according to the relative movement of the two frame parts.

FIG. 79 shows in diagrammatic longitudinal section a different design of the subject of the invention, while FIGS. 80-81 show individual phases of the change cycle FIG. 82 illustrates the drive of the roller.

FIG. 79 shows the first frame part in the form of a slider member 14 which can be displaced relative to the second frame part which is designed as a housing 12. The separating means comprises the separator bar 20 and further components according to FIGS. 35-50 The springs 400 press the pile 182 upwards.

There is moulded on the slider member a toothed rack 416 (FIG. 82) which engages with a pinion on the roller shaft (not shown). As a result the drive to the roller is at a peripheral speed which is equal to the relative speed between the two frame parts. The roller 420 is provided with a coating increasing the friction with the photographs and since the pile is pressed by the springs against the roller, then, when the slider member is pulled out of the housing, the roller conveys the sheet facing it a distance through the through gap 244 between the separator bar and the housing top wall 266. The roller can be rotated in mountings of the housing.

There is provided on the slider member a transporter element having a retentive coating 26 which, in cooperation with a cooperating element 450, grips the leading edge of the sheet conveyed by the roller as soon as the cooperating element, which has first been tilted away downwards by running onto the separator bar, escapes from this bar and, under the action of a biassing spring (not shown) pivots upwards onto the retentive coating. The sheet is then held between the retentive coating and the cooperating element in a pincer-like manner. The roller accordingly works as feeding means and the described pincer-like arrangement as retaining means.

As can be seen in FIG. 81, during the return travel of the slider member, the individual sheet 188 runs through the lower through gap 310 of the separator bar and an actuating member 452 folds the cooperating element down at the right moment so that the rear edge of the sheet is released to run through the through-gap.

Figure 83:
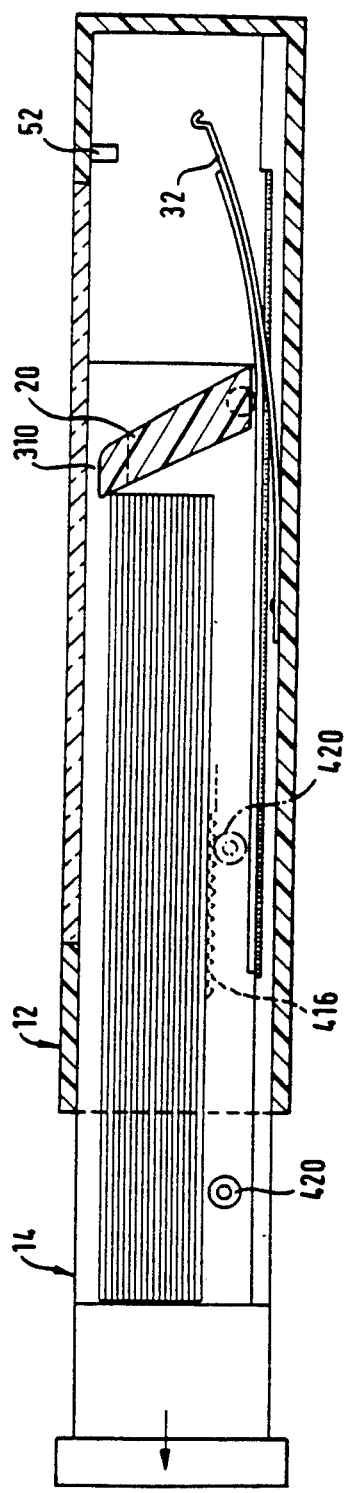

FIG. 83 shows a further embodiment of the device. In this case, the first frame part is designed as a housing 12 and the second frame part as a slider member 14 having a separator bar 20. Accordingly, the roller 420 is rotatably mounted in the slider member and driven in rotation counter to the direction of movement of the slider member, by a toothed rack 416 that is moulded onto the housing. The initial position of the roller is shown by a broken line. As soon as the separator has run over the sheet remaining in this manner in the housing, a substantially frictionless element (for example a smooth roller) built into its base part pushes the sheet downwards onto the base of the housing where a friction-increasing coating ("retentive coating") is provided. A spring 32, behind the separator, then presses the sheet away from the retentive coating again upwards in the direction of a stop 52 by which the sheet, during the return of the slider member, is pushed through the upper through gap 310.

It is to be noted that in every case during the return phase of the frame parts the roller is uncoupled from the drive so that it can run back onto the pile without squashing up the sheet with which it is engaged. Alternatively, the drive can be uncoupled as soon as the individual sheet is grasped by the transporter (pincer-like arrangement or retentive coating), means known to the person skilled in the art being available for this purpose.

In combination with the roller as feeding means, a retaining means according to FIGS. 92–115 may also be used.

Figure 84:
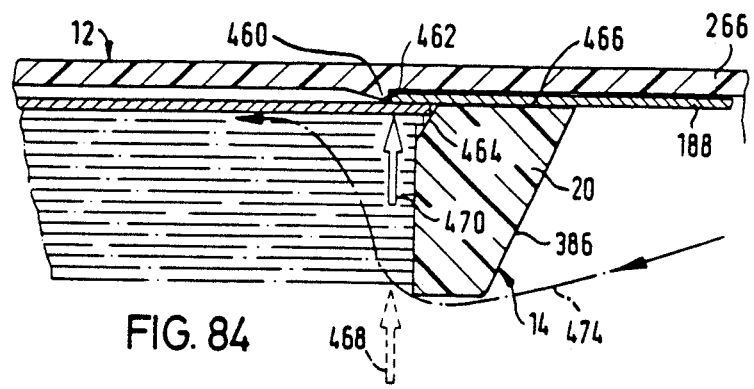
Figure 85:
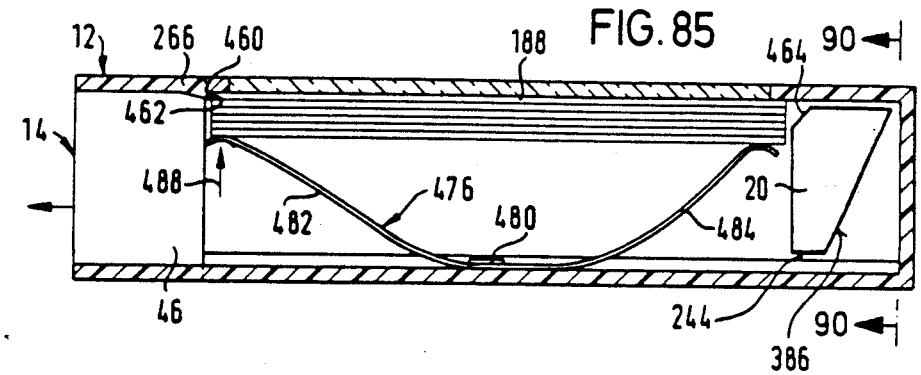
Figure 86:
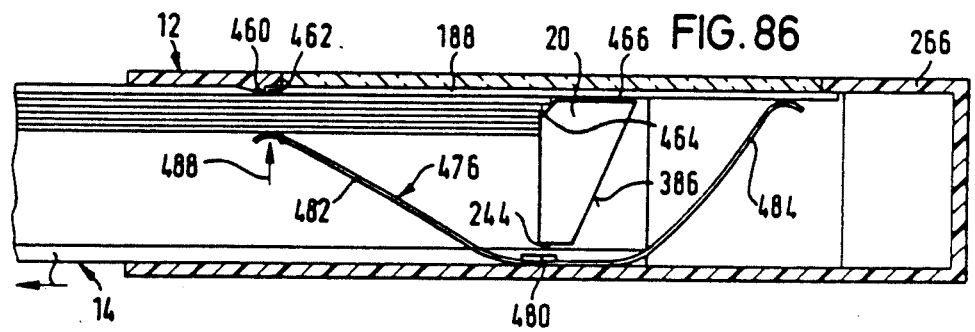

FIG. 84 shows the cooperation of a transporter 460 which serves as feed member and is in the form of a hook or ledge which engages behind the rear edge 462 (seen in the direction of movement) of a sheet to be separated. The separating means comprises a separator 20 having an inwardly-running slope 464. The sheet 188 is pushed through between the upper side 466 of the separator and the top wall 266 of a frame part. To ensure that the sheet and transporter engage, there operates in the region immediately in front of the separator (seen in the feed direction) a pressure arrangement, symbolised in this case by arrows which indicate the direction of action of the arrangement. Depending on the number of sheets in the pile, the pressure arrangement is far beneath the through gap (interrupted arrow 468) defined by the parts 466, 266 or, if only a few sheets are in the pile, is quite close beneath the transporter (thick arrow 470). When the separated sheet has been conveyed by the transporter to behind the rear side of the separator bar, its rear transverse edge 472 comes free and moves downwards against the direction of action of the pressure arrangement or is displaced there by auxiliary means (not shown) so that this edge can be inserted again between the pressure arrangement and the pile. It will be seen that in the situation shown this could be extremely complicated since this edge must travel a path approximately along the path 474, shown by broken lines, with considerable deformation of the sheet.

FIGS. 85–91 show how this problem is solved

Figure 87:
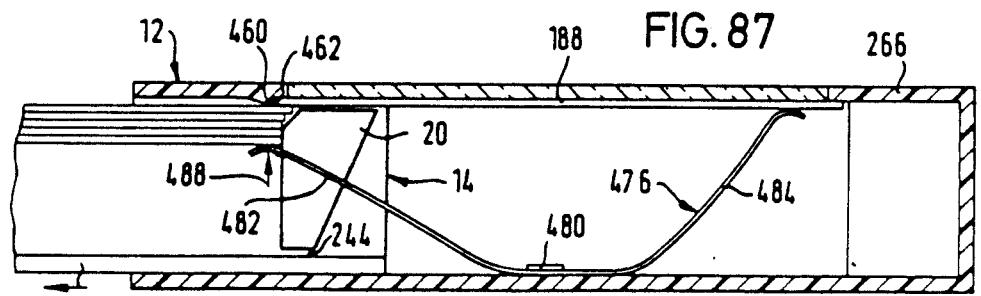

One frame part is in the shape of a housing 12, the other frame part is a slider member 14 which can travel a predetermined withdrawal distance relative to the housing; the fully extended position is shown in FIG. 87. The transporter 460 is moulded onto the top wall 266 of the housing. The pressure arrangement comprises two parallel double-armed leaf springs 476. These springs have a configuration according to FIG. 90: An inclined longitudinal slot 478 sits on an oblong guide member 480 which is moulded onto the floor of the housing. The spring arm 482 which rests against the pile from below almost directly under the transporter is designed to be so strong that the pile is securely held against the transporter even when there are many sheets. The other spring arm 484 is weakened by a cut-out portion 486 and is therefore considerably "softer" since in the starting position according to FIG. 84 the sheet to be changed is guided by the slope 464 into the through-gap, even when the pressure is only slight.

It can be seen in FIG. 90 that the separator bar 20 does not extend over the entire breadth of the slider member 14 on which it is moulded, but has a cut-out portion in the middle so that when the slider member 14 is pulled out of the housing 12 the springs of the pressure arrangement can pass between the two parts of the separator bar.

From the beginning of the movement of the frame parts (FIG. 85) up to almost the complete extension (FIG. 88) the pressure, symbolised by the arrow 488, remains directly under the transporter. In the position according to FIG. 87, each of the parts of the separator bar 20 run onto an outwardly turned finger 490, and during the passage of the slider member from the position according to FIG. 87 into the position according to FIG. 88 the two leaf springs 476 are slidably transported along the guide member 480. Owing to the inclined position of the longitudinal slot 478, the springs are displaced in the direction of movement of the slider member but also slightly outwards; however, they remain substantially parallel to the direction of movement.

As a result of this displacement in the direction of movement, on the side of the housing remote from the parts of the separator bar in FIG. 88, the separated sheet 188 is pushed upwards by the spring arms 484 against the top wall 266 of the housing, while its edge 462 comes free and hangs down or is pressed downwards by auxiliary means.

If, starting from FIG. 87, the slider member 14 is pushed in again, then this edge 462 passes downwards along the inclined face 386 of the parts of the separator bar until it is in front of the through gap 244 and passes into the latter, while the spring arm 482 slides with its free end along the lowest sheet of the pile, but always forward of the edge 462 of the sheet 188 corresponding to the displacement of the longitudinal gap system.

The second consequence of this displacement, namely in the outward direction, is that the parts of the separator bar 20 run onto the laterally projecting spring-depressor portions of the spring arms 484 and, since they are relatively "soft", press them downwards without impeding the movements of the frame parts, so that even the rear edge of the sheet to be conveyed back under the pressure arrangement comes free.

Shortly before reaching the starting position, some part of the slider member 14, for example the grip part 48, runs onto the spring arms 482 or the fingers 490 and presses the leaf springs back again into the starting position, according to the longitudinal gap system. At the same time, the end of the spring arm 482 slides gently under the edge 462 of the sheet which has now been conveyed back underneath the pile.

In the embodiments of FIGS. 1 to 10 and 13 to 33, similar retaining means based on the same principle are provided, by means of which the separated sheet is held against the first frame part. In conjunction with the separating means according to the present invention it is also possible, however, to use modified retaining means which are illustrated in FIGS. 92 to 115 and are explained in detail below.

FIGS. 92 to 94 relate to one embodiment They are to a large extent diagrammatic and are limited to the essentials.

The first frame part is designed as a housing 12, and the second frame part as a slider member 14. There is attached, for example moulded, to the top wall of the housing 12, a transporter in the form of a ledge or a hook 460 and the side pieces 44 of the slider member are connected at right-angles to one another on the one hand by the stop face 46 of the slider member and on the other hand by a separator bar 20. There is secured to the base wall 268 of the housing a first pressure spring 500 which presses the end of the pile 182 nearest the stop face 46 of the slider member against the top wall of the housing, which may have, for example, a viewing window, and a second pressure spring 502 is also secured to the base of the housing and presses the pile upwards close to its end facing the separator bar.

On the side of the separator bar remote from the pile, a lever 506 is hinged so that it can pivot about an axis 504, which lever is biased by a spring 508 into the position shown in FIG. 93. When the slider member is pushed into the housing, the inclined face 510 at the free end of the lever 506 comes into contact with the side of the separator bar facing it and is pressed downwards by a camming action into the position shown in FIG. 92. The side of the lever 506 facing the top wall of the housing has a retentive coating 26 near its free end.

The device operates as follows:

If, starting from the rest position according to FIG. 92, the slider member 14 is pulled out of the housing 12, the transporter 460 strikes the edge, facing it, of the sheet 188 to be separated and pushes the latter in the direction of the separator bar. This is possible if the pile is held against the top wall sufficiently firmly by the spring 500. As soon as the separator moves outwards, the lever 506 begins to pivot upwards under the action of its biasing spring, it being possible for this to happen without interruption, because the side of the separator bar facing it has a correspondingly deep passage (shown by a dashed line) in the region of the retentive coating.

As soon as the lever has reached the position indicated in FIG. 93, it holds the sheet 188 against the top wall of the housing; as can be seen especially in FIG. 94, the transporter is not, in fact, in a position to hold the sheet against the housing during the entire travel because the spring 500, onto which the separator bar runs, is pressed downwards so that the rear end of the pile, seen in the feed direction, becomes free. On the side of the separator bar remote from the pile, the bar is provided with wedge portions 512, the slope of which is such that when the slider member is pushed back in again the ends of the spring 502 are pushed downwards and can slide through under the separator.

Figure 95:
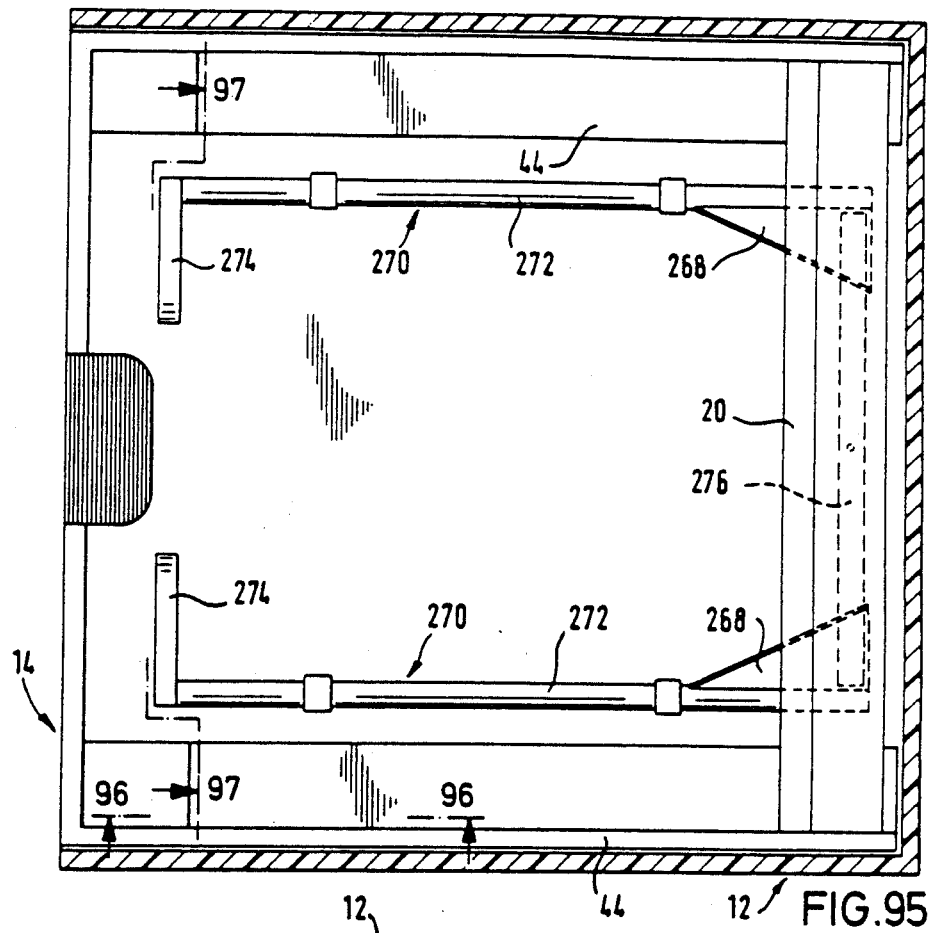
Figure 96:
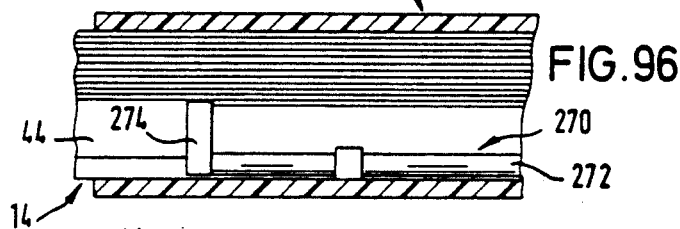
Figure 97:
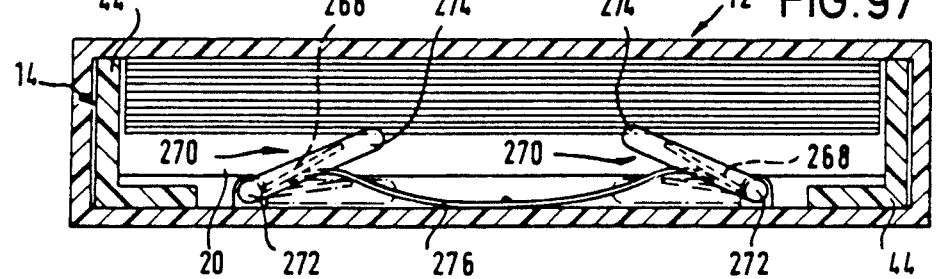

A further embodiment is shown in FIGS. 95 to 97.

FIG. 95 is a partial longitudinal section, FIG. 96 is a horizontal section, and FIG. 97 is a transverse section through the corresponding planes of the device.

The first frame part is in the form of a housing 12, and the second is in the form of a slider member 14. The separating means in the form of the separator 20 bridges the side pieces 44 of the slider member transversely. In the rest state, shown in FIG. 97, the separator presses on the wing-like actuators 268 of two links 270 which are pivotable about axes extending parallel to the withdrawal direction and indicated by 272. On the ends of the axes remote from the wing-like actuators 268 there are arms 274 which point towards each other. The links are biased by means of a leaf spring 276 in such a way that the arms 274 tend to pivot in the direction of the inserted pile of sheets.

When the slider member has travelled over a distance which is sufficient to push the individual picture through under the through-gap of the separator by means of the transporter (not shown), the separator gradually releases the wing-like actuators 268 and the arms 274 come to rest from below against what is now the bottom sheet of the remainder of the pile and behind the edge of the sheet which has remained behind in the housing, so that the latter reliably remains behind in the housing while the separator transports the remainder of the pile out of the housing. The bias of the springs lifting the arms 274 may be so great that their free ends not only rest against the remainder of the pile but also raise the latter a little; thus the individual sheet cannot slide away from the arms. When the slider member is in the end position, the separator can just press the arms 274 downwards against the spring force, since it has a correspondingly inclined shape and acts like a wedge or cam. During the return travel, the remainder of the pile returns with the separator and the slider member and comes to rest on the arms. Only when the separator slides onto the wings are the arms moved over into the initial position again.

FIGS. 98 to 100 show, to a large extent diagrammatically, a cross-section, seen from the side, of a further embodiment having the frame parts pushed together in the rest position. The first frame part is in the shape of a slider member 14 which can be pulled out of the second frame part in the form of a housing 12. The separating means in the form of a separator bar 20 is arranged fixedly in the housing and a spring assembly 400, likewise arranged fixedly in the housing, presses the pile 182 upwards. The end face, lying closest to the separator bar, of the topmost sheet lies under a retentive coating 26 which is arranged on a first jaw member 520 of a pincer-like arrangement. This jaw member is moulded onto the slider member so that it can be deflected resiliently upwards. The jaw member also has an axis 504 about which is hinged a second jaw member 506 which, in the rest position, has been pressed downwards on the side of the separator remote from the pile by running onto an actuator curve 522 against the bias of a spring 508.

If the slider member is then pulled out of the housing, the retentive coating transports the topmost sheet 188 of the pile, which is held against it by the spring assembly 400, over the separator bar. At the same time, the second jaw member 506 comes free of the bar 20 and closes under the action of the biasing spring 508 until the sheet transported by the retentive coating is firmly held between the jaws of the pincer-like arrangement. When the slider member is pushed back, the edge of the sheet 188 facing the separator arrives in front of the base-side through gap 310 of the separating means and the pincer-like arrangement pushes it through this through gap until the pincer-like arrangement is opened again by means of the actuator curve 522. So that the retentive coating does not trail over the upper side of the separator bar, when the first jaw member runs over the bar, the jaw member is conveyed along a guide channel 524 past the bar and then springs back into the working position.

The second jaw member can also be provided with a retentive coating 26, but then the side of the separator bar facing it is to be provided with a deep groove, shown by a broken line, so that in this case also no direct contact with the retentive coating can occur.

FIGS. 101 and 103 show in a longitudinal sectional view the rest state and the partially withdrawn state of an apparatus according to the invention in which the first frame part is formed by a housing 12 and the second by a slider member 14. A spring arrangement 24/32 and the separator bar 20 as separating means can be seen.

At the start of the withdrawal travel of the slider member, the feeding means guides the lowest sheet 188 in the housing through beneath the separator bar, behind which a pivotable jaw member 278 is arranged to rotate about a pivot 289. A spring 282 biases the jaw member 278 into the position shown in FIG. 103, as can be seen from the enlarged view according to FIG. 102.

The separator bar, with the slider member pushed in, has moved the jaw member into the inactive position as a result of a camming effect when running on. The jaw member may be released automatically on withdrawal, but this is not shown in detail.

FIGS. 104, 105 and 106 show in a schematicised longitudinal section three phases of the withdrawal travel in another embodiment. The feeding of the sheet to be separated is effected by means of the transporter, namely the hook-like member 22, which is arranged on the spring arm 24. Housing, slider member and separator bar correspond to the embodiments described previously. The slider member 14 acting as the second frame part, after a certain withdrawal distance, couples itself to a member 284 which is arranged so that it can move longitudinally in the housing 12 forming the first frame part. A recess 286 is provided in the member 284 beneath a guide face 288.

As soon as the transporter, as a result of a first stroke of the slider member, has pushed the leading edge of the sheet 188 being separated through beneath the separator 20, the slider member, now coupled to the member 284, also begins to carry the latter along with it in the withdrawal direction with the result that this edge of the separated sheet goes into the recess 286 and is there firmly clamped by the arm 32 of the spring arrangement. This spring arm forms a jaw member of a pincer-like arrangement, and the edge surface of the recess situated on the other side of the clamped edge of the sheet forms the other jaw member of the pincer-like arrangement. This state persists until the rear edge of the separated sheet is freed from the separator. If the slider member is not pushed in again, it takes the member 284 back inwards with it into the housing, and the recess leaves the withdrawn sheet, so that the free arm 32 of the spring arrangement allows the edge of the sheet supported by it to slide smoothly upwards along the guide face 288.

FIG. 107 shows in an extensively schematicised partial longitudinal sectional view an embodiment in which the separator bar 20 mounted on the slider member 14, as a result of the slider member being pulled out of the housing 12, gradually releases the leaf spring 32 mounted on the latter, so that its free end, provided with a retentive coating 290, comes to rest against the edge 292 of the sheet and presses the latter against the top wall 266 of the housing, which then forms the other jaw member in conjunction with the first jaw member formed by the spring.

The pincer-like arrangements described are only some of a multiplicity of possible embodiments; thus, instead of gripping the leading edge of the sheet it would also be possible to engage on one or both sides with similar pincer-like arrangements, or the width and not the thickness of the sheet could be held between the jaw members.

FIG. 108 shows a modification of the pincer-like arrangement according to FIG. 107: the retentive coating 290 is on a pressing arrangement, consisting of a plate 294 which carries the retentive coating and is articulated on the end of a link 296. The link is connected to the floor 218 of the housing. A spring 298 presses the retentive coating against the separated picture.

Figure 110:
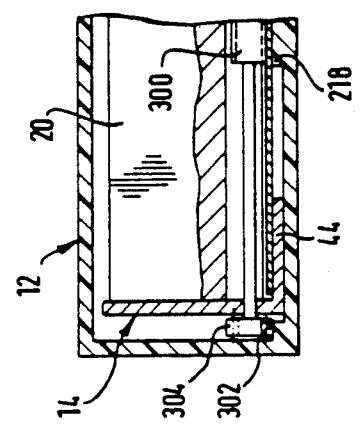
Figure 109:
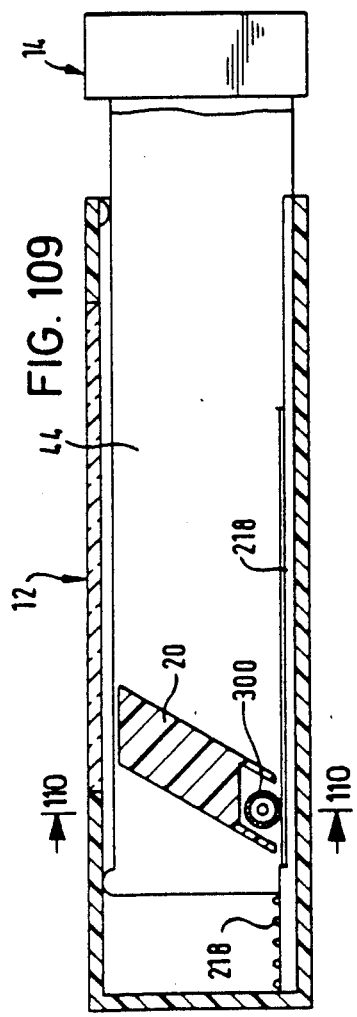
Figure 111:
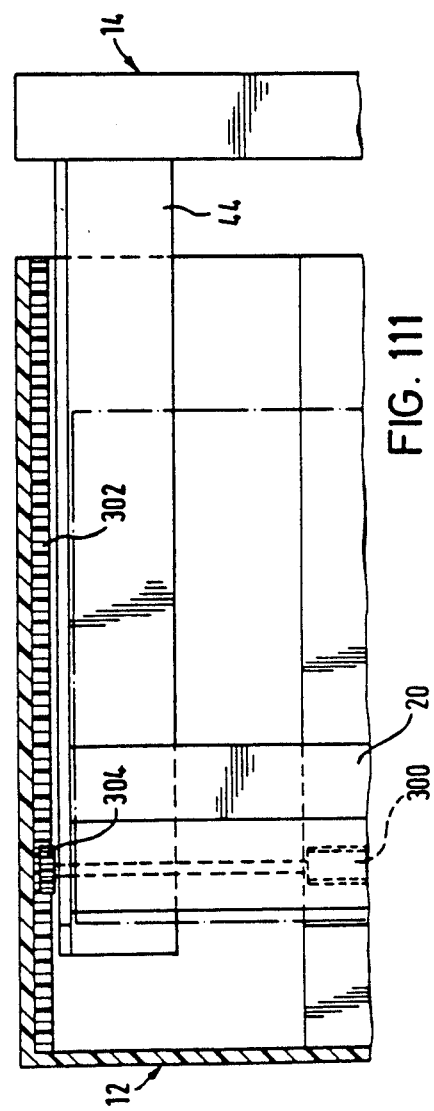

FIGS. 109 to 111 relate to another type of retaining means for the picture which is to be separated.

FIG. 109 shows in a schematicised longitudinal sectional view a device according to the invention, FIG. 110 is a partial transverse section corresponding to this Figure, and FIG. 111 shows a partial horizontal section.

While in the complete example of execution described in detail under FIGS. 1 to 10 the retaining means comprised a first clamping member in the form of a roller running with the separator bar, a second clamping member in the form of the retentive coating attached so that it was stationary on the first frame part (housing), and a spring arrangement in the form of the spring pressing the shoe against the retentive coating, in this case the clamping members are so constructed in operational reversal that the retentive coating is provided on the periphery of a roller 300 which by way of a toothed rack 302 and a pinion 304 connected to the roller is driven so as to rotate when the slider member 14 which forms the second frame part is withdrawn. The roller has a diameter equal to the effective circle of the pinion, so that it rolls on the individual sheet at a peripheral speed which is equal to the withdrawal speed of the slider member. The individual sheet is therein pressed against the floor 218 of the first frame part in the form of the housing 12 and is held firmly in the latter.

The device according to FIGS. 112 to 114 shows a further embodiment of the retaining means according to the invention. The individual sheet 188 arrives behind the separator bar 20 in the working gap between two rollers 300, 306, at least one of which is driven in the same manner as that described in FIGS. 109 to 111. The other roller may also be driven directly by the first, or driven along by means of friction. The pressing force is produced by the fact that one of the rollers, preferably the one which is not driven, is of resiliently compressible construction, and its shaft is placed somewhat nearer to the other roller than would actually correspond to the diameter. The cross-section through such a resilient roller is shown in FIG. 114, and it can be seen that blind recesses extend round the hub in a meandering arrangement so that there is always sufficient springiness available.

The second roller 306 accordingly assumes in this case the role of the clamping member which is arranged like a rail in the first frame part in FIGS. 1 to 10 and 13 to 33, for which purpose the roller is rotatably mounted not on the first but on the second frame part holding the pile.

Figure 115:
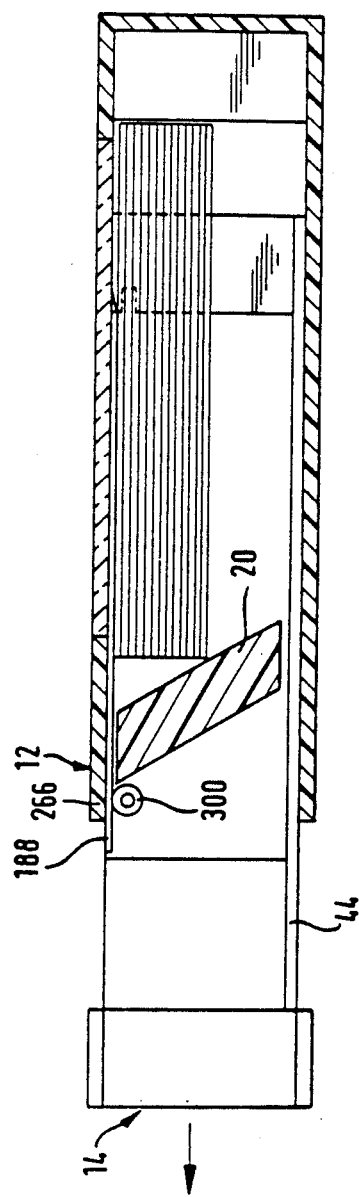

FIG. 115 shows a roller 300 which is rotatably mounted in the housing 12, forming the second frame part in this case, which roller is driven by way of a toothed rack (not shown), mounted in the side pieces 44 of the slider member, and a pinion (not shown) connected to the roller, the drive being at a peripheral speed which is equal to the withdrawal speed of the slider member. In this way, the separated picture 188 is apprehended behind the separator bar 20, pressed against the top wall 266 of the housing, along which it slides, and released in the outer end position of the slider member. It is to be understood that as feeding means one of the arrangements shown in FIGS. 1 to 34 and 51 to 91 is provided in each case, without this being also illustrated each time.

FIGS. 116 to 120 illustrate the measures which may be taken in order to guarantee feeding even where the pile contains sheets with considerable differences in dimensions in the direction of the changeover movement.

Figure 116:
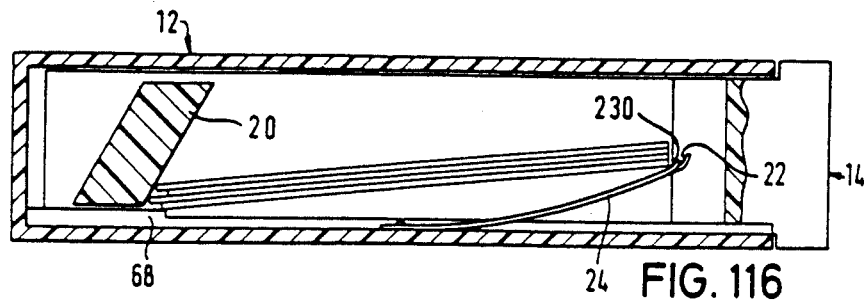
Figure 118:
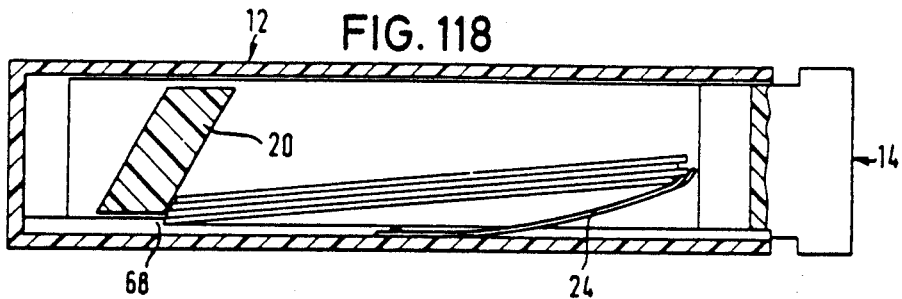
Figure 117:
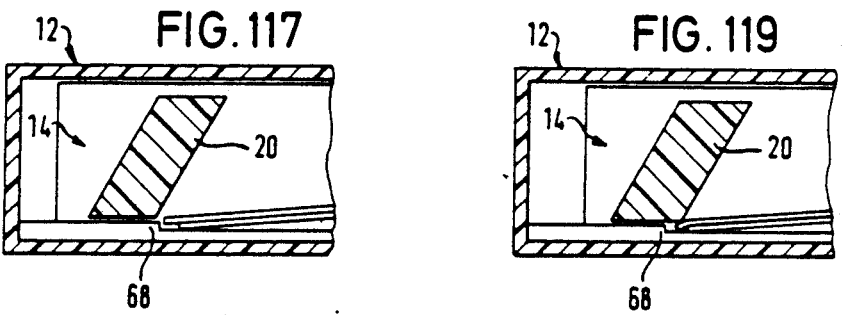
Figure 119:
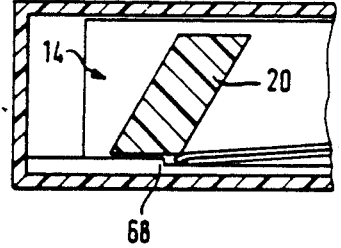
Figure 120:
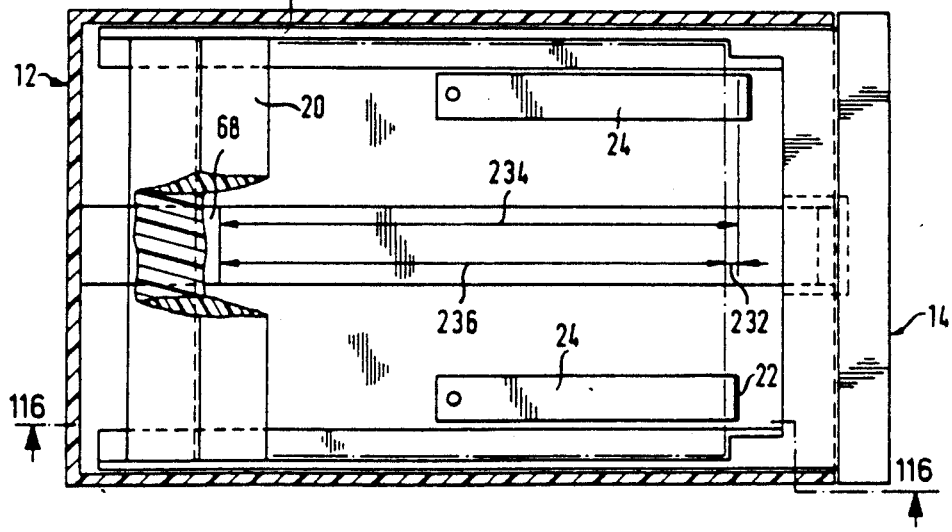

FIG. 116 shows in longitudinal section the situation after a changeover cycle. A stop member provided on the slider member 14 has aligned the edges of the sheets remote from the separator 20 so that their ends projecting to different extents out of the pile—or standing back in the latter—form the configuration indicated in FIG. 58. The case of a longer sheet lying over a shorter sheet is shown separately again in FIG. 117, and FIG. 118 illustrates schematically what could happen if provision was not made for compensation the second lowest sheet places itself with its free projecting edge over the end edge of the lowest sheet, and when the separator bar 20 runs on, the situation shown in FIG. 61 occurs, in which the changeover operation is disturbed (double sheet changeover). In order to prevent this, means are provided in order first of all to align the edges of the sheets somewhat on the side of the pile facing towards the separator bar. For this purpose there is firstly provided an "idle movement" of the separator bar 20 until it runs over the land 68. During this movement, therefore, no separation occurs. Nevertheless, the extreme edges of the sheets remote from the separator bar are already supported by a first contact face 230 during this idle movement travel. Sheets which are oversize are pressed back by the separator bar and spring away from the contact face 230; sheets which are undersize still remain on the first contact face. The sheets which have sprung away from the latter, however, are apprehended by a second contact face 22 which is provided at a distance 232 behind the first which corresponds to the maximum permissible difference in lengths of the sheets. In FIG. 120 the shortest sheet is symbolised by the arrow 234, and the longest by the arrow 236. When the separator bar has passed through its idle movement, the shorter sheets are therefore supported by the first contact face and the longer sheets by the second contact face, so that approximately the situation shown in FIG. 118 is produced in the region of the edges of the sheets facing towards the separator bar. It is sufficient here for the length compensation to be only approximate, so that the sheets are no longer flexible enough to allow the situation in FIG. 119 to occur.

Just as the feeding means and the retaining means may be constructed in a very different manner in order to co-operate with the separating means according to the invention, the guide means may also deviate from the arrangement according to FIGS. 1 to 10 and 13 to 33. This is made clear below with reference to FIGS. 121 to 137.

In the examples of execution described previously, the guide means was only marginally discussed with regard to its various aspects. But for photographic prints it also causes certain complications. Since in certain circumstances the separated sheet may be fairly severely bowed, it has proved to be expedient, or even unavoidable, to observe certain precautionary measures when designing the guide means. Thus the separated photograph must again be guided to the other end of the pile through a through-gap of the separating means, even if this through-gap is much less critical then the separating gap. In principle, all constructions which can be used for feeding may also be adapted for the return of the individual sheet. In general, however, it is sufficient to push the photograph out by its rear edge, it being also held firmly if required. Some embodiments are briefly described below.

With regard to the return through-gap mentioned, care should be taken to ensure that the remainder of the pile does not block this through-gap; this risk is present especially with piles of severely bowed photographic prints. It was explained above with reference to FIGS. 1 to 8 that for this purpose holding-down projections may be provided on the first frame part. In their place, however, there may also be provided on the first or second frame part a member which acts through the return gap and which is withdrawn again after the changeover cycle has ended.

In addition, provision should also be made for the return gap to be blocked at the start of the changeover cycle, so that a sheet is not withdrawn from both ends of the pile. It was explained above with reference to FIGS. 1 to 8, that comb-like projections engaging with one another (the projections being on the separator bar on the one hand, and on the first frame part on the other hand) may be used for this purpose; in their place, however, a controlled blocking means projecting out from the separator bar may also be provided for example.

Figure 121:
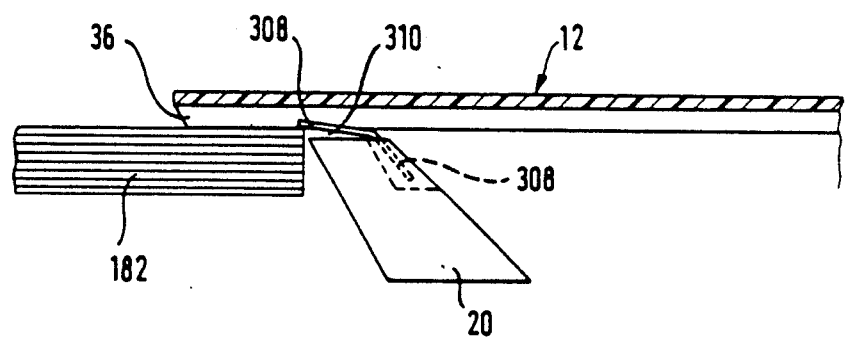

FIG. 121 shows in a schematicised longitudinal sectional view a type of construction which both holds down the remainder of the pile for the insertion of the separated sheet and also blocks the return gap during the start of the changeover cycle: In the separator bar 20 provided as separating means, a thin, resilient plate-like part 308 is arranged which engages, between holding-down members 36, on a top wall of the first frame part. The free end of the plate-like part at the same time presses on the sheet of the remainder of the pile 182 which faces towards it. The plate is supported in the second frame part so that it is displaceable for a short distance in the direction of movement of the frames, so that at the start of the next changeover cycle it can deflect towards the left (in FIG. 121), but at the same time still blocks the gap 310 so that the sheet returned last is pressed onto the remainder of the pile by the holding-down member before the plate-like part is moved in again.

FIG. 122 shows in a schematicised sectional view the preferred means: the spring 32 holds the rear edge of the sheet in front of the slider member stop member 52, the spring 80 supports the sheet approximately centrally, and behind the separator bar 20 the remainder of the pile 182 is held on a level according to the arrow 312, by the holding-down members 81 acting on it. The arrow 314 defines the level of that edge of the separator bar over which the individual sheet passes and which is in an inter-engaging engagement with the holding-down members.

FIG. 123 shows in a schematic partial sectional side view a construction which serves to prevent a sheet also arriving incorrectly in the gap during the separating phase of the changeover cycle at the through gap for the return of the sheet. In this case, this requires the ribs 40, which engage (somewhat like the teeth of a comb) in recesses in the separator bar 20.

Alternatively, in FIG. 124 blocking members 316 moving out of the separator bar are shown which free the through gap (either by spring action as the result of running on an actuating means or by positive displacement) only when a sheet edge is present in the return phase (this may be thought of as a "non-return valve principle").

The following Figures relate to means to ensure the sheet returns itself. As mentioned, the individual sheet is preferably pushed through the gap with its rear edge resting against a stop member. When the sheet is bowed round a radius of curvature which is approximately perpendicular to the direction of movement, there is a risk that the sheet will not be pushed through the gap but will be squashed up and/or will slide away from the stop member.

In principle, therefore, in the case of the guide means such means are provided which hold the individual sheet as securely as possible in front of the "pushing" stop member, and/or means which compensate for or reduce any bowing of the photographs.

Figure 125:
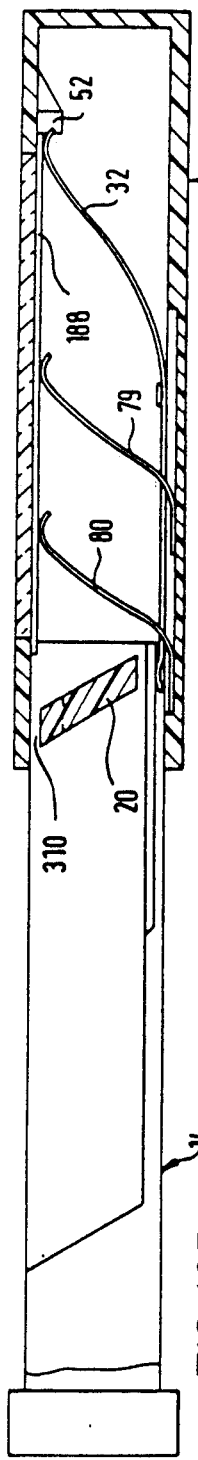

FIG. 125 shows these means just in principle in a schematicised longitudinal section: a first leaf spring 32 holds the individual sheet 188 in front of the "pushing" stop member 52, and further leaf springs 79, 80 press the sheet as flat as possible against the top wall of the housing 12 (first frame part), in order to present the leading edge of the individual sheet fairly accurately in front of the through gap 310. Reliability will be so much the greater, the longer the leaf springs engage with the individual sheet during the sheet return, before these springs are passed over by the separator bar 20 of the separating means. The side of the separator bar which faces towards the individual sheet 188 is preferably inclined in such a way that a leading edge of the individual sheet which is bowed downwards in front of it can "climb up" along the incline as a result of the camming effect of the latter. But if this sheet edge is forcibly presented to the return gap by other means, the corresponding surface of the separator bar may also be constructed to run perpendicular to the plane of the sheet.

Figure 126:
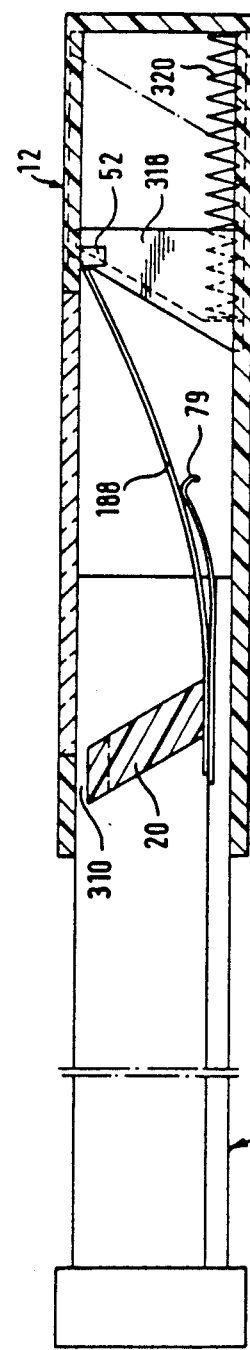
Figure 127:
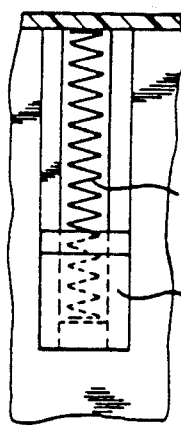
Figure 128:
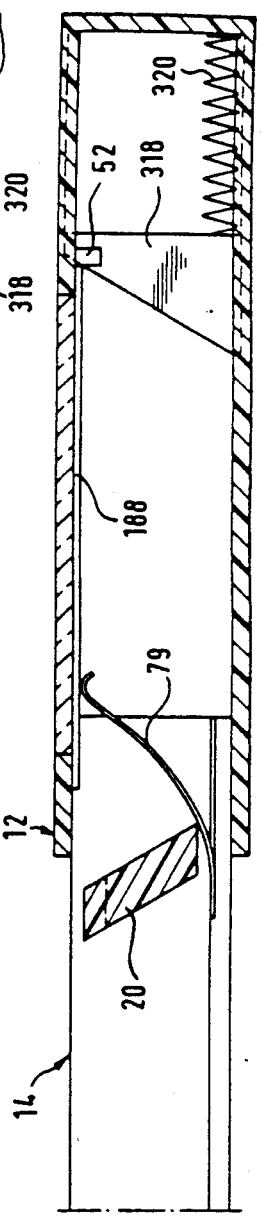

Instead of the leaf spring 32, other means may be used in order to displace the edge of the individual sheet remote from the separator bar against the other housing edge. This is shown in FIG. 126: a guide member 318 has been pushed by a spring 320 beneath this edge of the sheet 188 and has raised it up in front of the pushing stop member 52, still during the first half of the changeover cycle. The other sheet edge is then, after the separator bar 20 has passed, lifted up by a leaf spring 79 in front of the return gap 310. Towards the end of the second phase of the changeover cycle, the separator bar then pushes the guide member 318 back. Instead of the spring 320, the guide member 318 could also, by means of coupling to the second frame part, but with a "phase shift", be moved to and fro by the latter. Instead of the movable guide member, inclined wing-like guide members which are capable of being pivoted in and out could be provided, without any change in the operating principle. FIG. 127 shows schematically a plan view of the guide member 318, and FIG. 128 represents the situation at the point of reversal of the changeover cycle.

Figure 129:
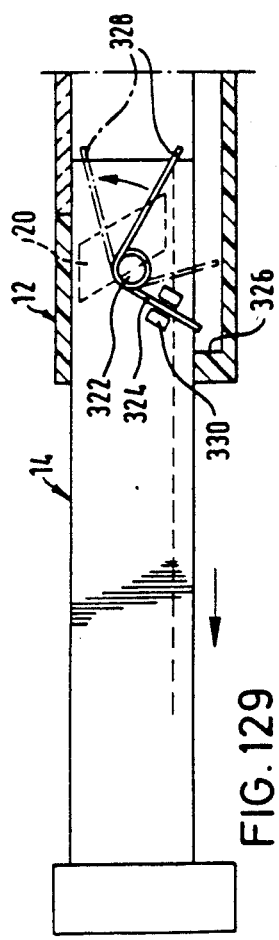

FIG. 129 shows a schematic side view of a mechanism which can be used instead of the lifting spring 79. A wire spring 324 is pivotable with its eye about a pin 322. One of its arms is angled and engages from outside transversely beneath the edge in question of the individual sheet, and the other arm can be moved over by engaging a stop member 326, carries the angled arm 328 along with it, and thus causes the edge of the sheet to be lifted. A limits-defining device 330 is indicated, in order to eliminate uncontrolled movements of the mechanism; the latter is indeed only to be switched over in the two end positions (rest position/point of reversal).

Figure 130:
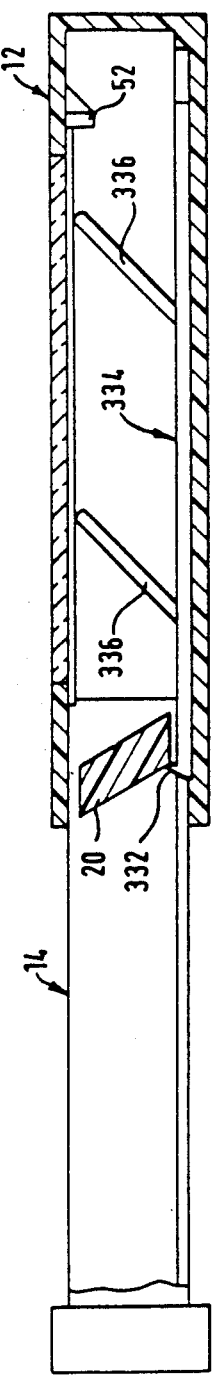
Figure 131:
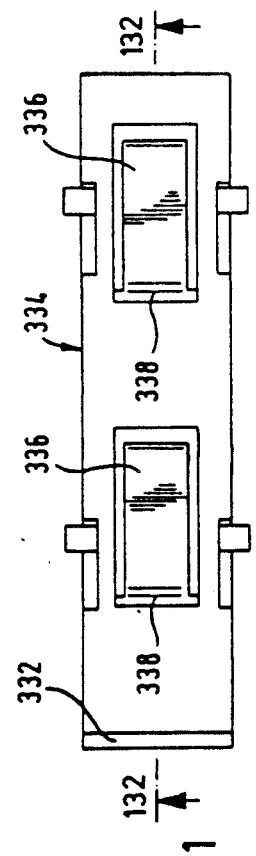
Figure 132:
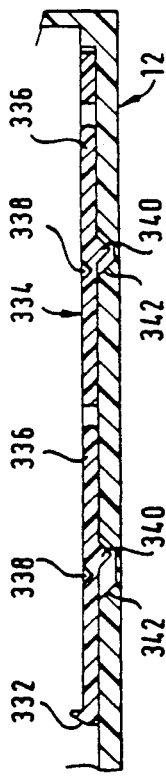

FIGS. 130 to 132 show an alternative form of the lever arrangement as guide means. The separator bar 20, shortly before its reversal position, meets a hook-like transporter 332 of a lever member carrier 334 to which two lever-like members 336 are linked by means of moulded-on pivots 338. By means of the displacement of the lever member carrier, the projections 340 formed on the underside of the lever-like members run onto actuating parts 342 of an actuator so that the lever-like members are raised up. During the return, the separator bar firstly meets the lever-like member nearest to it and presses the entire lever member carrier back for a short distance until the lever-like member is moved over; the other lever-like member, however, stays still, since the actuating parts 342 for the two lever-like members are at a greater distance from each other than the corresponding projections.

Figures 133, 134:
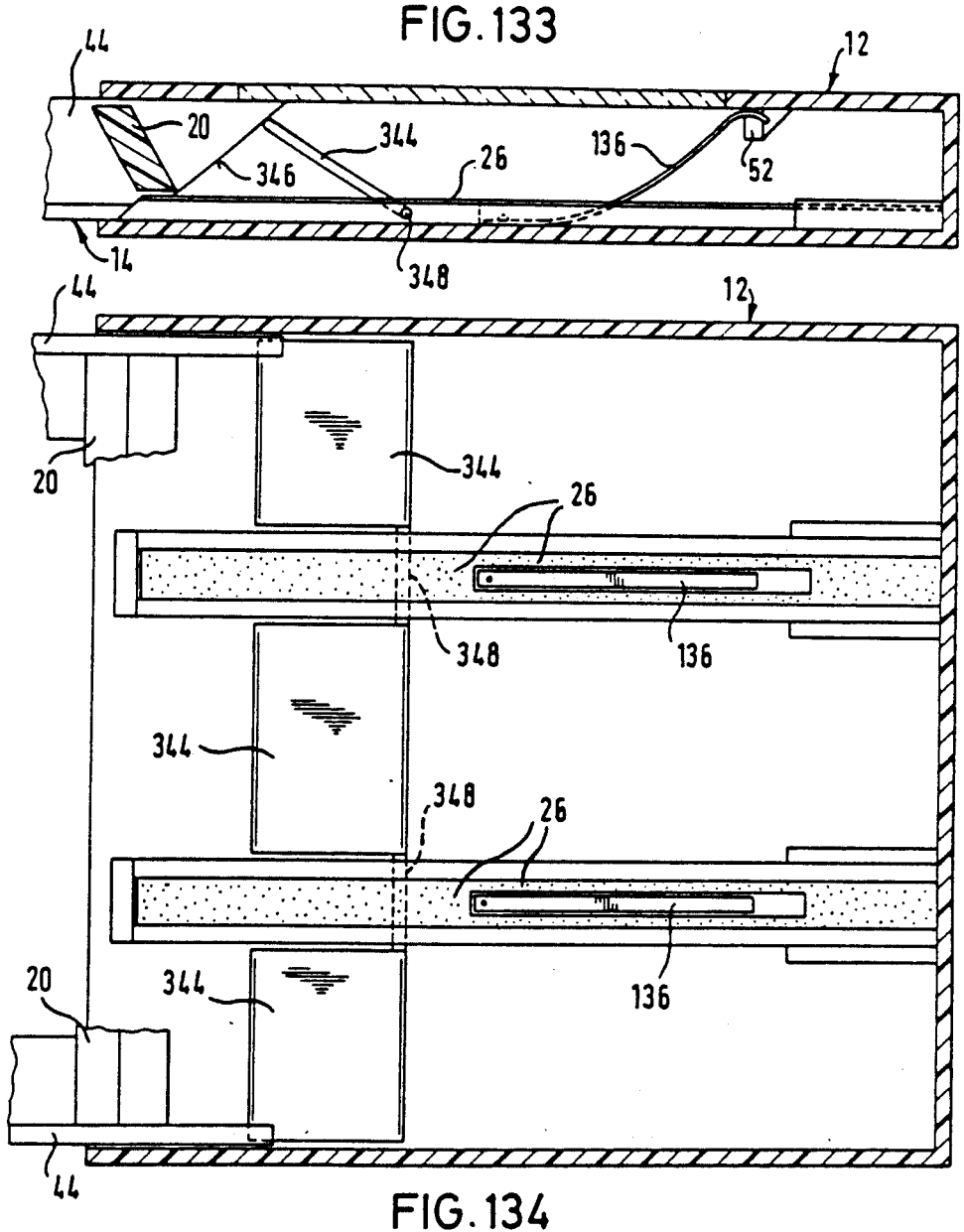

The embodiment according to FIGS. 133 and 134 represents an embodiment in which the retaining means for the individual picture comprises retentive coatings 26 in the first frame part. As a result of static charging, as mentioned above, the individual sheet may adhere so firmly to the retentive coatings that considerable forces are required to tear it away from them. It must however be guided onto the side of the frame part remote from the retentive coatings. The springs 136 are therefore provided centrally between two retentive coatings in each case. The edge of the individual sheet facing towards the separator bar 20 is lifted by a lever-like member 344 which is pressed down by means of actuator slopes 346 on the ends of the side pieces 44 of the slider member, while it is lifted up by a spring force (not illustrated). As can be seen from FIG. 134, the lever-like member extends over the entire width of the device, and in particular it also engages with the individual sheet directly adjacent to the retentive coatings. The shaft of the lever-like member is indicated by 348.

FIGS. 135 to 137 show another alternative form. On the separator bar 20, on both sides of the retentive coating 26, a thin plate-like member 350 is arranged so that it engages resiliently in a corresponding recess near the retentive coating. The two thin plate-like members are connected to each other by means of a bridge member 352. When the individual sheet runs through, each thin plate-like member is lifted up resiliently and snaps back into the recess after the rear edge of the sheet has passed, so that during the return travel the sheet edge in question is pulled away from the retentive coating and the edge has to climb up along the separator bar, since the return path through the other through gap is now securely blocked by means of the thin plate-like members.

Finally, in FIGS. 1 to 10 on the one hand, and FIGS. 13 to 34 on the other hand, means are shown in each case to allow the removal of the entire pile from the device. FIGS. 138 to 144 show alternative forms and also means for this purpose which work differently in principle and these are explained below.

Figure 138:
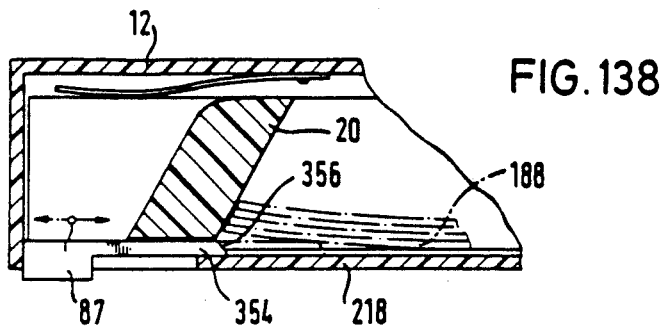

FIG. 138 shows in a partial longitudinal sectional view an embodiment in which the separating means can be blocked at will by manual intervention. It is to be assumed that there is a separating means according to FIGS. 35, 36 but in this case only the separator bar 20 of the slider member is shown. The land 354 is not stationary, as in FIGS. 35 and 36, but is movable in the direction of movement of the slider member, and displacement may be effected manually by means of a control key 87 projecting through the base 218 of the housing. In the position shown by solid lines, this corresponds to FIG. 35 (normal operation). But if the control key is displaced with the land towards the right, the wedge-shaped end 356 engages beneath the edge, facing towards it, of the bottom sheet 188 in the pile and lifts this edge onto the land 354, so that the through gap beneath the separator bar is "closed".

Figure 139:
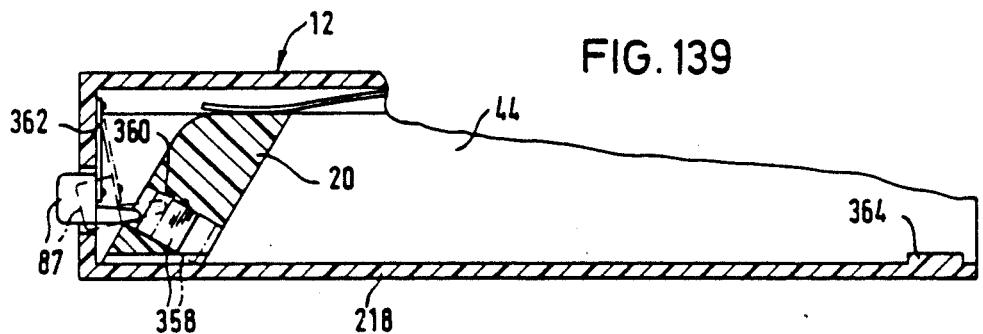

The pile removal function is also manually controllable in the embodiment according to FIG. 139 (partial longitudinal section). It is to be assumed that as initial construction the one according to FIGS. 39 and 40 is provided.

The separator bar 20 has a through-gap in which a blocking member 358 is movably arranged. In the position indicated by solid lines, the changer is switched to the changeover function, and the blocking member engages by means of projections 360 in a corresponding recess in the through-gap. If by means of pressure on a control key 87, which is mounted resiliently on a moulded-on spring 362 and is connected to the housing 12, it is moved into the blocking position shown by means of broken lines, in which it can also be locked by means of projections 360, the through gap for a separated sheet is blocked and all sheets in the pile are transported out. When the blocking member then runs onto a stop member 364 moulded on the base 218 of the housing, it is pushed back again into its rest position, and the changer is switched to the "changeover" function again.

Figure 140:
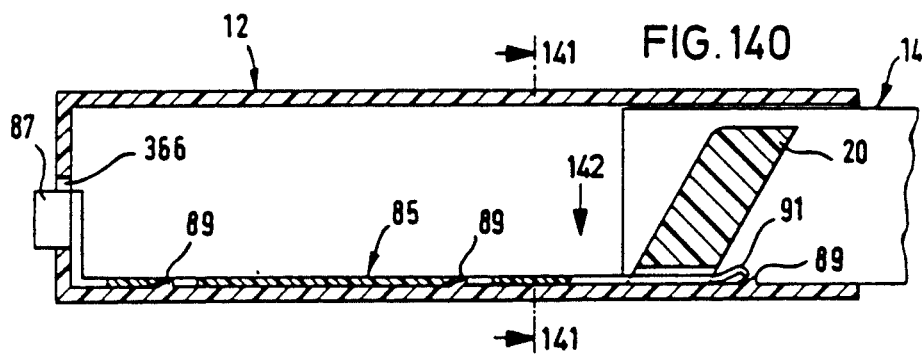
Figure 141:
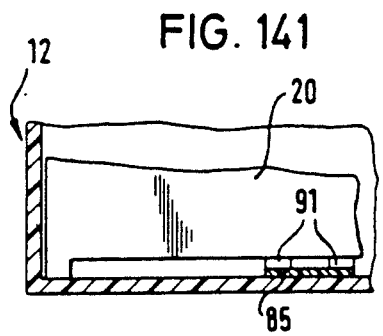
Figure 142:
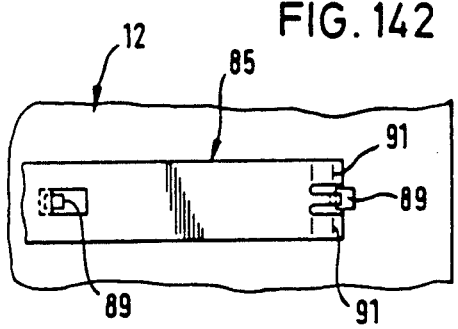

Also in FIG. 140 (partial longitudinal section), FIG. 141 (partial transverse section) and FIG. 142 (partial plan view) provision is made for a manual switchover between "changeover" and "pile removal". In the housing 12, a one-piece component 85 is displaceable in a longitudinal direction by means of pressure on the control key 87, with the rail connected to the control key running up on ramps 89 and in so doing lifting the whole component 85; a clearance space 366 for the control key is provided in the housing for this purpose. By means of the lifting of the rail, the latter comes to rest from below against the edge of the separator bar 20 defining the through-gap. From this end of the rail lugs 91 also project upwards and these can spring out downwards when the separator bar runs over the lugs, taking the entire pile along with it. If the separator bar is pushed back again, it meets the lugs and thus displaces the whole component 85 into its initial position, so that the path for the separator is also freed again, the gap for the separation of the sheet is open again and thus the changer is again in the "changeover function" position.

Figure 143:
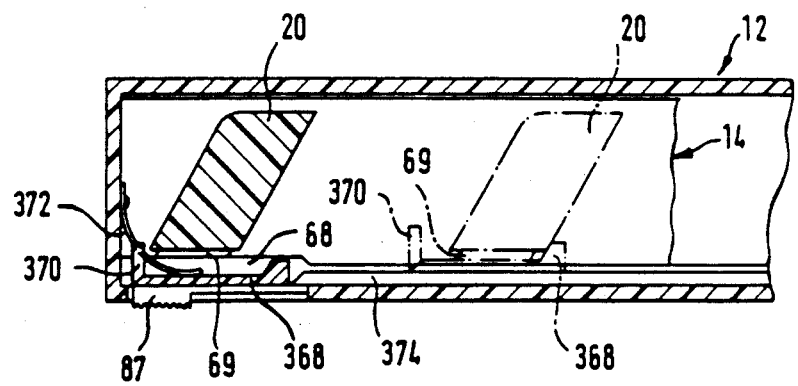
Figure 144:
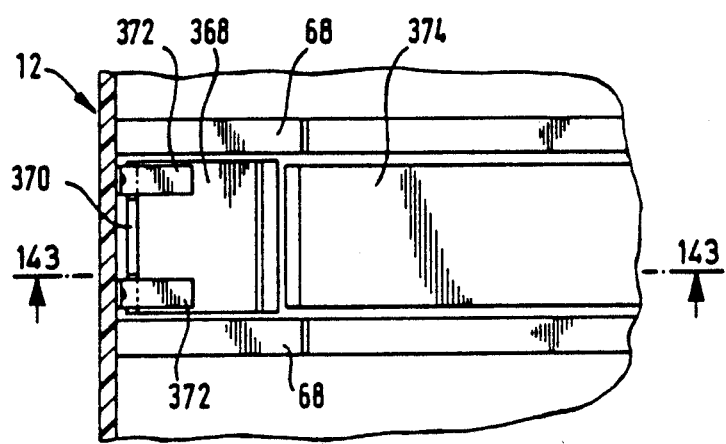

FIGS. 143 and 144 show in a partial longitudinal sectional view and in a partial plan view a further embodiment of a separating system that can be switched over for the removal of the pile. It is to be assumed that in principle the type of construction according to FIGS. 37, 38 is provided. The land indicated by 68 in FIG. 35, which is also present in fact in FIG. 37, is very narrow, and therefore of double construction. The part 69 which defines the through-gap and is arranged resiliently in the separator bar 20, has a recess opposite the gap between the two lands 68. Moulded onto the base 218 of the housing there is a control key 87 which can be pushed in and springs back, and which lifts up a blocking shoe 368 which with its forwardly-extending part blocks the through gap whilst it lies in front of the underside of the separator bar and engages behind the separator bar with a rearwardly-extending part 370. On both sides of the latter projection, small leaf springs 372 press the blocking shoe in the direction of the base of the housing. If the control key 87 is pressed and the blocking shoe is brought into a drive connection with the separator bar, with the separating function being blocked, and the slider member is now pulled, the blocking shoe is simply taken along also. During reinsertion, the small springs 372 then push the shoe into the release position again, where a trough-like recess is provided behind the run-up ramp 374.

In the case of the embodiments dealt with so far, the user must intervene in order to be able to carry out the removal. In the following embodiment the arrangement is such that the slider member which can be pulled out of the housing is the second frame part and therefore brings the remainder of the pile out with it. Only a single sheet remains behind in the housing. If the user now takes out the remainder of the pile, which is not freely accessible to him, and pushes the slider member in again, he can pull the slider member again, and this then brings with it the sheet which remained in the housing. In other words, the changeover mechanism only becomes capable of operation when the device contains at least two sheets.

What is claimed is:

1. Apparatus for the cyclic rearrangement of a pile of rectangular or square sheets, in particular a pile of photographic prints, said apparatus having first and second frame parts which are movable relative to one another and parallel to the main plane of the pile, and having means which, on movement of the frame parts backward and forward, remove an individual sheet at one end of the pile and add it to the other end of the pile, which means comprises:
   (a) separating means for separating the individual sheet from the pile,
   (b) feeding means for feeding sheets to the separating means,
   (c) retaining means for retaining the individual sheet in the first frame part and the remainder of the pile in the second frame part, and
   (d) guide means for guiding the separated individual sheet for the purpose of retaining it to the other end of the remainder of the pile;
   wherein the separating means comprises:
   a separator in the second frame part having surface portions bounded by an end edge for retaining the remainder of the pile; and
   supporting means provided on one of the frame parts which positions the individual sheet;
   and wherein, to form a through-slot for the individual sheet, there are provided spacer elements which hold the separated end edge and the supporting means at a fixed distance apart which is greater than the thickness of one sheet and less than the thickness of two sheets.

2. Apparatus according to claim 1, wherein the supporting means is provided on the second frame part.

3. Apparatus according to claim 2, wherein the supporting means is in operative connection with the individual sheet only at parts of the surface thereof.

4. Apparatus according to claim 3, wherein the parts of the surface lie symmetrically with respect to a central plane extending in the direction of movement of the frame parts.

5. Apparatus according to claim 1, 2, 3 or 4, wherein the second frame part has longitudinal bars extending in the direction of movement of the frame parts, which bars serve as the supporting means.

6. Apparatus according to claim 1, wherein the supporting means is provided on the first frame part.

7. Apparatus according to claim 6, wherein the supporting means is in operative connection with the individual sheet only at parts of the surface thereof.

8. Apparatus according to claim 7, wherein the parts of the surface lie symmetrically with respect to a central plane extending in the direction of movement of the frame parts.

9. Apparatus according to claim 6, 7 or 8, wherein the supporting means is arranged on a floor of the first frame part.

10. Apparatus according to claim 6, wherein the supporting means is in contact with portions of the side of the individual sheet facing away from the pile.

11. Apparatus according to claim 6, wherein the supporting means is in contact with the individual sheet side along strips which extend in the direction of movement of the frame parts.

12. Apparatus according to claim 6, wherein the supporting means is formed by rails which are inserted as separate components into the first frame part.

13. Apparatus according to claim 2 or 6, wherein the spacer elements are arranged in the second frame part.

14. Apparatus according to claim 13, wherein the spacer elements are arranged laterally next to the individual sheet, as seen in the direction of movement of the frame parts.

15. Apparatus according to claim 6, wherein the spacer elements are arranged on the first frame part.

16. Apparatus according to claim 6, wherein both frame parts have spacer elements.

17. Apparatus according to claim 6 wherein the spacer elements are arranged in front of an end edge of the individual sheet, over which the separator end edge runs first.

18. Apparatus according to claim 17, wherein the supporting means and the spacer elements are set off in relation to one another by a step.

19. Apparatus according to claim 18, wherein the spacer elements, starting from the step, are extended parallel to the supporting means.

20. Apparatus according to claim 18, wherein when the frame parts are pushed together, the separator end edge rests on the extension of the spacer elements.

21. Apparatus according to claim 18, 19 or 20, wherein the step has a run-on slope.

22. Apparatus according to claim 21, wherein the separator end edge is defined by a section line between a surface portion holding the remainder of the pile and a surface extending substantially parallel to the individual sheet to be separated, said extending surface becoming a run-on ramp at its end facing away from the section line, the ramp being arranged to run onto the run-on slope.

23. Apparatus according to claim 17, wherein the spacer elements are constructed on separately manufactured rails mounted in the first frame part.

24. Apparatus according to claim 18, wherein the feeding means comprises a transporter which is arranged in the first frame part and is spaced from the step by a distance which is greater than the nominal dimension of the sheets in the direction of movement of the frame parts.

25. Apparatus according to claim 18, wherein the through-slot is formed by the separator end edge running over the step only after a predetermined partial stroke of the movement apart of the frame parts.

26. Apparatus according to claim 19 or 20, wherein the extension comprises a downwardly sloping ramp.

27. Apparatus according to claim 20, wherein the retaining means for the individual sheet comprises at least one retentive strip extending parallel to the direction of movement of the frame parts, against which the individual sheet can be pressed by means of rollers arranged on the separator, each roller being mounted in a shoe having the separator end edge, the roller projecting from the shoe beyond the end edge by less than the thickness of one sheet, the extension of the spacer elements having a recess for the roller.

28. Apparatus according to claim 1, wherein the separator end edge and the supporting means are displaceable relative to one another.

29. Apparatus according to claim 28, characterized in that the displacement direction has a component which is perpendicular to the direction of movement of the frame parts.

30. Apparatus according to claim 29, wherein the second frame part is displaceable in the first frame part.

31. Apparatus according to claim 29, wherein the separator is displaceable in the second frame part.

32. Apparatus according to claim 29, wherein at least one component having the end edge is displaceably arranged on the separator.

33. Apparatus according to claim 29, wherein the separator is resiliently deformable.

34. Apparatus according to claim 28, 29, 30, 31, 32 or 33, wherein the displacement is effected along a straight line.

35. Apparatus according to claim 28, 29, 30, 31, 32 or 33, wherein the displacement is a rotation.

36. Apparatus according to claim 1, wherein the separator end edge and the supporting means are spring-biased towards one another.

37. Apparatus according to claim 36, wherein
the second frame part is displaceable in the first frame part; and
the second frame part is supported on the first frame part by way of leaf springs.

38. Apparatus according to claim 36, wherein
at least one component having the end edge is displaceably arranged on the separator; and
the component is supported on the separator by means of wire springs.

39. Apparatus according to claim 36, wherein
at least one component having the end edge is displaceably arranged on the separator; and
the component is supported on the separator by means of helical compression springs.

40. Apparatus according to claim 36, wherein the biasing spring exerts a force which is greater than the reaction force which is exerted on the surface portions by the remainder of the pile.

41. Apparatus according to claim 1, wherein the spacer elements are arranged close to the through-slot.

42. Apparatus according to claim 1, wherein the separator is an end wall of the second frame part extending transversely to the direction of movement of the frame parts.

43. Apparatus according to claim 42, further comprising means on the separator for conveying sheets to the through-slot as the frame parts are pulled apart.

44. Apparatus according to claim 43, wherein the means are formed by surface portions holding the remainder of the pile, which run obliquely such that they exert on the transverse edges of the sheets lying against them a force in a direction towards the through-slot.

45. Apparatus according to claim 44, wherein the said surface portions form an acute angle with the sheet to be separated.

46. Apparatus according to claim 44 or 45, wherein the said surface portions define different angles.

47. Apparatus according to claim 44 or 45, wherein said surface portions are divided into a plurality of sub-portions which are displaced relative to one another in the direction of movement of the frame parts.

48. Apparatus according to claim 47, wherein two sub-portions are separated from one another by a partial area running parallel to the individual sheet.

49. Apparatus according to claim 44, wherein the separator comprises a plurality of individual parts displaceable relative to one another, including a separator bar and at least one shoe having the separator end edge, the separator bar having a straight guide for the shoe, the straight guide extending substantially parallel to the sloping surface portions.

50. Apparatus according to claim 1 or 42, wherein the surface portions holding the remainder of the pile run at least partly perpendicular to the direction of movement of the frame parts.

51. Apparatus according to claim 1 or 42, wherein the separator end edge is constructed only at individual locations of the overall extent of the separator.

52. Apparatus according to claim 51, wherein separator end portions are provided symmetrically with respect to a central plane extending in the direction of movement of the frame parts.

53. Apparatus according to claim 1 or 42, wherein the separator end edge is defined by a section line between a surface portion holding the remainder of the pile and a surface extending substantially parallel to the individual sheet to be separated.

54. Apparatus according to claim 53, wherein the surface extending parallel to the individual sheet becomes a a run-on ramp at its end facing away from the section line.

55. Apparatus according to claim 1, wherein the separator comprises a plurality of individual parts.

56. Apparatus according to claim 55, wherein the individual parts of the separator are displaceable relative to one another.

57. Apparatus according to claim 56, wherein the separator includes a separator bar and at least one shoe having the separator end edge, the separator bar having a straight guide for the shoe.

58. Apparatus according to claim 57 or 49, wherein the shoe is displaceable between defined end positions.

59. Apparatus according to claim 56, wherein the individual parts are pivotable towards one another.

60. Apparatus according to claim 56, wherein the individual parts engage others by way of a biasing spring.

61. Apparatus according to claim 55, wherein several individual parts are provided with surface portions holding the remainder of the pile.

62. Apparatus according to claim 1, wherein the distance between the separator end edge and the supporting means is kept the same over essentially the entire stroke of the movement apart of the frame parts.

63. Apparatus according to claim 1, wherein the distance between the separator end edge and the supporting means is reduced to the thickness of an individual sheet when the separator end edge has passed the leading transverse edge of the individual sheet.

64. Apparatus according to claim 1, wherein the distance between the separator end edge and the supporting means is reduced by a given amount when the separator end edge has passed the leading transverse edge of the individual sheet.

65. Apparatus according to claim 1, wherein the retaining means for the individual sheet comprises at least one retentive strip extending parallel to the direction of movement of the frame parts, against which the individual sheet can be pressed by means of rollers arranged in the second frame part.

66. Apparatus according to claim 65, wherein the retentive strip is simultaneously part of the supporting means.

67. Apparatus according to claim 65 or 66, wherein the rollers are arranged on the separator.

68. Apparatus according to claim 67, wherein each roller is mounted in a shoe having the separator end edge.

69. Apparatus according to claim 68, wherein the roller projects from the shoe beyond the end edge by less than the thickness of one sheet.

70. Apparatus according to claim 65, wherein the roller is spring-biased towards the individual sheet.

71. Apparatus according to claim 70, wherein the separator end edge and the supporting means are spring-biased towards one another, and one and the same spring is provided for biasing the end edge and the roller.

72. Apparatus according to claim 70, wherein the roller is relieved of spring bias when the frame parts are pushed together.

73. Apparatus according to claim 65, wherein the roller is in staggered arrangement with respect to the separator end edge by a given amount in a direction opposite to the withdrawal direction of the second frame part.

74. Apparatus according to claim 65, comprising a pair of rollers and retentive strips.

75. Apparatus according to claim 65, wherein the strip-roller arrangements are positioned symmetrically with respect to a central plane of the apparatus parallel to the direction of movement of the frame parts.

76. Apparatus according to claim 65, wherein the rollers are staggered with respect to the separator end edge in a direction transverse to the direction of movement of the frame parts.

77. Apparatus according to claim 1, wherein only after a predetermined partial stroke of the movement apart of the frame parts is a through-slot for the individual sheet formed.

78. Apparatus according to claim 77 or 26, wherein the partial stroke corresponds to the projection of the surface portions holding the remainder of the pile onto the plane of the individual sheet.

79. Apparatus according to claim 1, further comprising means for blocking the entry of the individual sheet into the through-slot before the separator end edge has reached alignment with the supporting means.

80. Apparatus according to claim 79, wherein the blocking means comprises locking elements over which the separator end edge runs at the start of the backward and forward movement.

81. Apparatus according to claim 80, wherein the blocking elements are constructed in one piece with the spacer elements.

82. Apparatus according to claim 81, wherein the blocking elements are supported by the first frame part.

83. Apparatus according to claim 1, wherein, with the frame parts pushed together, the spacer elements extend beneath the separator end edge.

84. Apparatus according to claim 1, wherein the first frame part is a housing provided with a viewing window from which the second frame part, constructed as a slider member, can be withdrawn from an inner end position into an outer end position.

85. Apparatus according to claim 84, wherein the separator forms an internal transverse wall of the second frame part.

86. Apparatus according to claim 84 or 85, wherein the through-slot is formed close to a housing floor lying opposite the viewing window.

87. Apparatus according to claim 84, wherein the supporting means forms a part of a housing floor lying opposite the viewing window.

88. Apparatus according to claim 1, further comprising a manually operable arrangement for blocking the separating means so that the entire pile is displaceable by means of the second frame part relative to the first frame part, preferably into a position in which the pile can be removed.

* * * * *

UNITED STATES PATENT AND TRADEMARK OFFICE
CERTIFICATE OF CORRECTION

PATENT NO. : 4,939,860
DATED : July 10, 1990
INVENTOR(S) : Peter Ackeret

Page 1 of 2

It is certified that error appears in the above-identified patent and that said Letters Patent is hereby corrected as shown below:

Column 1, line 19, "4,241,588," should be -- 4,241,528, --;
    line 24, "window" should be -- window. --.

Column 5, line 4, "housing" should be -- housing. --.

Column 9, line 38, "eccentrically" should be
    -- eccentrically. --;
    line 68, "housing" (first occurrence) should be
    -- housing. --.

Column 12, line 29, "thereof" should be -- thereof. --.

Column 18, line 10, "cycle" should be -- cycle. --;
    line 15, "35-50" should be -- 35-50. --.

Column 19, line 39, "solved" should be -- solved. --.

Column 20, line 53, "embodiment" should be -- embodiment. --.

UNITED STATES PATENT AND TRADEMARK OFFICE
CERTIFICATE OF CORRECTION

PATENT NO. : 4,939,860
DATED : July 10, 1990
INVENTOR(S) : Peter Ackeret

It is certified that error appears in the above-identified patent and that said Letters Patent is hereby corrected as shown below:

Column 23, line 33, "not" should be -- now --.

Column 25, line 7, "compensation" should be -- compensation: --.

Signed and Sealed this

Tenth Day of August, 1993

Attest:

MICHAEL K. KIRK

*Attesting Officer*     Acting Commissioner of Patents and Trademarks